US011602033B1

(12) United States Patent
Siminoff et al.

(10) Patent No.: US 11,602,033 B1
(45) Date of Patent: \*Mar. 7, 2023

(54) ELECTRONIC DEVICES FOR CONTROLLING LIGHTS

(71) Applicant: Amazon Technologies, Inc., Seattle, WA (US)

(72) Inventors: James Siminoff, Pacific Palisades, CA (US); Michael V. Recker, Santa Monica, CA (US); Ryan David Hruska, North Royalton, OH (US); David Brett Levine, Pepper Pike, OH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,083

(22) Filed: Jun. 26, 2019

Related U.S. Application Data

(63) Continuation of application No. 15/974,434, filed on May 8, 2018, now Pat. No. 10,412,811.

(51) Int. Cl.
*H05B 37/00* (2006.01)
*G05F 1/00* (2006.01)
(Continued)

(52) U.S. Cl.
CPC ........... *H05B 47/11* (2020.01); *G08B 13/196* (2013.01); *G08B 15/00* (2013.01); *H05B 41/39* (2013.01); *H05B 45/10* (2020.01); *H05B 47/16* (2020.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 7,193,644 B2 3/2007 Carter
8,139,098 B2 3/2012 Carter
(Continued)

OTHER PUBLICATIONS

A Hubbell Company, Progress Lighting, "Transformer", retrieved on Aug. 15, 2018 at <<https://progresslighting.com/collection/transformer/>>, 4 pages.
(Continued)

*Primary Examiner* — Minh D A
(74) *Attorney, Agent, or Firm* — Lee & Hayes, P.C.

(57) ABSTRACT

The present disclosure describes a network device that is capable of coordinating the control of light emitters. For example, the network device may receive data indicating conditions for activating the light emitters. The network device may then receive sensor data generated by various sensors, such as motion sensors, light sensors, or a timer. Using the sensor data, the network device may determine that the conditions are satisfied and, in response, cause the light emitters to activate. To activate first light emitters, the network device may transmit a signal to an electronic device that causes the first light emitters to activate. The first light emitters may be powered by the electronic device. Additionally, to activate second light emitters, the network device may transmit signals to the second light emitters that include commands to activate.

20 Claims, 17 Drawing Sheets

(51) Int. Cl.
*H05B 47/11* (2020.01)
*G08B 13/196* (2006.01)
*G08B 15/00* (2006.01)
*H05B 41/39* (2006.01)
*H05B 45/10* (2020.01)
*H05B 47/16* (2020.01)

(58) Field of Classification Search
CPC .............. H05B 37/029; H05B 33/0803; H05B 37/0254; H05B 37/02; H05B 37/0272; H05B 41/00; H05B 41/36; G09G 3/22; G09G 2320/0233; H01T 2/00; H01T 1/00; H01T 2/02; H01J 17/00; H01J 2893/0059
See application file for complete search history.

(56) References Cited

U.S. PATENT DOCUMENTS

| | | | |
|---|---|---|---|
| 8,144,183 B2 | 3/2012 | Carter | |
| 8,154,581 B2 | 4/2012 | Carter | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,836,069 B1 | 12/2017 | Nelmes et al. | |
| 10,004,128 B2 | 6/2018 | Recker et al. | |
| 10,412,811 B1* | 9/2019 | Siminoff | H05B 33/0854 |
| 2011/0062888 A1 | 3/2011 | Bondy et al. | |
| 2014/0263977 A1* | 9/2014 | Jones | G01J 1/0228 250/14 AL |
| 2014/0265880 A1* | 9/2014 | Taipale | H05B 37/0263 315/158 |
| 2015/0077567 A1 | 3/2015 | Scalisi | |
| 2015/0249336 A1* | 9/2015 | Raneri | G06Q 40/00 705/35 |
| 2015/0296599 A1 | 10/2015 | Recker et al. | |
| 2016/0165570 A1 | 6/2016 | Kim et al. | |
| 2016/0192458 A1 | 6/2016 | Keith | |
| 2016/0195864 A1* | 7/2016 | Kim | H04L 12/2816 709/221 |
| 2016/0353543 A1* | 12/2016 | Twaddell | H05B 33/0854 |
| 2017/0086279 A1* | 3/2017 | Chemel | H05B 33/08 |
| 2017/0351505 A1* | 12/2017 | Riedl | G06F 3/002 |
| 2018/0014386 A1* | 1/2018 | Bhutani | H05B 47/11 |
| 2018/0116040 A1* | 4/2018 | Mann | G05B 15/02 |
| 2018/0139818 A1* | 5/2018 | Coombes | H05B 47/11 |
| 2018/0192502 A1 | 7/2018 | Lozano et al. | |

OTHER PUBLICATIONS

Firefly, CIXI Fire Fly Light CO., LTD, "FFL WIFI Transformer for low voltage lighting" retrieved on Aug. 15, 2018 at <<http://www.fireflylit.com/en/FFL-WIFI-transformer-for-low-voltage-lighgting.html>>, 3 pages.

Kichler, "Landscape Lighting Transformers", retrieved on Aug. 15, 2018 at <<http://www.kichler.com/products/category/landscape-transformers.aspx>>, 2 pages.

Lightkiwi, "Transformers", retrieved on Aug. 15, 2018 at <<https://www.lightkiwi.com/landscape-lighting-transformer>>, 3 pages.

Lowes, "Portfolio 200-Watt 12-Volt Multi-Tap Transformer Landscape Lighting Transformer with Digital Timer with Dusk-To-Dawn Sensor", retrieved on Aug. 15, 2018 at <<https://www.lowes.com/pd/Portfolio-200-Watt-12-Volt-Multi-Tap-Transformer-Landscape-Lighting-Transformer-with-Digital-Timer-with-Dusk-To-Dawn-Sensor/1000127373>> 3 pages.

Non Final Office Action dated Dec. 7, 2018 for U.S. Appl. No. 15/974,434 "Electronic Devices for Controlling Lights" Siminoff, 11 pages.

Paradise, "Power Pack", retrieved on Aug. 15, 2018 at <<http://www.paradisegardenlighting.com/products/34-power-pack>>, 1 page.

The Home Depot, "Low-Voltage 200-Watt Landscape Transformer", retrieved on Aug. 15, 2018 at <<https://www.homedepot.com/p/Hampton-Bay-Low-Voltage-200-Watt-Landscape-Transformer-SL-200-12A/206286485>>, 3 pages.

USALight.com, "Malibu 200 Watt Digitsl Power Transformer", retrieved on Aug. 15, 2018 at <<https://www.usalight.com/8100-0200-01-p/8100-0200-01.htm>>, 3 pages.

Volt Factory Direct Store, "Low Voltage Transformers", retrieved on Aug. 15, 2018 at <<https://www.voltlighting.com/andscape-lighting-low-voltage-transformers/c/21>>, 3 pages.

Office action for U.S. Appl. No. 16/397,171, dated Dec. 2, 2019, Siminoff, "Electronic Devices for Controlling Lights", 15 Pages.

Office Action for U.S. Appl. No. 16/397,171, dated Aug. 25, 2020, Siminoff, "Electronic Devices for Controlling Lights", 26 Pages.

* cited by examiner

ELECTRONIC DEVICES FOR CONTROLLING LIGHTS

RELATED APPLICATION

This application is a continuation of U.S. patent application Ser. No. 15/974,434, filed on May 8, 2018, titled "ELECTRONIC DEVICE FOR CONTROLLING LIGHTS," the entire contents of which are incorporated herein by reference.

TECHNICAL FIELD

The present embodiments relate to lighting systems. In particular, the present embodiments relate to improvements in the functionality of lighting systems in wireless environments.

BACKGROUND

Home security is a concern for many homeowners and renters. Those seeking to protect or monitor their homes often wish to have lighting systems installed at their homes, such as floodlights, spotlights, and the like. Such persons may also wish to incorporate the lighting systems into security systems in order to prevent or otherwise deter suspicious and criminal activity at the property. For example, the presence of one or more lighting devices, in addition to one or more A/V recording and communication devices, such as security cameras, on the exterior of a home act as a powerful deterrent against would-be burglars.

SUMMARY

The various embodiments described herein are directed to electronic devices for controlling lights, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that a user may install different types of lights around the users' property for many reasons; however, the user may find it difficult to control each of the types of lights according to the user's preferences. For example, the user may install a first type of light near walkways of the user's property that the user manually turns on at night. This first type of light may emit light that allows other users located on the property to navigate the property at times when there is little ambient light. Additionally, the user may install a second type of light, such as motion activated lights, on the user's property near areas that are susceptible to entry, such as windows or the backyard. This second type of light may be used for security reasons, such as to scare would be nefarious actors away from the areas of the user's property that are susceptible to entry. By installing these different types of lights around the property, the user may be forced to manually control each type of light. Additionally, even for the same type of light, such as the motion activated lights, the user may be unable to coordinate the activation of the lights as each light may detect motion of an object at different times.

The present embodiments solve these problems by providing electronic devices that are capable to coordinating the control of different types of lights according to conditions that are set by a user. For example, an electronic device, which may include a transformer, may be configured to control different types of lights. The different types of lights may include, but are not limited to, a first type of light that is activated by the electronic device via a wired connection, a second type of light that receives power from the electronic device via a wired connection, but which is activated by the electronic device using transmitted signals, and a third type of light that receives power from a source external to the electronic device (e.g., a battery), but which is also activated by the electronic device using transmitted signals. To control the lights, the electronic device may receive data from a client device associated with the user, where the data indicates one or more conditions for activating the lights and/or the different types of lights. Conditions may include, but are not limited to, a period of time, an amount of ambient light, motion being detected by sensor(s), and/or the like.

For example, the data may indicate that first lights (e.g., one or more of the first types of lights, second types of lights, and/or third types of lights) are activated based on a first condition being satisfied and that second lights (e.g., one or more of the first types of lights, second types of lights, or third types of lights) are activated based on a second condition being satisfied. The electronic device may then use first sensor data received from a first sensor to determine when the first condition is satisfied. Based on the determination, the electronic device may activate the first lights, where activating the first lights may include causing the first light to emit first light. Additionally, the electronic device may use second sensor data received from the first sensor and/or a second sensor to determine that the second condition is satisfied. Based on the determination, the electronic device may activate the second lights, where activating the second lights may include causing the second lights to emit second light. In other words, by using the electronic device, the user is able to control different types of lights using various conditions. Additionally, based on controlling the lights using the electronic device, the user is able to coordinate the activation of the lights located around the user's property.

Additionally, the present embodiments may solve the above problems by utilizing a network device to control multiple electronic devices, where each electronic device is capable of activating one or more lights. For example, the network device may receive data from the client device, where the data indicates one or more conditions for causing the electronic devices to activate the lights. For example, a first condition may be associated with a first electronic device that activates first lights and a second condition may be associated with a second electronic device that activates second lights. Using sensor data received from one or more sensors, the network device may determine that the first condition is satisfied and, in response, transmit a first signal to the first electronic device. The first signal may be configured to cause the first electronic device to activate the first lights. Additionally, using the sensor data, the network device may determine that the second condition is satisfied and, in response, transmit a second signal to the second electronic device. The second signal may be configured to cause the second electronic device to activate the second lights.

In a first aspect, an electronic device comprises: a plurality of terminals electrically coupled to an external power source, at least a terminal of the plurality of terminals configured to supply power from the external power source over a wired connection to a first light emitter; a network interface; one or more processors; and one or more non-transitory computer-readable media storing instructions that, when executed by the one or more processors, cause the one or more processors to perform operations comprising: receiving, using the network interface, first data from a client device, the first data indicating a first condition for activating the first light emitter; storing second data associating the first condition with the first light emitter; receiving, using the network interface, third data from the client device, the third data indicating a second condition for activating a second light emitter, the second light emitter including a second power source; storing fourth data associating the second condition with the second light emitter; obtaining first sensor data generated by a first sensor; determining, using the first sensor data, that the first condition is satisfied; based at least in part on the first condition being satisfied, causing the power from the first power source to be applied to the terminal to cause the first light emitter to emit light; obtaining second sensor data generated by at least one of the first sensor or a second sensor; determining, using the second sensor data, that the second condition is satisfied; and based at least in part on the second condition being satisfied, transmitting, using the network interface, a signal to the second light emitter, the signal including a command to cause the second light emitter to emit light.

In an embodiment of the first aspect, further comprising instructions that, when executed by the one or more processors, cause the one or more processors to perform operations comprising: obtaining third sensor data generated by the first sensor; determining, using the third sensor data, that the first condition is no longer satisfied; based at least in part on the first condition no longer being satisfied, ceasing from causing the power from the external power source to be applied to the terminal; obtaining fourth sensor data generated by the at least one of the first sensor or the second sensor; determining, using the fourth sensor data, that the second condition is no longer satisfied; and based at least in part on the second condition no longer being satisfied, transmitting, using the network interface, an additional signal to the second light emitter, the additional signal including an additional command to cease emitting the light.

In another embodiment of the first aspect, the plurality of terminals includes an additional terminal configured to supply the power from the external power source over an additional wired connection to a third light emitter, and further comprising instructions that, when executed by the one or more processors, cause the one or more processors to perform operations comprising: receiving, using the network interface, fifth data from the client device, the fifth data indicating a third condition for activating the third light emitter; storing sixth data associating the third condition with the third light emitter; determining that the third condition is satisfied; and based at least in part on the third condition being satisfied, transmitting, using the network interface, an additional signal to the third light emitter, the additional signal including an additional command to emit light.

In another embodiment of the first aspect, wherein: the first condition indicates a first period of time; the second condition indicates a second period of time; the determining that the first condition is satisfied comprises determining, using the first sensor data, that a first current time is within the first period of time; and the determining that the second condition is satisfied comprises determining, using the second sensor data, that a second current time is within the second period of time.

In another embodiment of the first aspect, wherein: the first condition indicates a first light threshold; the second condition indicates a second light threshold; the determining that the first condition is satisfied comprises determining, using the first sensor data, that a first amount of ambient light is below the first light threshold; and the determining that the second condition is satisfied comprises determining, using the second sensor data, that a second amount of ambient light is below the second light threshold.

In another embodiment of the first aspect, wherein: the first condition indicates that first motion is detected by the first sensor; the second condition indicates that second motion is detected by the second sensor; the determining that the first condition is satisfied comprises determining, using the first sensor data, that the first sensor detected the first motion; and the determining that the second condition is satisfied comprises determining, using the second sensor data, that the second sensor detected the second motion.

In another embodiment of the first aspect, the first condition indicates at least one of a first period of time, a first light threshold, or first motion detected by the first sensor, and the second condition indicates at least one of a second period of time, a second light threshold, or second motion detected by the second sensor.

In another embodiment of the first aspect, further comprising a transformer that receives the power from the external power source at a first voltage and converts the power to a second voltage, the power is supplied to the terminal at the second voltage.

In another embodiment of the first aspect, further comprising at least one of the first sensor or the second sensor.

In a second aspect, a method comprises: receiving first data from at least one of a client device or a backend server, the first data indicating a first condition for activating a hard-wired light emitter that is powered by an electronic device; storing second data associating the first condition with the hard-wired light emitter; receiving third data from at least one of the client device or the backend server, the third data indicating a second condition for activating a battery-powered light emitter that is powered by at least one of a battery or a solar panel; storing fourth data associating the second condition with the battery-powered light emitter; receiving first sensor data generated by a first sensor; determining, using the first sensor data, that the first condition is satisfied; based at least in part on the first condition being satisfied, causing power to be provided from the electronic device to the hard-wired light emitter; receiving second sensor data generated by at least one of the first sensor or a second sensor; determining, using the second sensor data, that the second condition is satisfied; and based at least in part on the second condition being satisfied, transmitting a signal to the battery-powered light emitter, the signal including a command configured to cause the battery-powered light emitter to emit light.

In an embodiment of the second aspect, the method further comprising: receiving third sensor data generated by the first sensor; determining, using the third sensor data, that the first condition is no longer satisfied; based at least in part on the first condition no longer being satisfied, ceasing from causing the power to be provided from the electronic device to the hard-wired light emitter; receiving fourth sensor data generated by the at least one of the first sensor or the second sensor; determining, using the fourth sensor data, that the second condition is no longer satisfied; and based at least in part on the second condition no longer being satisfied, transmitting an additional signal to the battery-powered light emitter, the additional signal including an additional command configured to cause the battery-powered light emitter to cease emitting the light.

In another embodiment of the second aspect, the method further comprising: receiving fifth data from at least one of the client device or the backend server, the fifth data indicating a third condition for activating an additional hard-wired light emitter that is powered by the electronic device; storing sixth data associating the third condition with the additional hard-wired light emitter; determining that the third condition is satisfied; and based at least in part on the third condition being satisfied, transmitting an additional signal to the additional hard-wired light emitter, the additional signal including an additional command to cause the additional hard-wired light emitter to emit additional light.

In another embodiment of the second aspect, wherein: the first condition indicates a first period of time; the second condition indicates a second period of time; the determining that the first condition is satisfied comprises determining, using the first sensor data, that a first current time is within the first period of time; and the determining that the second condition is satisfied comprises determining, using the second sensor data, that a second current time is within the second period of time.

In another embodiment of the second aspect, wherein: the first condition indicates a first light threshold; the second condition indicates a second light threshold; the determining that the first condition is satisfied comprises determining, using the first sensor data, that a first amount of ambient light does not exceed the first light threshold; and the determining that the second condition is satisfied comprises determining, using the second sensor data, that a second amount of ambient light does not exceed the second light threshold.

In another embodiment of the second aspect, wherein: the first condition indicates that first motion is detected by the first sensor; the second condition indicates that second motion is detected by the second sensor; the determining that the first condition is satisfied comprises determining, using the first sensor data, that the first sensor detected the first motion; and the determining that the second condition is satisfied comprises determining, using the second sensor data, that the second sensor detected the second motion.

In another embodiment of the second aspect, the first condition indicates at least one of a first period of time, a first light threshold, or first motion detected by the first sensor, and the second condition indicates at least one of a second period of time, a second light threshold, or second motion detected by the second sensor.

In another embodiment of the second aspect, the method further comprising: receiving the power from a power source, the power including a first voltage; and causing, using a transformer of the electronic device, the power at the first voltage to be converted to a second voltage, the power is provided from the electronic device to the hard-wired light emitter at the second voltage.

In another embodiment of the second aspect, the causing the power to be provided from the electronic device to the hard-wired light emitter comprises causing the power to be provided to a terminal of the electronic device.

In another embodiment of the second aspect, the causing the power to be provided from the electronic device to the hard-wired light emitter comprises causing a switch associated with a terminal of the electronic device to move from an off position to an on position.

In another embodiment of the second aspect, the method further comprising: generating the power using at least one energy harvesting device; and causing the power to recharge a power supply of the electronic device.

In a third aspect, an electronic device comprises: one or more processors; a power component that draws power from an external power source at a first voltage, the power component including a transformer for converting the power received from the external power source to a second voltage that is less than the first voltage; a plurality of connectors, at least one connector of the plurality of connectors for providing the power at the second voltage to at least one hard-wired light emitter; a network interface for: communicating, using a first network connection, with at least one of the at least one hard-wired light emitter or at least one battery-powered light emitter; and communicating, using a second network connection, with a client device; one or more processors; and one more computer-readable media storing at least: first data associating a first condition with the at least one hard-wired light emitter; and second data associating at least one of the first condition or a second condition with the at least one battery-powered light emitter.

In an embodiment of the third aspect, further comprising at least one sensor for generating sensor data, the electronic device uses the sensor data to determine if at least one of the first condition is satisfied or the second condition is satisfied.

In another embodiment of the third aspect, further comprising at least one of a motion sensor or a light sensor.

In another embodiment of the third aspect, further comprising a switch configured to move from a first position to a second position, at least a connector of the at least one connector provides the power to a hard-wired light emitter of the at least one hard-wired light emitter when the switch is in the second position.

In another embodiment of the third aspect, further comprising a lighting element that emits light.

In another embodiment of the third aspect, further comprising an opening located on a portion of the electronic device, the opening to provide access to the plurality of connectors.

In another embodiment of the third aspect, the one or more computer-readable media further storing instructions that, when executed by the one or more processors, cause the one or more processors to perform operations comprising: determining that the first condition is satisfied; and based at least in part on the first condition being satisfied, causing power at the second voltage to be applied from the external power source to the at least one connector.

In another embodiment of the third aspect, the one or more computer-readable media further storing instructions that, when executed by the one or more processors, cause the one or more processors to perform operations comprising: determining that the first condition is satisfied; and based at least in part on the first condition being satisfied, transmitting a signal to at least a hard-wired light emitter of the at least one hard-wired light emitters, the signal including a command configured to cause the hard-wired light emitter to emit light.

In another embodiment of the third aspect, the one or more computer-readable media further storing instructions that, when executed by the one or more processors, cause the one or more processors to perform operations comprising: determining that the at least one of the first condition or the second condition is satisfied; and based at least in part on the at least one of the first condition or the second condition being satisfied, transmitting a signal to at least a battery-powered light emitter of the at least one battery-powered light emitters, the signal including a command configured to cause the battery-powered light emitter to emit light.

In a fourth aspect, an electronic device comprises: a plurality of terminals electrically coupled to a first power source, at least a terminal of the plurality of terminals configured to supply power from the first power source to a first light emitter; a network interface; one or more processors; and one or more non-transitory computer-readable media storing instructions that, when executed by the one or more processors, cause the one or more processors to perform operations comprising: receiving, using the network interface, first data from at least one of a client device or a network device, the first data indicating a first condition associated with the first light emitter; receiving, using the network interface, second data from at least one of the client device or the network device, the second data indicating a second condition associated with a second light emitter, the second light emitter including a second power source; obtaining sensor data generated by a sensor; determining, using the sensor data, that the first condition is satisfied; and based at least in part on the first condition being satisfied, applying power from the first power source to the terminal.

In an embodiment of the fourth aspect, further comprising instructions that, when executed by the one or more processors, cause the one or more processors to perform operations comprising: obtaining additional sensor data from the sensor or an additional sensor; determining, using the additional sensor data, that the second condition is satisfied; and based at least in part on the second condition being satisfied, transmitting a signal to the second light emitter, the signal including a command to cause the second light emitter to emit light.

In another embodiment of the fourth aspect, further comprising instructions that, when executed by the one or more processors, cause the one or more processors to perform operations comprising: storing third data associating the first light emitter with the first condition; and storing second data associating the second light emitter with the second condition.

In another embodiment of the fourth aspect 30, further comprising instructions that, when executed by the one or more processors, cause the one or more processors to perform operations comprising: obtaining additional sensor data generated by the sensor; determining, using the additional sensor data, that the first condition is no longer satisfied; and based at least in part on the first condition no longer being satisfied, ceasing from applying the power from the first power source to the terminal.

In another embodiment of the fourth aspect, the plurality of terminals includes an additional terminal configured to supply the power from the first power source to a third light emitter, and further comprising instructions that, when executed by the one or more processors, cause the one or more processors to perform operations comprising: receiving, using the network interface, third data from at least one of the client device or the network device, the third data indicating a third condition for activating the third light emitter; determining that the third condition is satisfied; and based at least in part on the third condition being satisfied, transmitting, using the network interface, a signal to the third light emitter, the signal including a command to emit light.

In another embodiment of the fourth aspect, wherein: the first condition indicates a first period of time; the second condition indicates a second period of time; and the determining that the first condition is satisfied comprises determining, using the sensor data, that a current time is within the first period of time.

In another embodiment of the fourth aspect, further comprising instructions that, when executed by the one or more processors, cause the one or more processors to perform operations comprising: obtaining additional sensor data from at least one of the sensor or an additional sensor; and determining, using the additional sensor data, that an additional current time is within the second period of time; and transmitting a signal to the second light emitter, the signal including a command to cause the second light emitter to emit light.

In another embodiment of the fourth aspect, wherein: the first condition indicates a first light threshold; the second condition indicates a second light threshold; and the determining that the first condition is satisfied comprises determining, using the sensor data, that an amount of ambient light is below the first light threshold.

In another embodiment of the fourth aspect, further comprising instructions that, when executed by the one or more processors, cause the one or more processors to perform operations comprising: obtaining additional sensor data from at least one of the sensor or an additional sensor; determining, using the additional sensor data, that an additional amount of ambient light is below the second light threshold; and transmitting a signal to the second light emitter, the signal including a command to cause the second light emitter to emit light.

In another embodiment of the fourth aspect, wherein: the first condition indicates that first motion is detected by the sensor; the second condition indicates that second motion is detected by an additional sensor; and the determining that the first condition is satisfied comprises determining, using the sensor data, that the first sensor detected the first motion.

In another embodiment of the fourth aspect, further comprising instructions that, when executed by the one or more processors, cause the one or more processors to perform operations comprising: obtaining additional sensor data from the additional sensor; determining, using the additional sensor data, that the additional sensor detected the second motion; and transmitting a signal to the second light emitter, the signal including a command to cause the second light emitter to emit light.

In another embodiment of the fourth aspect, the first condition indicates at least one of a first period of time, a first light threshold, or first motion detected by the sensor, and the second condition indicates at least one of a second period of time, a second light threshold, or second motion detected by an additional sensor.

In another embodiment of the fourth aspect, the first power source includes an external power source, and the electronic device further comprises a transformer that receives the power from the external power source at a first voltage and converts the power to a second voltage.

In another embodiment of the fourth aspect, the first power source includes an external power source, and the electronic device further comprises at least one of a ballast or a light-emitting diode driver that provides the power to the first light emitter.

In another embodiment of the fourth aspect, further comprising: the first power source; and at least one energy harvesting device configured to generate the power in order to charge the first power source.

In another embodiment of the fourth aspect, further comprising the sensor.

In a fifth aspect, a method comprises: receiving first data indicating a first condition associated with a first light emitter that receives power via an electronic device; storing second data associating the first condition with the first light emitter; receiving third data indicating a second condition associated with a second light emitter that is powered by a power source of the second light emitter; storing fourth data associating the second condition with the second light emitter; receiving sensor data generated by a sensor; determining, using the sensor data, that the first condition is satisfied; and based at least in part on the first condition being satisfied, causing the power to be provided from the electronic device to the first light emitter.

In an embodiment of the fifth aspect, the method further comprising: receiving additional sensor data generated by at least one of the sensor or an additional sensor; determining, using the additional sensor data, that the second condition is satisfied; and based at least in part on the additional condition being satisfied, transmitting a signal to the second light emitter, the signal including a command configured to cause the second light emitter to emit light.

In another embodiment of the fifth aspect, the method further comprising: receiving additional sensor data generated by the sensor; determining, using the additional sensor data, that the first condition is no longer satisfied; based at least in part on the first condition no longer being satisfied, ceasing from causing the power to be provided from the electronic device to the first light emitter.

In another embodiment of the fifth aspect, the method further comprising: receiving fifth data indicating a third condition for activating a third light emitter that receives additional power via the electronic device; storing sixth data associating the third condition with the third light emitter; determining that the third condition is satisfied; and based at least in part on the third condition being satisfied, transmitting a signal to the third light emitter, the signal including a command to cause the third light emitter to emit light.

In another embodiment of the fifth aspect, wherein: the first condition indicates a first period of time; the second condition indicates a second period of time; and the determining that the first condition is satisfied comprises determining, using the sensor data, that a current time is within the first period of time.

In another embodiment of the fifth aspect, the method further comprising: receiving additional sensor data generated by at least one of the sensor or an additional sensor; determining, using the additional sensor data, that an additional current time is within the second period of time; and transmitting a signal to the second light emitter, the signal including a command configured to cause the second light emitter to emit light.

In another embodiment of the fifth aspect, wherein: the first condition indicates a first light threshold; the second condition indicates a second light threshold; and the determining that the first condition is satisfied comprises determining, using the sensor data, that an amount of ambient light does not exceed the first light threshold.

In another embodiment of the fifth aspect, the method further comprising: receiving additional sensor data generated by at least one of the sensor or an additional sensor; determining, using the additional sensor data, that an additional amount of ambient light does not exceed the second light threshold; and transmitting a signal to the second light emitter, the signal including a command configured to cause the second light emitter to emit light.

In another embodiment of the fifth aspect, wherein: the first condition indicates that first motion is detected by the sensor; the second condition indicates that second motion is detected by an additional sensor; and the determining that the first condition is satisfied comprises determining, using the sensor data, that the first sensor detected the first motion.

In another embodiment of the fifth aspect, the method further comprising: receiving additional sensor data generated by the additional sensor; determining, using the additional sensor data, that the additional sensor detected the second motion; and transmitting a signal to the second light emitter, the signal including a command configured to cause the second light emitter to emit light.

In another embodiment of the fifth aspect, the first condition indicates at least one of a first period of time, a first light threshold, or first motion detected by the sensor, and the second condition indicates at least one of a second period of time, a second light threshold, or second motion detected by an additional sensor.

In another embodiment of the fifth aspect, the method further comprising: receiving the power from a power source, the power including a first voltage; and causing, using a transformer of the electronic device, the power at the first voltage to be converted to a second voltage.

In another embodiment of the fifth aspect, the causing the power to be provided to the first light emitter comprises causing the power to be provided to a terminal of the electronic device.

In another embodiment of the fifth aspect, the causing the power to be provided to the first light emitter comprises causing a switch associated with a terminal of the electronic device to move from an off position to an on position.

In another embodiment of the fifth aspect, the method further comprising: generating the power using at least one energy harvesting device; and causing the power to recharge a power supply of the electronic device.

In a sixth aspect, a network device comprises: a network interface; one or more processors; and one or more non-transitory computer-readable media storing instructions that, when executed by the one or more processors, cause the one or more processors to perform operations comprising: receiving, using the network interface, first data from at least one of a client device or a backend device, the first data indicating a first condition for causing a first electronic device to activate at least a first light emitter; storing second data associating the first condition with the first electronic device; receiving, using the network interface, third data from at least one of the client device or the backend device, the third data indicating a second condition for causing a second electronic device to activate at least a second light emitter; storing fourth data associating the second condition with the second electronic device; receiving, using the network interface, first sensor data generated by a first sensor; determining, using the first sensor data, that the first condition is satisfied; based at least in part on the first condition being satisfied, transmitting, using the network interface, a first signal to the first electronic device, the first signal including a first command to activate at least the first light emitter; receiving, using the network interface, second sensor data generated by at least one of the first sensor or a second sensor; determining, using the second sensor data, that the second condition is satisfied; and based at least in part on the second condition being satisfied, transmitting, using the network interface, a second signal to the second electronic device, the second signal including a second command to activate at least the second light emitter.

In an embodiment of the sixth aspect, further comprising instructions that, when executed by the one or more processors, cause the one or more processors to perform operations comprising: receiving, using the network interface, third sensor data generated by the first sensor; determining, using the third sensor data, that the first condition is no longer satisfied; based at least in part on the first condition no longer being satisfied, transmitting, using the network interface, a third signal to the first electronic device, the third signal including a second command to deactivate at least the first light emitter; receiving, using the network interface, fourth sensor data generated by the at least one of the first sensor or the second sensor; determining, using the fourth sensor data, that the second condition is no longer satisfied; and based at least in part on the second condition no longer being satisfied, transmitting, using the network interface, a fourth signal to the second electronic device, the fourth signal including a fourth command to deactivate at least the second light emitter.

In another embodiment of the sixth aspect, the first electronic device includes at least one of a first transformer, a first light emitting diode (LED) driver, a first ballast, or a first other power supply and the second electronic device includes at least one of a second transformer a second LED driver, a second ballast, or a second other power supply.

In another embodiment of the sixth aspect, wherein: the first condition indicates a first period of time; the second condition indicates a second period of time; the determining that the first condition is satisfied comprises determining, using the first sensor data, that a first current time is within the first period of time; and the determining that the second condition is satisfied comprises determining, using the second sensor data, that a second current time is within the second period of time.

In another embodiment of the sixth aspect, wherein: the first condition indicates a first light threshold; the second condition indicates a second light threshold; the determining that the first condition is satisfied comprises determining, using the first sensor data, that a first amount of ambient light is below the first light threshold; and the determining that the second condition is satisfied comprises determining, using the second sensor data, that a second amount of ambient light is below the second light threshold.

In another embodiment of the sixth aspect, wherein: the first condition indicates that first motion is detected by the first sensor; the second condition indicates that second motion is detected by the second sensor; the determining that the first condition is satisfied comprises determining, using the first sensor data, that the first sensor detected the first motion; and the determining that the second condition is satisfied comprises determining, using the second sensor data, that the second sensor detected the second motion.

In another embodiment of the sixth aspect, the first condition indicates at least one of a first period of time, a first light threshold, or first motion detected by the first sensor, and the second condition indicates at least one of a second period of time, a second light threshold, or second motion detected by the second sensor.

In another embodiment of the sixth aspect, further comprising instructions that, when executed by the one or more processors, cause the one or more processors to perform operations comprising: receiving, using the network interface, fifth data from at least one of the client device or the backend device, the fifth data indicating a third condition for causing the first electronic device to activate at least a third light emitter; storing sixth data associating the third condition with the first electronic device; determining that the third condition is satisfied; based at least in part on the third condition being satisfied, transmitting, using the network interface, a third signal to the first electronic device, the third signal including a third command to activate at least the third light emitter.

In a seventh aspect a network device comprises: a network interface; one or more processors; and one or more non-transitory computer-readable media storing instructions that, when executed by the one or more processors, cause the one or more processors to perform operations comprising: receiving, using the network interface, first data indicating a first condition for causing a first electronic device to activate at least a first light emitter; receiving, using the network interface, second data indicating at least one of the first condition or a second condition, the at least one of the first condition or the second condition for causing a second electronic device to activate at least a second light emitter; receiving, using the network interface, sensor data generated by a sensor; determining, using the sensor data, that the first condition is satisfied; and based at least in part on the first condition being satisfied, transmitting, using the network interface, a signal to the first electronic device, the signal including a command to activate at least the first light emitter.

In an embodiment of the seventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that the second condition is satisfied; and based at least in part on the second condition being satisfied, transmitting, using the network interface, an additional signal to the second electronic device, the additional signal including an additional command to activate at least the second light emitter.

In another embodiment of the seventh aspect, further comprising instructions that, when executed by the one or more processors, cause the one or more processors to perform operations comprising, based at least in part on the first condition being satisfied, transmitting, using the network interface, an additional signal to the second electronic device, the additional signal including an additional command to activate at least the second light emitter.

In another embodiment of the seventh aspect, further comprising instructions that, when executed by the one or more processors, cause the one or more processors to perform operations comprising: receiving, using the network interface, additional sensor data generated by the sensor; determining, using the additional sensor data, that the first condition is no longer satisfied; based at least in part on the first condition no longer being satisfied, transmitting, using the network interface, an additional signal to the first electronic device, the additional signal including an additional command to deactivate at least the first light emitter.

In another embodiment of the seventh aspect, the first electronic device includes a first transformer and the second electronic device includes a second transformer.

In another embodiment of the seventh aspect, the first electronic device includes a first ballast and the second electronic device includes a second ballast In another embodiment of the seventh aspect, the first electronic device includes a first light-emitting diode driver and the second electronic device includes a second light-emitting diode driver.

In another embodiment of the seventh aspect, wherein: the first condition indicates a first period of time; the second condition indicates a second period of time; and the determining that the first condition is satisfied comprises determining, using the sensor data, that a current time is within the first period of time.

In another embodiment of the seventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that an additional current time is within the second period of time; and transmitting, using the network interface, an additional signal to the second electronic device, the additional signal including an additional command to activate at least the second light emitter.

In another embodiment of the seventh aspect, wherein: the first condition indicates a first light threshold; the second condition indicates a second light threshold; and the determining that the first condition is satisfied comprises determining, using the sensor data, that an amount of ambient light is below the first light threshold.

In another embodiment of the seventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that an additional amount of ambient light is below the second light threshold; and transmitting, using the network interface, an additional signal to the second electronic device, the additional signal including an additional command to activate at least the second light emitter.

In another embodiment of the seventh aspect, wherein: the first condition indicates that first motion is detected by the sensor; the second condition indicates that second motion is detected by an additional sensor; and the determining that the first condition is satisfied comprises determining, using the sensor data, that the first sensor detected the first motion.

In another embodiment of the seventh aspect, further comprising instructions that, when executed by the one or more processors, cause the one or more processors to perform operations comprising: receiving, using the network interface, additional sensor data generated by the additional sensor; determining, using the additional sensor data, that the additional sensor detected the second motion; and transmitting, using the network interface, an additional signal to the second electronic device, the additional signal including an additional command to activate at least the second light emitter.

In another embodiment of the seventh aspect, the first condition indicates at least one of a first period of time, a first light threshold, or first motion detected by the sensor, and the second condition indicates at least one of a second period of time, a second light threshold, or second motion detected by an additional sensor.

In another embodiment of the seventh aspect, further comprising instructions that, when executed by the one or more processors, cause the one or more processors to perform operations comprising: receiving, using the network interface, fifth data indicating a third condition for causing the first electronic device to activate at least a third light emitter; determining that the third condition is satisfied; based at least in part on the third condition being satisfied, transmitting, using the network interface, an additional signal to the first electronic device, the additional signal including an additional command to activate at least the third light emitter.

In an eighth aspect, a method comprises: receiving, by a network device, first data indicating a first condition for causing an electronic device to activate at least a first light emitter connected to the electronic device; storing, by the network device, second data associating the first condition with at least the first light emitter; receiving, by the network device, third data indicating a second condition for causing the electronic device to activate at least a second light emitter connected to the electronic device; storing, by the network device, fourth data associating the second condition with at least the second light emitter; receiving, by the network device, first sensor data generated by a first sensor; determining, by the network device and using the first sensor data, that the first condition is satisfied; based at least in part on the first condition being satisfied, transmitting, by the network device, a first signal to the electronic device, the first signal including a first command to activate at least the first light emitter; receiving, by the electronic device, the first signal from the network device; causing, by the electronic device and based at least in part on the first signal, at least the first light emitter to emit first light; receiving, by the network device, second sensor data generated by at least one of the first sensor or a second sensor; determining, by the network device and using the second sensor data, that the second condition is satisfied; based at least in part on the second condition being satisfied, transmitting, by the network device, a second signal to the electronic device, the second signal including a second command to activate at least the second light emitter; receiving, by the electronic device, the second signal from the network device; and causing, by the electronic device and based at least in part on the second signal, at least the second light emitter to emit second light.

In an embodiment of the eighth aspect, the method further comprising: receiving, by the network device, third sensor data generated by the first sensor; determining, by the network device and using the third sensor data, that the first condition is no longer satisfied; based at least in part on the first condition no longer being satisfied, transmitting, by the network device, a third signal to the electronic device, the third signal including a third command to deactivate at least the first light emitter; receiving, by the electronic device, the third signal from the network device; causing, by the electronic device and based at least in part on the third signal, at least the first light emitter cease emitting the first light; receiving, by the network device, fourth sensor data generated by at least one of the first sensor or the second sensor; determining, by the network device and using the fourth sensor data, that the second condition is no longer satisfied; based at least in part on the fourth condition no longer being satisfied, transmitting, by the network device, a fourth signal to the electronic device, the fourth signal including a fourth command to deactivate at least the second light emitter; receiving, by the electronic device, the fourth signal from the network device; and causing, by the electronic device and based at least in part on the fourth signal, at least the second light emitter to cease emitting the second light.

In another embodiment of the eighth aspect, the electronic device includes at least one of a transformer, a ballast, or a light emitting diode (LED) driver.

In another embodiment of the eighth aspect, wherein: at least the first light emitter is connected to a first terminal of the electronic device; the causing the at least the first light emitter to emit the first light comprises causing, by the electronic device, first power to be provided to the first terminal; at least the second light emitter is connected to a second terminal of the electronic device; and the causing the at least the second light emitter to emit the second light comprises causing, by the electronic device, second power to be provided to the second terminal.

In another embodiment of the eighth aspect, the method further comprising: receiving, by the electronic device, power from an external power source at a first voltage; and causing, by the electronic device, the power to be converted from the first voltage to a second voltage; the causing the at least the first light emitter to emit the first light comprises causing, by the electronic device, the power at the second voltage to be provided to the first light emitter, and the causing the at least the second light emitter to emit the second light comprises causing, by the electronic device, the power at the second voltage to be provided to the second light emitter.

In another embodiment of the eighth aspect, the method further comprising: receiving, by the network device, fifth data indicating a third condition for causing an additional electronic device to activate at least a third light emitter connected to the additional electronic device; storing, by the network device, sixth data associating the third condition with at least the third light emitter; determining, by the network device, that the third condition is satisfied; based at least in part on the third condition being satisfied, transmitting, by the network device, a third signal to the electronic device, the third signal including a third command to activate at least the third light emitter; receiving, by the additional electronic device, the third signal from the network device; causing, by the additional electronic device and based at least in part on the third signal, at least the third light emitter to emit third light;

In a tenth aspect, a method comprising: receiving, by a network device, first data indicating a first condition for causing an electronic device to activate at least a first light emitter; receiving, by the network device, second data indicating a second condition for causing the electronic device to activate at least a second light emitter; receiving, by the network device, sensor data generated by a sensor; determining, by the network device and using the sensor data, that the first condition is satisfied; and based at least in part on the first condition being satisfied, transmitting, by the network device, a signal to the electronic device, the signal including a command to activate at least the first light emitter.

In an embodiment of the tenth aspect, the method further comprising: receiving, by the network device, additional sensor data generated by at least one of the first sensor or an additional sensor; determining, by the network device and using the additional sensor data, that the second condition is satisfied; and based at least in part on the second condition being satisfied, transmitting, by the network device, an additional signal to the electronic device, the additional signal including an additional command to activate at least the second light emitter.

In an embodiment of the tenth aspect, the electronic device includes a transformer.

In an embodiment of the tenth aspect, the electronic device includes at least one of a ballast or a light-emitting diode driver.

In an embodiment of the tenth aspect, wherein: at least the first light emitter is connected to a first terminal of the electronic device; at least the second light emitter is connected to a second terminal of the electronic device; and the causing the at least the first light emitter to emit the first light comprises causing, by the electronic device, power to be provided to the first terminal.

In an embodiment of the tenth aspect, the method further comprising: receiving, by the network device, third data indicating a third condition for causing an additional electronic device to activate at least a third light emitter; determining, by the network device, that the third condition is satisfied; and based at least in part on the third condition being satisfied, transmitting, by the network device, an additional signal to the additional electronic device, the additional signal including an additional command to activate at least the third light emitter.

In an eleventh aspect, a network device comprises: a network interface; one or more processors; and one or more non-transitory computer-readable media storing instructions that, when executed by the one or more processors, cause the one or more processors to perform operations comprising: receiving, using the network interface, first data indicating a first condition for causing an electronic device to activate a first light emitter; receiving, using the network interface, second data indicating at least one of the first condition or a second condition, the at least one of the first condition or the second condition for causing a second light emitter to activate; receiving, using the network interface, sensor data generated by a sensor; determining, using the sensor data, that the first condition is satisfied; and based at least in part on the first condition being satisfied, transmitting, using the network interface, a signal to the electronic device, the signal including a command to activate the first light emitter.

In an embodiment of the eleventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that the second condition is satisfied; and based at least in part on the second condition being satisfied, transmitting, using the network interface, an additional signal to the electronic device, the additional signal including an additional command to activate the second light emitter.

In another embodiment of the eleventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that the second condition is satisfied; and based at least in part on the second condition being satisfied, transmitting, using the network interface, an additional signal to the second light emitter, the additional signal including an additional command to activate.

In another embodiment of the eleventh aspect, further comprising instructions that, when executed by the one or more processors, cause the one or more processors to perform operations comprising: receiving, using the network interface, additional sensor data generated by at least one of the sensor or an additional sensor; determining, using the additional sensor data, that the second condition is satisfied; and based at least in part on the second condition being satisfied, transmitting, using the network interface, an additional signal to an additional electronic device, the additional signal including an additional command to activate the second light emitter.

In another embodiment of the eleventh aspect, further comprising instructions that, when executed by the one or more processors, cause the one or more processors to perform operations comprising: receiving, using the network interface, additional sensor data generated by the sensor; determining, using the additional sensor data, that the first condition is no longer satisfied; based at least in part on the first condition no longer being satisfied, transmitting, using the network interface, an additional signal to the electronic device, the additional signal including an additional command to deactivate at least the first light emitter.

In another embodiment of the eleventh aspect, wherein: the first condition indicates a period of time; and the determining that the first condition is satisfied comprises determining, using the sensor data, that a current time is within the period of time.

In another embodiment of the eleventh aspect, wherein: the first condition indicates a light threshold; and the determining that the first condition is satisfied comprises determining, using the sensor data, that an amount of ambient light is below the light threshold.

In another embodiment of the eleventh aspect, wherein: the first condition indicates that motion is detected by the sensor; and the determining that the first condition is satisfied comprises determining, using the sensor data, that the sensor detected the first motion.

BRIEF DESCRIPTION OF THE DRAWINGS

The various embodiments of the present disclosure are directed to electronic devices for controlling lights, which will now be discussed in detail with an emphasis on highlighting the advantageous features. These embodiments depict the novel and non-obvious embodiments of electronic devices for controlling lights, as shown in the accompanying drawings, which are for illustrative purposes only. These drawings include the following figures, in which like numerals indicate like parts.

DETAILED DESCRIPTION

Figure 1:
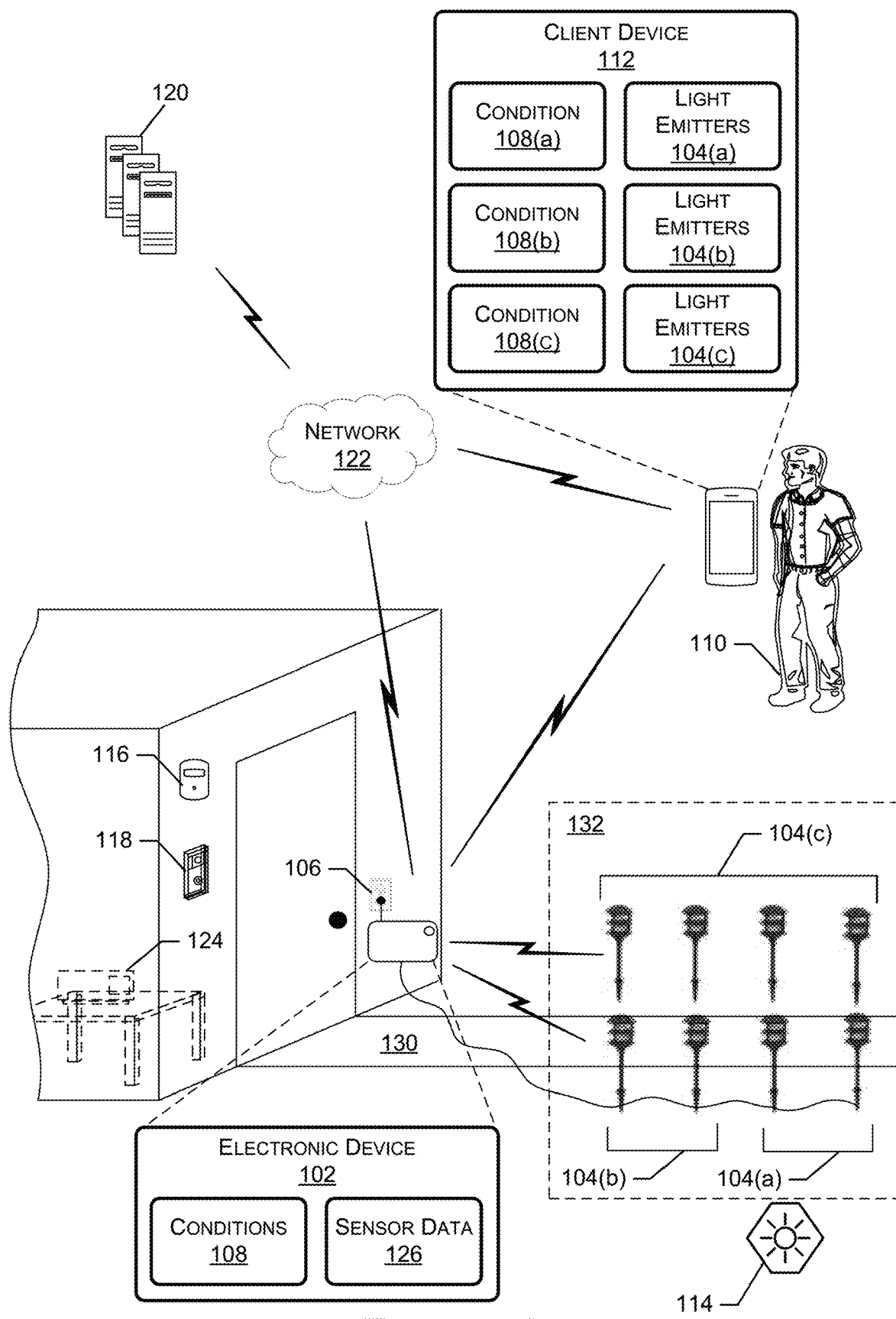
FIG. 1 is a schematic diagram of an example of coordinating the control of lights using an electronic device, according to various aspects of the present disclosure.

The present disclosure describes, in part, an electronic device that is capable of coordinating the control of various types of lights. For example, the electronic device may include terminals that are configured to connect to, and provide power to, various types of light emitters. In some examples, to provide power to the light emitters, the electronic device receives power from an external power source and provides the power to the light emitters. For a first example, where the light emitters include at least one low-voltage light emitter (e.g., halogen light emitters, xenon light emitters, incandescent light emitters, etc.), the electronic device may include a transformer that converts the power received from the external power source from a first voltage to a second voltage less than the first voltage. The electronic device may then provide the power at the second voltage to the low-voltage light emitters (e.g., as alternating current (AC)). For a second example, where the light emitters include at least one light emitting diode (LED) light emitter, the electronic device may include a LED driver that converts AC power received from the external power source (e.g., wall power, AC mains, etc.) to direct current (DC). Although in some examples, the LED drivers may not convert the AC current to DC current and may provide AC current to the LED light emitters. The electronic device may then provide the power to the LED light emitters (e.g., as constant current or constant voltage). For a third example, where the light emitters include at least one fluorescent light emitter, the electronic device may include a ballast for supplying power to the fluorescent light emitter. Although in some examples, the ballast may be a component of the fluorescent light emitter itself. In either example, the electronic device may provide the to the fluorescent light emitters. Additionally, or alternatively, in some examples, to provide power to the light emitters, the electronic device may include an internal power source, such as a battery, that the electronic device uses to provide the power to the light emitters. In such examples, the internal power source may be rechargeable, such as by a solar panel or energy harvesting apparatus of the electronic device.

The various types of light emitters that are powered by the electronic device may include at least a first type of light emitter and a second type of light emitter. The first type of light emitter may be activated (e.g., turned on) by the electronic device providing the power via a terminal or connector. For examples, the electronic device may apply power from the external power source (e.g., as stepped down to the second voltage, as DC power, as AC power, etc.) to the terminal or connector of the electronic device to cause the first type of light emitter (e.g., a single light emitter, a string of light emitters, etc.) to emit light. In some examples, to activate the first type of light emitter, the electronic device may cause a switch (e.g., a single pole, single throw (SPST) switch, a single pole, double throw (SPDT) switch, a double pole, double throw (DPDT) switch, a multi pole, multi throw (XPYT) switch, etc.) to move from a first position to a second position (e.g., place a SPST switch into a closed position), where the terminal provides power to the first type of light emitter while the switch is in the second position. To deactivate (e.g., turn off) the first type of light emitter, the electronic device may move the switch back to the first position (e.g., place the SPST switch into an open position), where the terminal ceases providing the power to the first type of light emitter while the switch is in the second position. The second type of light emitter may be activated by the electronic device using signals transmitted by the electronic device. For example, the electronic device may transmit a first signal to the second type of light emitter, where the first signal includes a first command that causes the second type of light emitter to activate (e.g., turn on) using the power that is being provided by the electronic device. Additionally, the electronic device may transmit a second signal to the second type of light emitter, where the second signal includes a second command that causes the second type of light emitter to deactivate (e.g., turn off).

The electronic device may further be configured to connect to a third type of light emitter. The third type of light emitter may receive power from a power source that is external from the electronic device. For example, the third type of light emitter may receive power from a battery included within the third type of light emitter. To connect to the third type of light emitter, the electronic device may be configured to transmit signals to the third type of light emitter, where the signals are configured to control the operation third type of light emitter. For example, the electronic device may transmit a first signal to the third type of light emitter, where the first signal includes a first command that causes the third type of light emitter to activate (e.g., turn on) using the power source that is external to the electronic device. Additionally, the electronic device may transmit a second signal to the third type of light emitter, where the second signal includes a second command that causes the third type of light emitter to deactivate (e.g., turn off).

In some examples, the electronic device controls the light emitters (e.g., the first type of light emitters, the second type of light emitters, the third type of light emitters) according to one or more conditions set by a user and/or default conditions. The conditions may include, but are not limited to, a period of time, an amount of light, motion detection, and/or the like. The period of time may include a first time for activating (e.g., turning on) light emitter(s) and a second time for deactivating (e.g., turning off) the light emitter(s). In some examples, each of the first time and/or the second time may include day(s) of the year. For example, each of the first time and/or the second time may include, but are not limited to, January 12, May 14, October 19, and/or the like. Additionally, or alternatively, in some examples, each of the first time and/or the second time may include day(s) of the week. For example, each of the first time and/or the second time may include, but are not limited to, Monday, Tuesday, Wednesday, Thursday, and/or the like. Additionally, or alternatively, in some examples, each of the first time and/or the second time may include time(s) of the day. For example, each of the first time and/or the second time may include, but are not limited to, 4:00 a.m., 7:30 a.m., 8:00 p.m., and/or the like.

The amount of light may correspond a light threshold at which the electronic device activates light emitter(s) when an amount of ambient light does not exceed the light threshold and the electronic device deactivates the light emitters when the amount of ambient light exceeds the light threshold. In some examples, the amount of ambient light may be measured at the electronic device. For example, the electronic device may include a light sensor that measures the amount of ambient light. In some examples, the amount of ambient light may be measured at a different location. For example, a light sensor (which may be included in one of the light emitters, an A/V device, as a stand-alone device, and/or another type of device), that is external to the electronic device, may measure the amount of ambient light. The light sensor may then generate data indicating the amount of ambient light detected by the light sensor. In either example, the data may be transmitted to the electronic device.

The motion detection may correspond to motion being detected by one or more sensors. In some examples, at least one of the sensors may include a motion sensor of the electronic device. Additionally, or alternatively, in some examples, at least one of the sensors may be external to the electronic device. For a first example, a sensor may include camera and/or a motion sensor of an A/V device that monitors for motion located within a field of view of the A/V device. For a second example, a sensor may include a motion sensor of one of the light emitters. Still, for a third example, a sensor may include a motion sensor that is external to the electronic device and the light emitters, such as a stand-alone motion sensor and/or a motion sensor of a security system. When the sensor is external to the electronic device, the sensor may generate data indicating that the motion was detected by the sensor. In either example, the data may be transmitted to the electronic device.

In some examples, to set the one or more conditions, a client device associated with the user may receive input(s) indicating the one or more conditions. For example, the client device may receive a first input indicating a first condition (e.g., a period of time) for first light emitter(s), a second input indicating a second condition (e.g., an amount of ambient light) for second light emitter(s), and/or a third input indicating a third condition (e.g., motion detection) for third light emitter(s). Based on the input(s), the client device may then generate data indicating the one or more conditions. The client device may then transmit the data to the electronic device. The electronic device may receive the data from the client device and, in response, update settings associated with the light emitters being controlled by the electronic device.

Based on the settings, the electronic device may control the light emitters using the one or more conditions. For example, and using the example above where the client device receives the inputs indicating the three different conditions, the electronic device may obtain first sensor data associated with the first condition (e.g., sensor data indicating a current time). The electronic device may then use the first sensor data to determine that the first condition is satisfied (e.g., the current time is within the period of time). In response, the electronic device may cause the first light emitter(s) to activate. Additionally, the electronic device may obtain second sensor data associated with the second condition (e.g., sensor data indicating an amount of ambient light). The electronic device may then use the second sensor data to determine that the second condition is satisfied (e.g., the amount of ambient light does not exceed the light threshold). In response, the electronic device may cause the second light emitter(s) to activate. Furthermore, the electronic device may obtain third sensor data associated with the third condition (e.g., sensor data indicating that motion was detected by a sensor). The electronic device may then use the third sensor data to determine that the third condition is satisfied (e.g., the sensor detected motion). In response, the electronic device may cause the third light emitter(s) to activate.

In some examples, the electronic device may utilize different types of network connections to communicate with various devices. For example, the electronic device may utilize a first type of network connection to communicate with the client device, a second type of network connection to communicate with the light emitters, and a third type of network connection to communicate with other devices (e.g., a backend server, a hub device, the client device, etc.). In some examples, a network connection (e.g., the first type of network connection, the second type of network connection, and/or the third type of network connection) may include a short-range network connection. For example, the network connection may include, but is not limited to, Bluetooth (e.g., BLE), Zigbee, Z-wave, and/or the like. In some examples, a network connection (e.g., the first type of network connection, the second type of network connection, and/or the third type of network connection) may include a long-range network connection. For example, the network connection may include, but is not limited to, Wi-Fi, LTE, and/or the like. Still, in some examples, a network connection (e.g., the first type of network connection, the second type of network connection, and/or the third type of network connection) may include a low power wide-area network (LPWAN). For example, the network connection may include, but is not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

In some example, a network device (e.g., a backend server, a hub device, an A/V device, and/or another type of device) may control multiple electronic devices according to various conditions (which may be similar to the conditions described above). For example, the network device may receive data from the client device, where the data indicates conditions for electronic devices. For a first example, the data may indicate a first condition for a first electronic device that activates first light emitter(s) and a second condition for a second electronic device that activates second light emitter(s). For a second example, the data may indicate a first condition for a first electronic device, where the first condition is associated with first light emitter(s) that are activated by the first electronic device, a second condition for the first electronic device, where the second condition is associated with second light emitter(s) that are activated by the first electronic device, and a third condition for a second electronic device that activates third light emitter(s). In either of the examples, the network device may store the data. For example, the network device may update settings associated with the electronic devices.

The network device may then receive sensor data generated by one or more sensors. Using the sensor data, the network device may determine that the conditions are satisfied and, in response, cause the electronic devices to activate the light emitters. For example, and using the second example from above, the network device may use the sensor data to determine that the first condition is satisfied. Based on the first condition being satisfied, the network device may transmit a first signal to the first electronic device, where the first signal includes a first command to activate the first light emitter(s). Additionally, the network device may use the sensor data to determine that the second condition is satisfied. Based on the second condition being satisfied, the network device may transmit a second signal to the first electronic device, where the second signal includes a second command to activate the second light emitter(s). Furthermore, the network device may use the sensor data to determine that the third condition is satisfied. Based on the third condition being satisfied, the network device may transmit a third signal to the second electronic device, where the third signal includes a third command to activate the third light emitter(s).

In some examples, the network device may receive additional sensor data generated by one or more sensors. Using the additional sensor data, the network device may determine that the conditions are no longer satisfied and, in response, cause the electronic devices to deactivate the light emitters. For example, and again using the second example from above, the network device may use the additional sensor data to determine that the first condition is no longer satisfied. Based on the first condition no longer being satisfied, the network device may transmit a fourth signal to the first electronic device, where the fourth signal includes a fourth command to deactivate the first light emitter(s). Additionally, the network device may use the additional sensor data to determine that the second condition is no longer satisfied. Based on the second condition no longer being satisfied, the network device may transmit a fifth signal to the first electronic device, where the fifth signal includes a fifth command to deactivate the second light emitter(s). Furthermore, the network device may use the additional sensor data to determine that the sixth condition is no longer satisfied. Based on the sixth condition no longer being satisfied, the network device may transmit a sixth signal to the second electronic device, where the sixth signal includes a sixth command to deactivate the third light emitter(s).

As described herein, a light emitter may include any device that includes a light source that is capable of emitting light. For example, a light source may include, but is not limited to, a light bulb, a lamp, a laser, a light emitting diode (LED), and/or any other source that is capable of emitting light. Additionally, as described herein, activating a light emitter may include changing a state of the light source from an off state to an on state. For example, activating the light emitter may include providing power to the light source in order to cause the light source to emit light. Furthermore, deactivating a light emitter may include changing a state of the light emitter from an on state to an off state. For example, deactivating the light source may include ceasing from providing power to the light source in order to cause the light source to stop emitting light. In other examples, activating the light emitter(s) to emit light may relate to changing the type of light output by the light emitter(s). For example, activating a light emitter may include a first activation type where the light emitter is powered on to emit light at a first intensity, first color, first brightness, first pattern (e.g., constant light, flickering, pulsating, chirping, etc.), and/or the like, and a second activation type where the light emitter is powered on to emit light at a second intensity, second color, second brightness, and/or the like. In an example, a first light emitter may be powered on to emit light at a low light level during evening hours (e.g., with reference to the first condition described above, based on time, and/or with reference to the second condition described above, based on ambient light levels), and may be powered on to emit light at higher light level than the low light level during the same evening hours when motion is detected by at least one motion sensor (e.g., with reference to the third condition described above, based on motion data).

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example of coordinating the control of lights using an electronic device 102. For example, the electronic device 102 may include terminals that are configured to connect to, and provide power to, various types of light emitters 104(a)-(b). In some examples, to provide power to the light emitters 104(a)-(b), the electronic device 102 receives power from an external power source 106 and provides the power to the light emitters 104(a)-(b). For instance, the electronic device 102 may include transformer that converts the power from the external power source 106 from a first voltage to a second, lower voltage. The electronic device 102 may then provide the power at the second voltage to the light emitters 104(a)-(b). For a second example, where the light emitters 104(a)-(b) include at least one light emitting diode (LED) light emitter, the electronic device 102 may include a LED driver that converts AC power received from the external power source 106 to direct current (DC). Although in some examples, the LED drivers may not convert the AC current to DC current and may provide AC current to the LED light emitters 104(a)-(b). The electronic device 102 may then provide the power to the LED light emitters 104(a)-(b) (e.g., as constant current or constant voltage). For a third example, where the light emitters 104(a)-(b) include at least one fluorescent light emitter, the electronic device 102 may include a ballast for supplying power to the fluorescent light emitter 104(a)-(b). Although in some examples, the ballast may be a component of the fluorescent light emitter 104(a)-(b) itself. In either example, the electronic device 102 may provide the to the fluorescent light emitters 104(a)-(b). Additionally, or alternatively, in some examples, to provide power to the light emitters 102(a)-(b), the electronic device 102 may include an internal power source, such as a battery, that the electronic device 102 uses to provide the power to the light emitters 104(a)-(b). In such examples, the internal power source may be rechargeable, such as by a solar panel or energy harvesting apparatus of the electronic device 102

The light emitters 104(a)-(b) that are powered by the electronic device 102 may include at least a first type of light emitter 104(a) and a second type of light emitter 104(b). The first type of light emitter 104(a) may be activated by the electronic device 102 providing the power via a terminal. For examples, the electronic device 102 may apply power from the external power source 106 (e.g., as stepped down to the second voltage, as DC power, as AC power, etc.) to the terminals or connectors of the electronic device 102 to cause the first type of light emitters 104(a) to emit light. In some examples, to activate the first type of light emitters 104(a), the electronic device 102 may cause a switch (e.g., a single pole, single throw (SPST) switch, a single pole, double throw (SPDT) switch, a double pole, double throw (DPDT) switch, a multi pole, multi throw (XPYT) switch, etc.) to move from a first position to a second position (e.g., place a SPST switch into a closed position), where the terminal provides power to the first type of light emitters 104(a) while the switch is in the second position. To deactivate the first type of light emitter 104(A), the electronic device 102 may move the switch back to the first position, where the terminal ceases providing the power to the first type of light emitter 104(a) while the switch is in the second position. The second type of light emitter 104(b) may be activated by the electronic device 102 using signals transmitted by the electronic device 102. For example, the electronic device 102 may transmit a first signal to the second type of light emitter 104(b), where the first signal is configured to cause the second type of light emitter 104(b) to activate using the power that is being provided by the electronic device 102. Additionally, the electronic device 102 may transmit a second signal to the second type of light emitter 104(b), where the second signal is configured to cause the second type of light emitter 104(b) to deactivate.

The electronic device 102 may further be configured to connect to a third type of light emitter 104(c). The third type of light emitter 104(c) may receive power from a power source that is external from the electronic device 102. For example, the third type of light emitter 104(c) may receive power from a battery included within the third type of light emitter 104(c), from wall power (AC mains), etc. To connect to the third type of light emitter 104(c), the electronic device 102 may be configured to transmit signals to the third type of light emitter 104(c), where the signals are configured to control the operation of the third type of light emitter 104(c). For example, the electronic device 102 may transmit a first signal to the third type of light emitter 104(c), where the first signal is configured to cause the third type of light emitter 104(c) to activate using the power source that is external to the electronic device 102. Additionally, the electronic device 102 may transmit a second signal to the third type of light emitter 104(c), where the second signal is configured to cause the third type of light emitter 104(c) to deactivate.

In some examples, the electronic device 102 controls the light emitters 104 according to conditions 108 that may be set by a user 110. The condition(s) 108 may include, but are not limited to, a period of time, an amount of light, motion detection, and/or the like. For example, such as while the user 110 is configuring the light emitters 104, the user 110 may use a client device 112 to set a first condition 108 for the first type of light emitters 104(a). The first condition 108 may include a period of time, such as between 7:00 p.m. and 7:00 a.m. each day. Additionally, the user 110 may use the client device 112 to set a second condition 108 for the second type of light emitters 104(b). The second condition 108 may include an amount of light detected by a light sensor, such as a light sensor 114 (which, in some examples, may be included on the electronic device 102). Furthermore, the user 110 may use the client device 112 to set a third condition 108 for the third type of light emitters 104(c). The third condition 108 may include motion being detected by a motion sensor 116 (and/or similarly, in some examples, an A/V device 118).

The client device 112 may then generate data indicating the conditions 108 set by the user 110 and/or identifiers associated with the light emitters 104. The client device 110 may then transmit the data to the electronic device 102. In some examples, the client device 112 may transmit the data directly to the electronic device 102. For example, the client device 112 may transmit the data using a short-range type of communication, such as Bluetooth, Zigbee, and/or the like. In some examples, the client device 112 may transmit the data a backend server 120 via a network 122. The backend server 120 may then transmit the data to the electronic device 102 via the network 122. Still, in some examples, the client device 112 and/or the backend server 120 may transmit the data to a hub device 124, which may be via the network 122. The hub device 124 may then transmit the data to the electronic device 102.

The electronic device 102 may then use the conditions 108 to control the light emitters 104. For example, at a first time, the electronic device 102 may receive first sensor data 126 indicating a current time, such as 7:00 p.m. Based on the first sensor data 126 indicating that the current time is within the period of time associated with the first condition 108(a) (e.g., the first condition 108(a) is satisfied), the electronic device 102 may cause the first type of light emitters 104(a) to activate by providing power via terminals. At a second time, the electronic device 102 may receive second sensor data 126 generated by the light sensor 114, where the second sensor data 126 indicates an amount of ambient light detected by the light sensor 114. The electronic device 102 may then determine that the amount of ambient light is below the light threshold associated with the second condition 108(b) (e.g., the second condition 108(b) is satisfied). Based on the determination, the electronic device 102 may transmit control signals to the second type of light emitters 104(b) that cause the second type of light emitters 104(b) to activate.

Additionally, at a third time, the electronic device 102 may receive third sensor data 126 generated by the motion sensor 116 (and/or similarly the A/V device 118). The third sensor data 126 may indicate that the motion sensor 116 (and/or similarly the A/V device 118) detected motion (e.g., the third condition 108(c) is satisfied). Based on the third sensor data 126 indicating that the motion sensor 116 (and/or similarly the A/V device 118) detected the motion, the electronic device 102 may transmit control signals to the third type of light emitters 104(c), where the control signals cause the third type of light emitters 104(c) to activate.

Furthermore, at a fourth time, the electronic device 102 may receive fourth sensor data 126 indicating a current time, such as 7:01 a.m. Based on the fourth sensor data 126 indicating that the current time is outside the period of time associated with the first condition 108(a) (e.g., the first condition is no longer satisfied), the electronic device 102 may cause the first type of light emitters 104(a) to deactivate by ceasing from providing the power via terminals. At a fifth time, the electronic device 102 may receive fifth sensor data 126 generated by the light sensor 114, where the fifth sensor data 126 indicates an amount of ambient light detected by the light sensor 114. The electronic device 102 may then determine that the amount of ambient light exceeds the light threshold associated with the second condition 108(b) (e.g., the second condition 108(b) is no longer satisfied). Based on the determination, the electronic device 102 may transmit control signals to the second type of light emitters 104(b) that cause the second type of light emitters 104(b) to deactivate.

Moreover, at a sixth time, the electronic device 102 may determine to deactivate the third type of light emitters 104(c). In some examples, the electronic device 102 may make the determination based on receiving sixth sensor data 126 from the motion sensor 116 (and/or similarly the A/V device 118) indicating that the motion sensor 116 (and/or similarly the A/V device 118) is no longer detecting motion. In some examples, the electronic device 102 may make the determination based on a threshold period of time elapsing since receiving the third sensor data 126. The threshold period of time may include, but is not limited to, five seconds, ten seconds, third seconds, and/or the like. In either of the examples, the electronic device 102 may transmit control signals to the third type of light emitters 104(c), where the control signals cause the third type of light emitters 104(c) to deactivate.

Even though the example of FIG. 1 describes the user 110 setting first conditions 108(a) for the first type of light emitters 104(a), second conditions 108(b) for the second type of light emitters 104(b), and third conditions 108(c) for the third type of light emitters 104(c), in some examples, the user 110 may set any number of conditions 108 for any combination of the light emitters 104. For a first example, the user 110 may set one condition 108 that is associated with each of the light emitters 104. For a second example, the user 110 may set a condition 108 for only a portion of the first type of light emitters 104(a) and a portion of the second type of light emitters 104(b). For a third example, the user may set a first condition 108 for the first type of light emitters 104(a) and the second type of light emitters 104(b), and set a second condition 108 for the third type of light emitters 104(c).

In some examples, the user 110 may set conditions 108(a) for zones at the property. For example, the zones may include a front yard zone, a side yard zone, a front walkway zone, a backyard zone, an outdoor zone, an indoor zone, and/or the like. In such examples, the user 110 may select one or more light emitters from one of, from two of, or from any number of the different types of light emitter 104(a)-104(c) that are to be included within each zone. For example, and with reference to the walkway 130 and the front yard 132 of FIG. 1, the user 110 may set a front yard zone. The user 110 may associate at least one light emitter of each of the types of light emitters 104(a)-104(c) with the front yard zone, because the front yard 132 may include each of the types of light emitters 104(a)-104(c). The user 110 may then set at least one condition 108 for the front yard zone. For an example, the user 110 may set a condition 108 for activating the lights of the front yard zone when the ambient light levels are below a threshold light level. As such, when the electronic device 102 determines that the ambient light levels are below the threshold (e.g., as determined by a light sensor internal to or external to the electronic device 102), the electronic device 102 may supply power to at least one terminal of the electronic device (e.g., by closing a switch) for powering the first type of light emitters 104(a), transmit a signal to the second type of light emitters 104(b) to draw power from the wired power supply to emit light, and may transmit a signal to the third type of light emitters 104(c) to draw power from an internal power supply to emit light. As a result, each of the types of light emitters 104(a)-104(c) in the front yard may begin to emit light at the same time, or near the same time, based on the front yard zone.

In some examples, a network device (e.g., the backend server 120, the hub device 124, and/or the A/V device 118) may control multiple electronic devices (even though only one electronic device 102 is shown in the example of FIG. 1) according to various conditions (which may be similar to the conditions 108). For example, the network device may receive data from the client device 112, where the data indicates conditions for electronic devices. For a first example, the data may indicate a first condition for the electronic device 102 that activates the light emitters 104 and a second condition for a second electronic device (not shown) that activates second light emitters (not shown). For a second example, the data may indicate a first condition for the electronic device 102, where the first condition is associated with the light emitters 104(a)-(b) that are activated by the electronic device 102, a second condition for the electronic device 102, where the second condition is associated with the light emitters 104(c) that are activated by the electronic device 102, and a third condition for a second electronic device (not shown) that activates second light emitters (not shown). In either of the examples, the network device may store the data. For example, the network device may update settings associated with the electronic devices 102.

The network device may then receive sensor data generated by one or more sensors (e.g., motion sensor(s) and/or light sensor(s) of the A/V device 210, the motion sensor 116, the light sensor 114, etc.). Using the sensor data, the network device may determine that the conditions are satisfied and, in response, cause the electronic devices to activate the light emitters. For example, and using the second example from above, the network device may use the sensor data to determine that the first condition is satisfied. Based on the first condition being satisfied, the network device may transmit a first signal to the electronic device 102, where the first signal includes a first command to activate the light emitters 104(a)-(b). Additionally, the network device may use the sensor data to determine that the second condition is satisfied. Based on the second condition being satisfied, the network device may transmit a second signal to the electronic device 102, where the second signal includes a second command to activate the second light emitters 104(c). Furthermore, the network device may use the sensor data to determine that the third condition is satisfied. Based on the third condition being satisfied, the network device may transmit a third signal to the second electronic device, where the third signal includes a third command to activate the second light emitters.

In some examples, the network device may receive additional sensor data generated by the one or more sensors. Using the additional sensor data, the network device may determine that the conditions are no longer satisfied and, in response, cause the electronic devices to deactivate the light emitters. For example, and again using the second example from above, the network device may use the additional sensor data to determine that the first condition is no longer satisfied. Based on the first condition no longer being satisfied, the network device may transmit a fourth signal to the electronic device 102, where the fourth signal includes a fourth command to deactivate the light emitters 104(a)-(b). Additionally, the network device may use the additional sensor data to determine that the second condition is no longer satisfied. Based on the second condition no longer being satisfied, the network device may transmit a fifth signal to the electronic device 102, where the fifth signal includes a fifth command to deactivate the light emitters 104(c). Furthermore, the network device may use the additional sensor data to determine that the sixth condition is no longer satisfied. Based on the sixth condition no longer being satisfied, the network device may transmit a sixth signal to the second electronic device, where the sixth signal includes a sixth command to deactivate the second light emitters.

In some examples, the network device may transmit signals directly to the light emitter 104 (e.g., the second type of light emitters 104(b) and/or the third type of light emitters 104(c)) based on determining that conditions 108 (e.g., the first condition 104(a) and/or the second condition 104(b)) are satisfied. For example, based on determining that the second condition 108(b) is satisfied, the network device may transmit a first signal to the second type of light emitters 108(b), where the first signal includes a first command that causes the second type of light emitters 108(b) to activate. Additionally, based on determining that the third condition 108(c) is satisfied, the network device may transmit a second signal to the third type of light emitters 104(c), where the second signal includes a second command that causes the third type of light emitters 104(c) to activate. Furthermore, based on determining that the second condition 108(b) is no longer satisfied, the network device may transmit a third signal to the second type of light emitters 108(b), where the third signal includes a third command that causes the second type of light emitters 108(b) to deactivate. Additionally, based on determining that the third condition 108(c) is no longer satisfied, the network device may transmit a fourth signal to the third type of light emitters 104(c), where the fourth signal includes a fourth command that causes the third type of light emitters 104(c) to activate.

Figure 2:
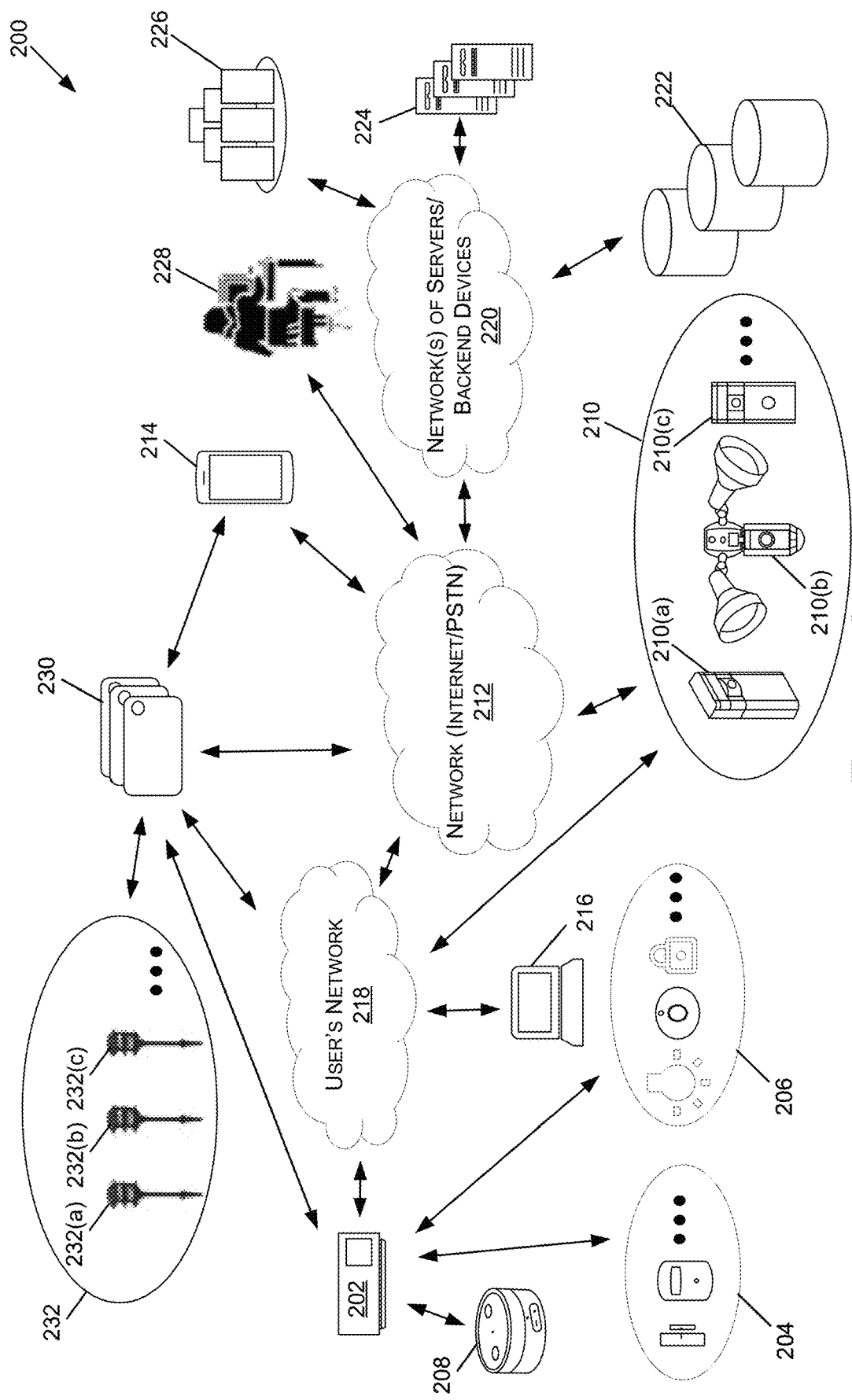
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, an electronic device 230, light emitters 232, etc.), when remotely monitored and controlled via a network (Internet/a public switched telephone network (PSTN)) 212 (which may be similar to, and represent the network 122), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, the electronic devices 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (which may represent, and be similar to, the A/V device 118) (which may alternatively be referred to herein as "A/V devices 210" or "A/V device 210"). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 4.

The system 200 may further include a smart-home hub device 202 (which may represent, and be similar to, the hub device 124) (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, the electronic devices 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the electronic devices 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, the electronic devices 230, the light emitters 232, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/ or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the electronic devices 230, the light emitters 232, or A/V devices 210. In some embodiments, the VA device 208 is configured to process user inputs (e.g., voice commands) without transmitting information to the network of servers/ backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 206 may include, for example, at least one of an outdoor lighting system, an indoor lighting system, and indoor/outdoor lighting system, a temperature control system (e.g., a thermostat), a shade/ blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic devices 230 and/or the light emitters 232 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 214, 216, the A/V device(s) 210, the smart-home hub device 202, the VA device 208, the sensors 204, the automation devices 206, the electronic devices 230, and/or the light emitters 232 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 112). The client devices 214, 216 may communicate with and/or be associated with (e.g., capable of access to and control of) the A/V devices 210, a smart-home hub device 202, the VA device 208, sensors 204, automation devices 206, and/or the electronic devices 230. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the electronic devices 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220 (and/or the user's network 218) (and/or the network (Internet PSTCN) 212) may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34b is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, the electronic device 230, the A/V devices 210, any of the components of the network(s) of servers/backend devices 220 (e.g., the backend server 224, the backend API 226, the storage devices 222, etc.), and/or any other electronic device may be referred to herein as a "network device" or "network devices".

With further reference to FIG. 2, the system 200 may also include a security monitoring service 228. The security monitoring service 228 may be operated by the same company that manufactures, sells, and/or distributes the A/V devices 210, the hub device 202, the VA device 208, the electronic devices 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the electronic devices 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, turn on and off one or more of the light emitters 232, etc.). For example, the security monitoring service 228 may operate and control their own client devices and/or network of servers/backend devices for monitoring and/or controlling security systems. In such an example, the A/V devices 210, the hub device 202, the VA device 208, the electronic devices 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The system 200 may also include the electronic devices 230 (which may represent, and/or be similar to, the electronic device 102). The electronic devices 230 may be configured to control the light emitters 232 (which may represent, and/or be similar to, the light emitters 104) using conditions set by a user. The light emitters 232 may include at least a first type of light emitter 232(*a*) (which may represent, and/or be similar to, the first type of light emitter 104(*a*)), a second type of light emitter 232(*b*) (which may represent, and/or be similar to, the second type of light emitter 104(*b*)), and a third type of light emitter 232(*c*) (which may represent, and/or be similar to, the third type of light emitter 104(*c*)). The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

For example, the first type of light emitters 232(*a*) may be configured to receive power from the electronic devices 230. To control the first type of light emitters 232(*a*), the electronic devices 230 may begin to provide power to the first type of light emitters 232(*a*) to activate the first type of light emitters 232(*a*) and cease providing the power the deactivate the first type of light emitters 232(*a*). Additionally, the second type of light emitters 232(*b*) may be configured to receive power from the electronic devices 230. To control the second type of light emitters 232(*b*), the electronic devices 230 may transmit first control signals to the second type of light emitters 232(*b*) that are configured to cause the second type of light emitters 232(*b*) to activate, and transmit second control signals to the second type of light emitters 232(*b*) that are configured to cause the second type of light emitters 232(*b*) to deactivate. Furthermore, the third type of light emitters 232(*c*) may be configured to receive power from a source that is external to the electronic devices 230, such as a battery. To control the third type of light emitters 232(*c*), the electronic devices 230 may transmit first control signals to the third type of light emitters 232(*c*) that are configured to cause the third type of light emitters 232(*c*) to activate, and transmit second control signals to the third type of light emitter 232(*c*) that are configured to cause the third type of light emitters 232(*c*) to deactivate.

In some examples, the light emitters 232 may include a string of light emitters 232. For example, where referring to a first type of light emitter 232(*a*), the first type of light emitter 232(*a*) may include two or more light emitter(s) 232(*a*) connected together using a wire. In such an example, when the electronic device 230 begins providing power to the first type of light emitter 232(*a*), the power is provided to each of the two or more light emitter(s) 232(*a*) connected together within the string of light emitter(s) 232(*a*). Additionally, when referring to a second type of light emitter 232(*b*), the second type of light emitter 232(*b*) may include two or more light emitter(s) 232(*b*) connected together using a wire. The electronic device 230 may continuously be providing power to each of the two or more light emitter(s) 232(*b*), but activate and/or deactivate the two or more light emitter(s) 232(*b*) using signals, as described herein.

Figure 3:
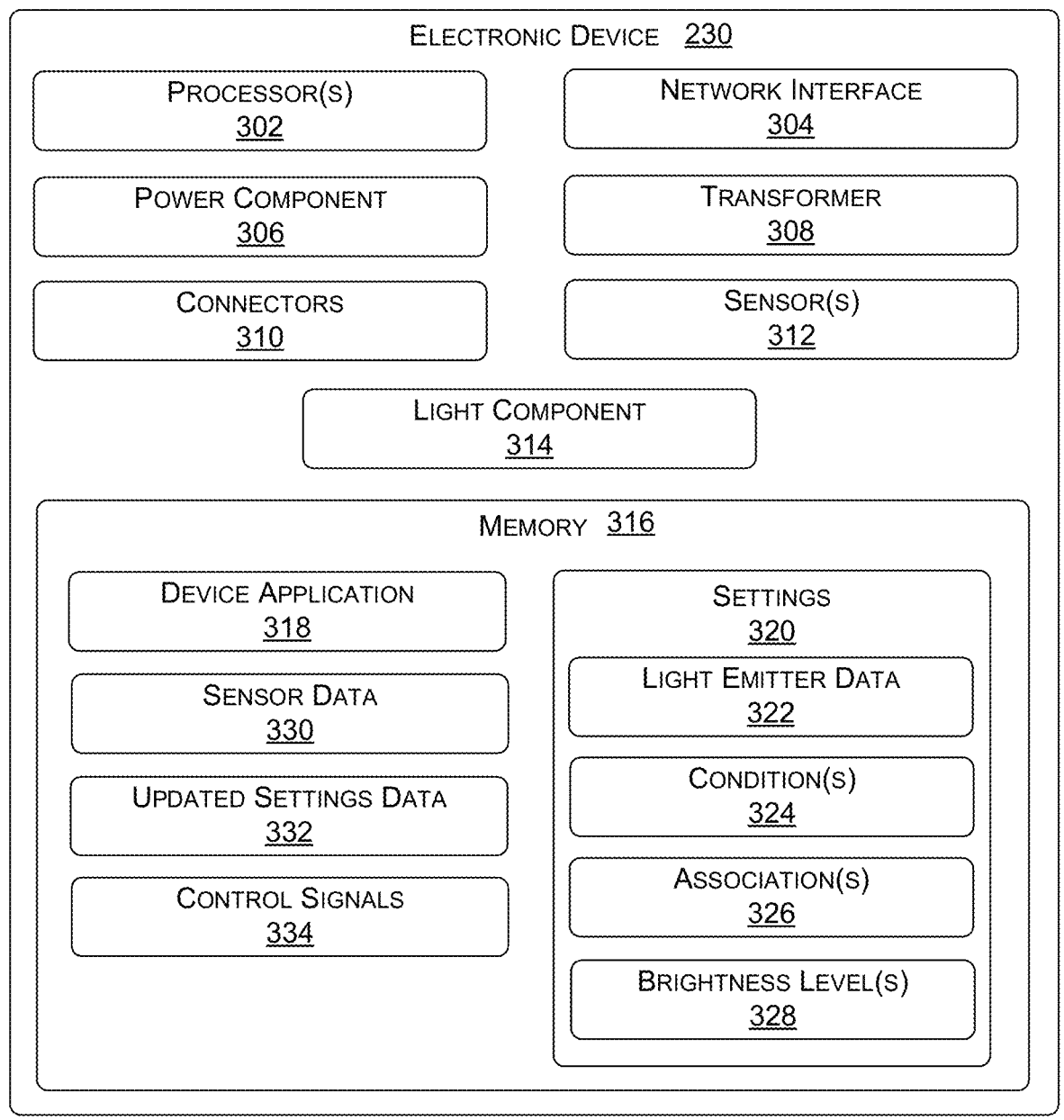
FIG. 3 is a functional block diagram illustrating one example embodiment of an electronic device, according to various aspects of the present disclosure.

FIG. 3 is a functional block diagram illustrating one example embodiment of an electronic device 230, according to various aspects of the present disclosure. The electronic device 230 includes processor(s) 302, a network interface 304, a power component 306, a transformer 308, connectors 310, sensor(s) 312, a light component 314, and a memory 316. In some examples, the electronic device 230 may include additional components not illustrated in the example of FIG. 3. In some examples, the electronic device 230 may include less components than those illustrated in the example of FIG. 3. For example, the electronic device 230 may not include one or more of the transformer 308, the connectors 310, the sensor(s) 312, or the light component 314. As another example, in addition to, or alternatively from, the transformer 308, the electronic device 230 may include a ballast, an LED driver, or another type of power supply for supplying power to one or more light emitters.

In some embodiments, the components, features, and/or functionality of the electronic device 230 may be included as part of another device, such as the A/V device 210, a signaling device (e.g., a doorbell chime, a wireless speaker, such as a wireless speaker that includes a network extender for extending one or more networks, such as a Wi-Fi network), and/or the hub device 202.

For example, the electronic device 230 may be included within the A/V device 210 and/or the signaling device, or, in other words, the A/V device 210 and/or the signaling device may include the components, functionality, and/or features of the electronic device 230. In such embodiments, the A/V device 210 and/or the signaling device (acting as the electronic device 230) may not include the transformer, or any power supply for supplying power to hard-wired light emitters 232, but may only include the ability to communicate with the third type of light emitters described herein (e.g., light emitters 232 that are controlled wirelessly and/or are powered via an alternate power source other than the electronic device 230). For example, the A/V device 210 and/or signaling device, in such embodiments, may communicate with one or more light emitters 232 over Bluetooth, BLE, Z-wave, ZigBee, an LPWAN, and/or the like. The A/V device 210 and/or signaling device (acting as the electronic device 230) may receive the settings 320, the sensor data 330, the control signal 334, the updated settings data 332, and/or any other data via one or more of the hub device 202, the backend server 224, and/or the client device(s) 214, 216.

In another example, the electronic device 230 may be included within the hub device 202, or, in other words, the hub device 202 may include the components, functionality, and/or features of the electronic device 230. In such embodiments, as described herein, the hub device 202 may include the similar components, functionality, and/or features as described above with respect to the A/V device 210 and/or the signaling device acting as the electronic device 230, and/or may include each of the components, features, and/or functionality of the electronic device 230 described herein (e.g., the transformer 308, the connectors 310, the light component 314, etc.). As such, the hub device 202 may be operable to supply power to one or more light emitters 232 via the connectors 310 and/or communicate with one or more light emitters 232 wirelessly. In other words, the hub device 202 may include the capability to communicate with and/or power each of the first type 232(a), second type 232(b), and third type 232(c) of light emitters 232.

The processor(s) 302 (alternatively referred to herein as a "CPU," a "controller," and/or a "microcontroller") may comprise an integrated circuit including a processor core, memory, and programmable input/output peripherals. The processor(s) 302 may receive input signals, such as data and/or power, from the network interface 304, the power component 306, the transformer 308, the connectors 310, the sensor(s) 312, the light component 314, and/or the memory 316, and may perform various functions as described in the present disclosure.

With further reference to FIG. 3, the network interface 304 may comprise an integrated circuit including a processor core, memory, and programmable input/output peripherals. The network interface 304 may be operatively connected to the processor(s) 302. In some embodiments, the network interface 304 is configured to handle communication links between the electronic device 230 and other, external devices, external receivers, external transmitters, and/or external transceivers, and to route incoming/outgoing data appropriately. For example, the network interface 304 may be configured to transmit data to and/or receive data from a remote network device (e.g., one or more components of the network(s) of servers/backend devices 220 described in FIG. 2), the client device 214, 216, and/or the hub device 202. The network interface 304 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 304 may receive inputs, such as power and/or data, from the network interface 304, the power component 306, the transformer 308, the connectors 310, the sensor(s) 312, the light component 314, and/or the memory 316. The network interface 304 may also include the capability of communicating over wired connections.

In some examples, the electronic device 230 may utilize different types of network connections to communicate with various devices. For example, the electronic device 230 may utilize a first type of network connection(s) to communicate with the client device 214, 216, a second type of network connection(s) to communicate with the light emitters 232, and a third type of network connection(s) to communicate with other devices (e.g., a backend server 224, a hub device 202, the client device 214, 214, the A/V device 210, etc.). In some examples, a network connection (e.g., the first type of network connection, the second type of network connection, and/or the third type of network connection) may include a short-range network connection. For example, the network connection may include, but is not limited to, Bluetooth, Zigbee, and/or the like. In some examples, a network connection (e.g., the first type of network connection, the second type of network connection, and/or the third type of network connection) may include a long-range network connection. For example, the network connection may include, but is not limited to, Wi-Fi, LTE, and/or the like. Still, in some examples, a network connection (e.g., the first type of network connection, the second type of network connection, and/or the third type of network connection) may include a low power wide-area network (LPWAN). For example, the network connection may include, but is not limited to, a chirp spread spectrum (CSS) modulation technology network (e.g., LoRaWAN), an Ultra Narrow Band modulation technology network (e.g., Sigfox, Telensa, NB-IoT, etc.), RingNet, and/or the like With further reference to FIG. 3, the electronic device 230 may include the memory 316, which may include non-volatile memory and/or volatile memory. The non-volatile memory may comprise flash memory configured to store and/or transmit data. For example, in certain embodiments the non-volatile memory may comprise serial peripheral interface (SPI) flash memory. In some embodiments, the non-volatile memory may comprise, for example, NAND or NOR flash memory. The volatile memory may comprise, for example, DDR3 SDRAM (double data rate type three synchronous dynamic random-access memory). The memory 316 may be shared by one or more other components (in addition to the processor(s) 302) of the present electronic device 230.

With further reference to FIG. 3, the electronic device 230 may include the light component 314. The light component 314 may include one or more light sources, such as LED's, that are configured to emit light. In some examples, the light component 314 may include a light pipe located on a portion of the electronic device 230. The light emitted by the light sources of the light component 314 may be visible outside of the electronic device 302. In some examples, the light component 314 may cause the one or more light sources to emit the light when a user (e.g., the user 110) is interacting with the electronic device 230. For example, the light component 314 may cause the one or more light sources to emit the light when the electronic device 230 receives data from the client device 214, 216. For another example, the light component 314 may cause the one or more light sources to emit the light when electronic device 230 establishes a connection (e.g., a wireless connection) with the client device 214, 216. In a further example, the light component 314 may cause the one or more light sources to emit light when the electronic device 230 is supplying power to, or has activated, one or more light emitters.

With further reference to FIG. 3, the electronic device 230 includes the power component 306 that provides power to the connectors 310. In some examples, the power component 306 may include a component (e.g., one or more wires) that attaches to a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current). In some examples, the transformer 308 may step down the voltage from 110-220 V to a lower output voltage, such as 12-15 V, which is then provided to the connectors 310. These voltages are examples provided for illustration and are not intended to be limiting.

Additionally, or alternatively, in some examples, the power component 306 may include an internal power source, such as a battery. In such examples, the electronic device 230 may further include one or more components (not shown) that are configured to share the internal power source. For example, the electronic device 230 may include one or more solar panels that are configured to generate power for charging the internal power source.

With further reference to FIG. 3, the electronic device 230 includes the connectors 310. In some examples, the connectors 310 may include one or more terminals which connect to, and provide power to, light emitters 232 (e.g., the first type of light emitters 232(a) and/or the second type of light emitters 232(b)). For example, the light emitters 232 may connect to the connectors 310, via a wired connection, which may then provide power to the light emitters 232. In some examples, the connectors 310 may provide the power at a given voltage, such as 15 V and/or 12 V. However, these voltages are just examples provided for illustrations and are not intended to be limiting.

In some examples, the electronic device 230 may include switch(es) (not shown) associated with the connectors 310. The switch(es) may be configured to move between a first position (e.g., an off position) and a second position (e.g., an on position). While in the first position, power may not be provided from the power component 306 (and/or the transformer 308) to the connectors 310. While in the second position, power may be provided from the power component 306 (and/or the transformer 308) to the connectors 310. For example, if a connector 310 is connected to a light emitter 232 (e.g., a first type of light emitter 232(a)), the electronic device 230 may not be providing power to the connector 310 and thus, the light emitter 232, when a switch associated with the connector 310 is in the first position. However, the electronic device 230 may be providing power to the connector 310 and thus, the light emitter 232, when the switch is in the second position. In some examples, the switch(es) that are associated with the connector(s) 310 which are connected to the second type of light emitter(s) 232(b) may always be configured in the second position. This is because the electronic device 230 may continuously provide the power to the second type of light emitter(s) 232(b).

With further reference to FIG. 3, the electronic device 230 may include sensor(s) 312. The sensor(s) 312 may include, but are not limited to, motion sensor(s), light sensor(s), and/or the like. The motion sensor(s) 312 may be any type of sensor capable of detecting and communicating the presence of an entity within their field of view. As such, the motion sensor(s) 312 may include one or more (alone or in combination) different types of motion sensors. For example, in some embodiments, the motion sensor(s) 312 may comprise passive infrared (PIR) sensors, which may be secured on or within a PIR sensor holder that may reside behind a lens (e.g., a Fresnel lens). The light sensor(s) 312 may be one or more sensors capable of detecting the level of ambient light of the surrounding environment in which the electronic device 230 may be located.

With further reference to FIG. 3, the memory 316 may store a device application 318. The device application 318 may configure the processor(s) 302 to update settings 320 associated with light emitters 232 that are connected to (e.g., with a wired connection and/or a wireless connection), and controlled by, the electronic device 230. As shown, the settings 320 may include light emitter data 322 (also referred to as "data 322") indicating which light emitters 322 are connected to the electronic device 230. In some examples, the data 322 may further indicate which type of light emitters 232 are connected, and controlled by, the electronic device 230. For example, the data 322 may indicate that one or more of the first type of light emitters 232(a), one or more of the second type of light emitter 232(b), and/or one or more of the third type of light emitters 232(c) are connected to, and controlled by, the electronic device 230. In some examples, the data 322 may indicate which of the connectors 310 are connected to which of the light emitters 232. For example, the data 322 may indicate that a first connector 310 is connected to a first light emitter 232 (and/or a first type of light emitter 232(a)), a second connector 310 is connected to a second light emitter 232 (and/or a second type of light emitter 232(b)), and/or the like.

In some examples, the settings 320 may include data indicating condition(s) 324 associated with controlling the light emitters 232. As discussed herein, the condition(s) 324 may include, but are not limited to, a period of time, an amount of light, motion detection, and/or the like. The period of time may include a first time for activating (e.g., turning on) light emitters 232 and a second time for deactivating (e.g., turning off) the light emitters 232. In some examples, each of the first time and/or the second time may include day(s) of the year. For example, the each of first time and/or the second time may include, but are not limited to, January 12, May 14, October 19, and/or the like. Additionally, or alternatively, in some examples, each of the first time and/or the second time may include day(s) of the week. For example, each of the first time and/or the second time may include, but are not limited to, Monday, Tuesday, Wednesday, Thursday, and/or the like. Additionally, or alternatively, in some examples, each of the first time and/or the second time may include time(s) of the day. For example, each of the first time and/or the second time may include, but are not limited to, 4:00 a.m., 7:30 a.m., 8:00 p.m., and/or the like.

The amount of light may correspond a light threshold at which the electronic device 230 activates and/or deactivates light emitters 232. For example, the electronic device 230 may activate the light emitters 232 when an amount ambient light does not exceed the light threshold and the electronic device 230 may deactivate the light emitters 232 when the amount of ambient light exceeds the light threshold. In some examples, the amount of ambient light may be measured at the electronic device 230. For example, the electronic device 230 may include light sensor(s) 312 that measure the amount of ambient light. In some examples, the amount of ambient light may be measured at a different location. For example, a light sensor (which may be included in one of the light emitters 232, the A/V device 210, a sensor 204, etc.), that is external to the electronic device 230, may measure the amount of ambient light. The light sensor may then generate data indicating the amount of ambient light, where the data is transmitted to the electronic device 230.

The motion detection may correspond to motion being detected by one or more sensors. In some examples, at least one of the sensors may include a motion sensor 312 of the electronic device 230. Additionally, or alternatively, in some examples, at least one of the sensors may be external to the electronic device 230. For a first example, a sensor may include camera and/or a motion sensor of an A/V device 210 that monitors for motion located within a field of view of the A/V device 210. For a second example, a sensor may include a motion sensor of one of the light emitters 232. Still, for a third example, a sensor may include a motion sensor 204 that is external to the electronic device 230. When the sensor is external to the electronic device 230, the sensor may generate data indicating that the motion was detected by the sensor. The data may then be transmitted to the electronic device 230.

In some examples, the settings 320 may include data indicating association(s) 326 between light emitters 232 connected to the electronic device 230 and condition(s) 324. In some examples, each of the light emitters 232 connected to the electronic device 230 may include at least one association 326 with at least one condition 324. For example, at least a first light emitter 232 connected to the electronic device 230 may include an association 236 with a first condition 324, at least a second light emitter 232 connected to the electronic device 230 may include an association 236 with a second condition 324, and so on. In other examples, one or more of the light emitters 232 connected to the electronic device 230 may not include an association 326 with a condition 234. For example, a light emitter 232 connected to the electronic device 230 may not include an association 326 with a condition 324. In such an example, the light emitter 232 may be continuously activated or continuously deactivated by the electronic device 230, and/or may be selectively activated or deactivated in response to requests for activation or deactivation. The requests may be received by the electronic device 230 (e.g., by one or more input devices of the electronic device 230 (not shown)), may be received from the client device 214, 216 in response to inputs to the client device 214, 216 (e.g., inputs to turn on or off the lights, etc.), and/or the like.

The electronic device 230 may use the association(s) 326 to determine when to activate and/or deactivate the light emitters 232. For instance, if a light emitter 232 includes an association 326 with a condition 324, the electronic device 230 may activate the light emitter 232 when the condition 324 is satisfied and deactivate the light emitter 232 when the condition 324 is no longer satisfied. For a first example, if the condition 324 indicates a period of time, the electronic device 230 may determine that the condition 324 is satisfied when a current time is within the period of time. In response, the electronic device 230 may activate the light emitter 232. Additionally, the electronic device 230 may determine that the condition 324 is no longer satisfied when the current time is outside of the period of time. In response, the electronic device 230 may deactivate the light emitter 232.

For a second example, if the condition 324 indicates an amount of light (e.g., a threshold amount of light), the electronic device 230 may determine that the condition 324 is satisfied when a current amount of ambient light does not exceed the threshold amount of light. In response, the electronic device 230 may activate the light emitter 232. Additionally, the electronic device 230 may determine that the condition 324 is no longer satisfied when the current amount of ambient light exceeds the threshold amount of light. In response, the electronic device 230 may deactivate the light emitter 232. Still, for a third example, if the condition 324 indicates motion detected by a device (e.g., an A/V device 210, a motion sensor 204, etc.), the electronic device 230 may determine that the condition 324 is satisfied when the device detects motion. In response, the electronic device 230 may activate the light emitter 232. Additionally, the electronic device 230 may determine that the condition 324 is no longer satisfied based on the device no longer detecting motion and/or no longer detecting motion for the threshold period of time. In response, the electronic device 230 may deactivate the light emitter 232.

To determine if the condition(s) 324 are satisfied, the electronic device 230 may utilize sensor data 330. In some examples, the sensor data 330 may be generated by the sensor(s) 312 of the electronic device 230. For example, the sensor data 330 may include data generated by a motion sensor 312 that indicates when the motion sensor 312 detects motion, data generated by a light sensor 312 that indicates an amount of ambient light detected by the light sensor 312 (e.g., an amount of ambient light at the electronic device 230), data generated by a timer (which may also be illustrated as a sensor 312) that indicates a current time, and/or the like. Additionally, or alternatively, in some examples, the sensor data 330 may be generated by sensor(s) that are external to the electronic device 230. For example, the sensor data 330 may include data generated by A/V device(s) 210, sensor(s) 204, and/or automation device(s) 206 that indicates one or more conditions have been satisfied (e.g., motion has been detected, a window has been broken, a door has been opened when the security system is armed, etc.), data generated by an A/V device 210 and/or light sensor 204 that indicates an amount of ambient light, data generated by the client device 214, 216 and/or another device that indicates a current time, and/or the like. When the sensor data 330 is generated by sensor(s) that are external to the electronic device 230, the electronic device 230 may receive the sensor data 330 using the network interface 304.

In some examples, the settings 320 may include data indicating brightness level(s) for one or more of the light emitters 232. The brightness level 328 for a light emitter 232 may indicate a level at which the light emitter 232 is to emit light when activated. For example, the brightness level 328 for the light emitter 232 may be at a lowest level (e.g., 0%) when the light emitter is emitting no light, be at a highest level (e.g., 100%) when the light emitter 232 is emitting the maximum amount of light that the light emitter 232 is capable of emitting, and be between the lowest level and the highest level when the light emitter 232 is emitting an amount of light that is less than the maximum amount of light. For example, if the light emitter 232 is capable of emitting light at a brightness of 800 lumens, the minimum brightness level 328 for the light emitter 232 would include 0 lumens, the maximum brightness level 328 for the light emitter 232 would include 800 lumens, and other brightness levels 328 for the light emitter 232 may be between 0 lumens and 800 lumens. In some examples, the settings 320 may include data indicating a respective brightness level 328 for each light emitter 232. In some examples, the settings 320 may include data indicating a respective brightness level 328 for one or more of the light emitters 232.

The electronic device 230 may utilize the brightness level(s) 328 when activating light emitters 232. For a first example, if the settings 320 include data indicating that a brightness level 328 for a light emitter 232 is to be at a maximum level (e.g., 100%), then the electronic device 230 may cause the light emitter 232 to emit the maximum level of light when activating the light emitter 232. For instance, if the light emitter 232 includes the first type of light emitter 232(*a*), the electronic device 230 may provide a sufficient amount of power to the light emitter 232 such that the light emitter 232 emits light at the maximum level. If the light emitter 232 includes the second type of light emitter 232(*b*) (and/or the third type of light emitter (c)), the signal transmitted by the electronic device 230 that causes the light emitter 232 to emit the light may include a command that causes the light emitter 232 to emit the light at the maximum level.

For a second example, if the settings 320 include data indicating that a brightness level 328 for a light emitter 232 is to be at half of a maximum level (e.g., 50%), then the electronic device 230 may cause the light emitter 232 to emit the light at half of the maximum level when activating the light emitter 232. For instance, if the light emitter 232 includes the first type of light emitter 232(a), the electronic device 230 may provide enough power to the light emitter 232 such that the light emitter 232 emits light at half of the maximum level. If the light emitter 232 includes the second type of light emitter 232(b) (and/or the third type of light emitter (c)), the signal transmitted by the electronic device 230 may include a command that causes the light emitter 232 to emit the light at half of the maximum level.

In addition to, or alternatively from, brightness, the settings 320 may include a color, intensity, hue, pattern, and/or other settings for the light emitter 232. As such, the brightness, color, intensity, hue, pattern, and/or other settings may be updated, and for different conditions, light emitter(s) 232 may have different settings.

In some examples, the device application 318 may configure the processor(s) 302 to update the settings 320 in response to receiving updated settings data 332. The updated settings data 332 may indicate that one or more new light emitters 232 have been connected to the electronic device 230, one or more light emitters 232 have been disconnected from the electronic device 230, one or more conditions 324, and/or one or more associations 326 between condition(s) 324 and light emitters 232, and/or the like. In some examples, the electronic device 230 may receive, using the network interface 304, the updated settings data 332 from the client device 214. In such examples, the electronic device 230 may receive the updated settings data 330 using a short-range network connection, such as Bluetooth, Zigbee, and/or the like. Additionally, or alternatively, in some examples, the electronic device 230 may receive, using the network interface 304, the updated settings data 332 from the hub device 202, the A/V device 210, the backend server 224, and/or another electronic device.

With further reference to FIG. 3, the processor(s) 302 of the electronic device 230 may generate control signals 334 that are configured to cause the light emitters 232 to activate and/or deactivate. For example, based on determining that a condition 324 associated with a light emitter 232 (e.g., a second type of light emitter 232(b) or a third type of light emitter 232(c)) is satisfied, the processor(s) 302 of the electronic device 230 may generate a first control signal 334 that includes a command for activating the light emitter 232. The electronic device 230 may then transmit, using the network interface 304, the first control signal 334 to the light emitter 334. Additionally, based on determining that the condition 324 associated with the light emitter 232 is no longer satisfied, the processor(s) 502 of the electronic device 230 may generate a second control signal 334 that includes a command for deactivating the light emitter 232. The electronic device 230 may then transmit, using the network interface 304, the second control signal 334 to the light emitter 232.

Figure 4:
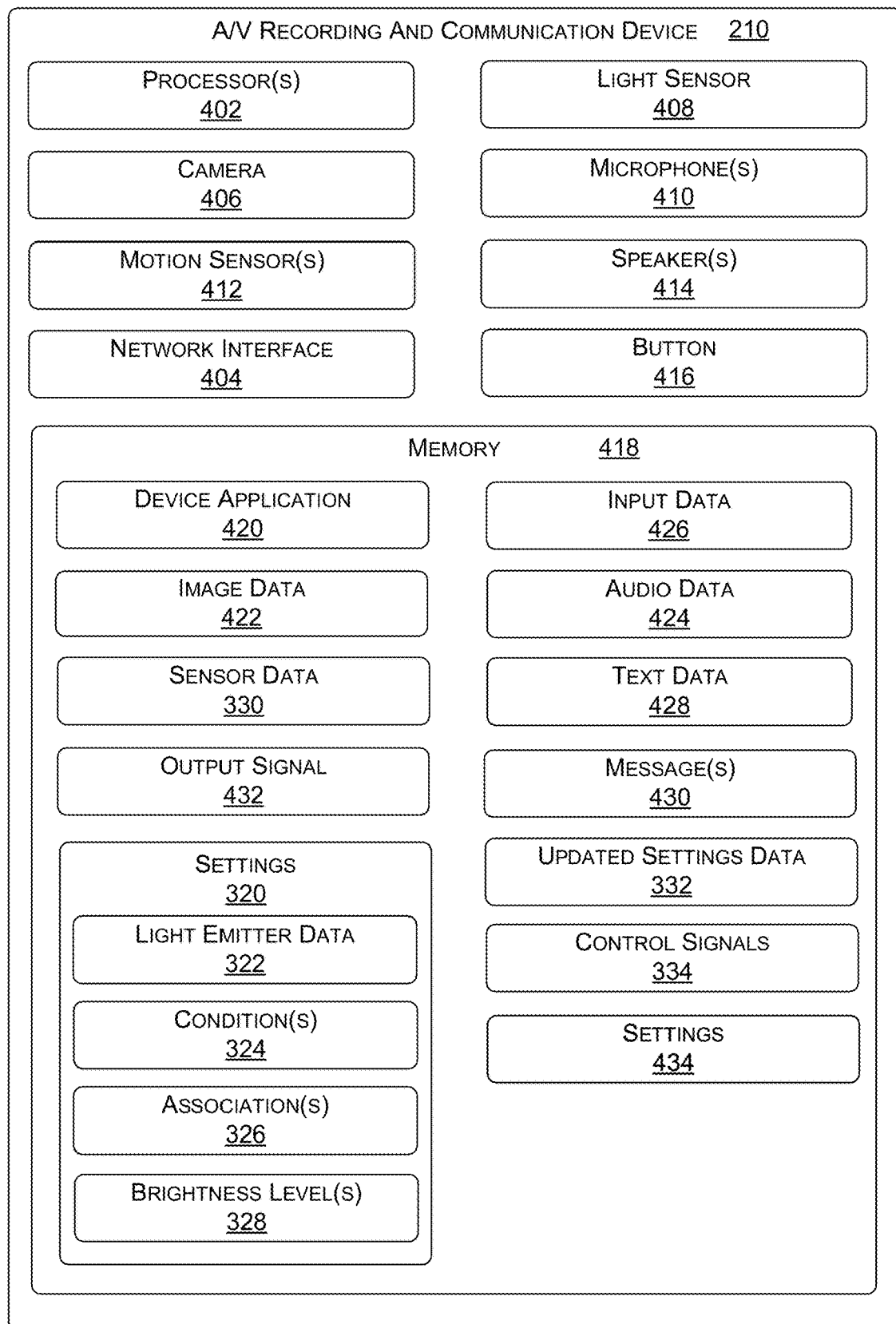
FIG. 4 is a functional block diagram illustrating one example embodiment of an A/V device, according to various aspects of the present disclosure.

FIG. 4 is a functional block diagram illustrating an embodiment of the A/V device 210, according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4. Furthermore, in some embodiments, the A/V device 210 may include one or more additional components not shown in FIG. 4.

As shown in FIG. 4, the A/V device 210 may include a processor(s) 402 (which may be similar to, and/or include similar functionality as, the processor(s) 302), a network interface 404 (which may be similar to, and/or include similar functionality as, the network interface 304), a camera 406, a light sensor 408 (which may be similar to, and/or include similar functionality as, the light sensor 312), microphone(s) 410, motion sensor(s) 412 (which may be similar to, and/or include similar functionality as, the motion sensor 312), speaker(s) 414, a button 416, and memory 418 (which may be similar to, and/or include similar functionality as, the memory 316). The memory 418 stores a device application 420. In various embodiments, the device application 420 may configure the processor(s) 402 to capture image data 422 using the camera 406, audio data 424 using the microphone(s) 410, and/or input data 426 using the button 416 (and/or the camera 406 and/or the motion sensor(s) 412, depending on the embodiment). Additionally, the device application 420 may configure the processor(s) 402 to capture sensor data 330, which may include motion data generated by the camera 406 and/or the motion sensor(s) 412, light data generated by the light sensor 408, and/or the like. In some embodiments, the device application 420 may also configure the processor(s) 402 to generate text data 428 describing the image data 422, the audio data 424, the sensor data 330, and/or the input data 426, such as in the form of metadata, for example.

In addition, the device application 420 may configure the processor(s) 402 to transmit the image data 422, the audio data 424, the sensor data 330, the input data 426, the text data 428, and/or message(s) 430 to the client devices 214, 216, the hub device 202, and/or the backend server 224 using the network interface 404. Additionally, the device application 420 may configure the processor(s) 402 to transmit the sensor data 330 to the electronic device 230 using the network interface 404. In various embodiments, the device application 420 may also configure the processor(s) 402 to generate and transmit an output signal 432 that may include the image data 422, the audio data 424, the text data 428, the input data 426, and/or the sensor data 330. In some of the present embodiments, the output signal 432 may be transmitted to the backend server 224 and/or the hub device 202 using the network interface 404, and the backend server 224 and/or the hub device 202 may transmit (or forward) the output signal 432 to the client device 214, 216 and/or the backend server 224 may transmit the output signal 432 to the hub device 202. In other embodiments, the output signal 432 may be transmitted directly to the client device 214, 216 and/or the hub device 202.

In further reference to FIG. 4, the image data 422 may comprise image sensor data such as (but not limited to) exposure values and data regarding pixel values for a particular sized grid. The image data 422 may include still images, live video, and/or pre-recorded images and/or video. The image data 422 may be recorded by the camera 406 in a field of view of the camera 406. The image data 422 may be representative of (e.g., depict) a physical environment in the field of view of the camera 406. The physical environment may include one or more object (e.g., cars, persons, animals, trees, items, etc.), and an analysis of the image data 422 (e.g., using computer vision processing, image processing, object detection, object recognition, etc.) may be used to determine which objects are represented by (e.g., depicted in) the image data 422.

In further reference to FIG. 4, the motion data of the sensor data 330 may comprise motion sensor data generated in response to motion events. For example, the motion data may include an amount or level of a data type generated by the motion sensor(s) 412 (e.g., the voltage level output by the motion sensor(s) 412 when the motion sensor(s) 412 are PIR type motion sensor(s)). In some of the present embodiments, such as those where the A/V device 210 does not include the motion sensor(s) 412, the motion data may be generated by the camera 406. In such embodiments, based on a frame by frame comparison of changes in the pixels from the image data 422, it may be determined that motion is present.

The input data 426 may include data generated in response to an input to the button 416. The button 416 may receive an input (e.g., a press, a touch, a series of touches and/or presses, etc.) and may generate the input data 426 in response that is indicative of the type of input. In some examples, a condition 324 may include a button press and/or another input to the A/V device 210. In such examples, one or more of the light emitters 232 may be activated to emit light (e.g., each of the light emitters in the front yard zone, or the front walkway zone). In embodiments where the A/V device 210 is not a doorbell (e.g., the video doorbell 210(c)), the A/V device 210 may not include the button 416, and the A/V device 210 may not generate the input data 426.

With further reference to FIG. 4, a message 430 may be generated by the processor(s) 402 and transmitted, using the network interface 404, to the client device 214, 216, the backend server 224, and/or the hub device 202. For example, in response to detecting motion using the camera 406 and/or the motion sensor(s) 412, the A/V device 210 may generate and transmit the message 430. In some of the present embodiments, the message 430 may include at least the image data 422, the audio data 424, the text data 428, the sensor data 330, and/or the motion data (which may be included in the sensor data 330).

As described herein, the message(s) 430 may include messages, signals, data, notifications, and/or any type of electronic communication that electronic devices (e.g., the A/V device 210, the client device 214, 216, the electronic device 230, the hub device 202, and/or one or more components of the network(s) of servers/backend devices 220) may transmit and receive with other electronic devices (e.g., the A/V device 210, the client device 214, 216, the hub device 202, the electronic device 230, and/or one or more components of the network(s) of servers/backend devices 220). For instance, message(s) 430 may include push notifications, email messages, short message service (SMS) messages, multimedia messages (MMS), voicemail messages, video signals, audio signals, and/or any other type of electronic communication that an electronic device can send to another electronic device.

The image data 422, the audio data 424, the text data 428, and/or the sensor data 330 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 422, audio data 424, text data 428, and/or the sensor data 330 representative of the detection of motion, or motion event. As a result, when a request for data pertaining to particular motion event, or a particular time period, is received (e.g., by the client device 214, 216, the backend server 224, and/or the hub device 202), the image data 422, the audio data 424, the text data 428, and/or the sensor data 330 associated with a particular motion event, and/or associated with motion event(s) within the particular time period, may be transmitted, retrieved, and/or received.

Although examples discuss the A/V device 210 generating and transmitting the image data 422, the audio data 424, the text data 428, and/or the sensor data 330 when motion is detected (e.g., in the message 430), in other examples the data may be generated and/or transmitted at other times. For example, the image data 422, the audio data 424, the text data 428, and/or the sensor data 330 may be generated and transmitted continuously (e.g., in a streaming manner), periodically, upon request, etc. In examples where the image data 422, the audio data 424, the text data 428, and/or the sensor data 330 may be generated and transmitted continuously, the detection of motion (e.g., a motion event) may cause an indication of when the motion was detected (e.g., a time stamp) and/or how long the motion was detected for (e.g., a duration) to be associated with the image data 422, the audio data 424, the text data 428, and/or the sensor data 330. As a result, even though the image data 422, the audio data 424, the text data 428, and/or the sensor data 330 may be continuously generated by the A/V device 210, the image data 422, the audio data 424, the text data 428, and/or the sensor data 330 associated with motion events may be tagged and/or stored separately (e.g., similar to that of the image data 422, the audio data 424, the text data 428, and/or the sensor data 330 generated in response to the detection of motion), from the image data 422, the audio data 424, the text data 428, and/or the sensor data 330 that is not associated with motion events.

As described herein, at least some of the processes of the backend server 224, the hub device 202, the client device 214, 216, and/or the electronic device 230 may be executed by the A/V device 210. For example, the processor(s) 402 of the A/V device 210 may update the settings 320 associated with the electronic device 230 using the updated settings data 332. Additionally, the processor(s) 402 of the A/V device 210 may determine when condition(s) 324 are satisfied, such as by using sensor data 330 received from the electronic device 230, the A/V device 210, the hub device 202, the sensor(s) 204, the automation device(s) 206, and/or any other device. The processor(s) 402 of the A/V device 210 may further identify association(s) 326 between the condition(s) 324 and light emitters 232. Based on determining that a condition 324 has been satisfied, where the condition 324 includes an association 326 with a light emitter 232, the A/V device 210 may transmit, using the network interface 404, a control signal 334 to the electronic device 230 (which may be via the hub device 202 and/or the backend server 224). The control signal 334 may include a command that causes the electronic device 230 to activate the light emitter 232.

Furthermore, the processor(s) 402 of the A/V device 210 may determine when condition(s) 324 are no longer satisfied, such as by using sensor data 330 received from the electronic device 230, the A/V device 210, the hub device 202, the sensor(s) 204, and/or any other device. The processor(s) 402 of the A/V device 210 may further identify the association(s) 326 between the condition(s) 324 and light emitters 232. Based on determining that a condition 324 is no longer satisfied, where the condition 324 includes an association 326 with a light emitter 232, the A/V device 210 may transmit, using the network interface 404, a control signal 334 to the electronic device 230 (which may be via the hub device 202 and/or the backend server 224). The control signal 334 may include a command that causes the electronic device 230 to deactivate the light emitter 232.

As further illustrated in FIG. 4, the A/V device 210 may store settings 434 associated with one or more additional electronic devices 230. The settings 434 may be similar to the settings 320, and include light emitter data, condition(s), association(s), brightness level(s), intensity level(s), color(s), pattern(s), etc. for light emitters 232 connected to the one or more additional electronic devices 230. In some examples, the A/V device 210 may update (e.g., supplement existing settings 434, create new settings 434, replace existing settings 434, etc.) the settings 434 using updated settings data 322.

In some examples, the processor(s) 402 of the A/V device 210 may perform similar processes, as described above with regard to the settings 320 and the electronic device 230, to control the one or more additional electronic devices 230 associated with the settings 434. For example, the processor(s) 402 of the A/V device 210 may determine when condition(s) indicated by the settings 434 are satisfied, such as by using sensor data 330 received from the one or more additional electronic devices 230, the A/V device 210, the hub device 202, the sensor(s) 204, the automation devices 206, and/or any other device. The processor(s) 402 of the A/V device 210 may further identify association(s) between the condition(s) and light emitters 232, as indicated by the settings 434. Based on determining that a condition has been satisfied, where the condition includes an association with a light emitter 232, the A/V device 210 may transmit, using the network interface 404, a control signal 334 to an additional electronic device 230 (which may be via the hub device 202, the backend server 224, and/or the electronic device 230). The control signal 334 may include a command that causes the additional electronic device 230 to activate the light emitter 232.

Furthermore, the processor(s) 402 of the A/V device 210 may determine when condition(s) indicated by the settings 434 are no longer satisfied, such as by using sensor data 330 received from the one or more additional electronic devices 230, the A/V device 210, the hub device 202, the sensor(s) 204, and/or any other device. The processor(s) 402 of the A/V device 210 may further identify the association(s) between the condition(s) and light emitters 232, as indicated by the settings 434. Based on determining that a condition is no longer satisfied, where the condition includes an association with a light emitter 232, the A/V device 210 may transmit, using the network interface 404, a control signal 334 to the additional electronic device 230 (which may be via the hub device 202, the backend server 224, and/or the electronic device 230). The control signal 334 may include a command that causes the additional electronic device 230 to deactivate the light emitter 232.

Figure 5:
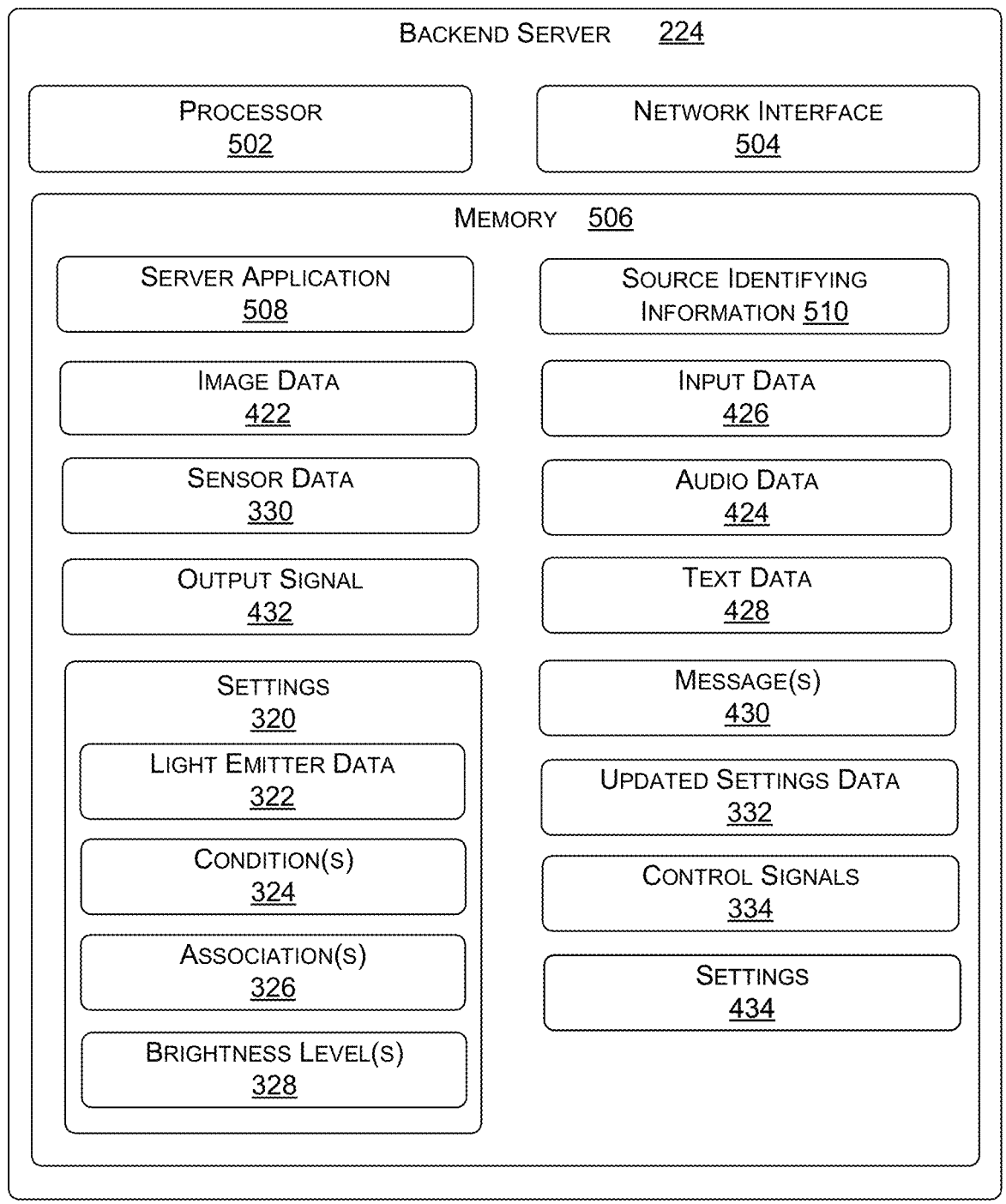
FIG. 5 is a functional block diagram illustrating one example embodiment of a backend server, according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 302), a network interface 504 (which may be similar to, and/or include similar functionality as, the network interface 304), and a memory 506 (which may be similar to, and/or include similar functionality as, the memory 316). The network interface 504 may allow the backend server 224 to access and communicate with devices connected to the network (Internet/PSTN) 212 (e.g., the A/V device 210, the hub device 202, the client devices 214, 216, a device controlled by the security monitoring service 228, and/or the electronic device 230).

The memory 506 may include a server application 508 that configures the processor(s) 502 to receive and/or retrieve the audio data 424, the text data 428, the input data 426, the messages 430, the image data 422, and/or the sensor data 330 from the A/V device 210 (e.g., in the output signal 432) and/or the hub device 202. The server application 508 may also configure the processor(s) 502 to transmit (and/or forward) the audio data 424, the text data 428, the input data 426, the messages 430, the image data 422, and/or the sensor data 330 to the client devices 214, 216 using the network interface 504. Furthermore, the server application 508 may configure the processor(s) 502 to receive, using the network interface 504, the updated settings data 332 from the client device 214, 216, the hub device 202, the A/V device 210, and/or the electronic device 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, the client devices 214, 216, the light emitters 232, and/or the electronic device 230. In addition, the source identifying data 510 may be used by the processor(s) 502 of the backend server 224 to determine the client devices 214, 216 are associated with the A/V device 210, the hub device 202, and/or the electronic device 230. In addition, the source identifying data 510 may be used by the processor(s) of the backend server 224 to determine the light emitters 232 associated with the electronic device(s) 230.

In some embodiments, the server application 508 may further configure the processor(s) 502 to generate and transmit a report signal (not shown) to a third-party client device, which may be associated with a law enforcement agency or the security monitoring service 228, for example. The report signal, which may be the message 430, in some examples, may include the image data 422, the audio data 424, and/or the text data 428.

As described herein, at least some of the processes of the A/V device 210, the hub device 202, the client device 214, 216, and/or the electronic device 230 may be executed by the backend server 224. For example, the processor(s) 502 of the backend server 224 may update the settings 320 associated with the electronic device 230 using the updated settings data 332. Additionally, the processor(s) 502 of the backend server 224 may determine when condition(s) 324 are satisfied, such as by using sensor data 330 received from the electronic device 230, the A/V device 210, the hub device 202, the sensor(s) 204, and/or any other device. The processor(s) 502 of the backend server 224 may further identify association(s) 326 between the condition(s) 324 and light emitters 232. Based on determining that a condition 324 has been satisfied, where the condition 324 includes an association 326 with a light emitter 232, the backend server 224 may transmit, using the network interface 504, a control signal 334 to the electronic device 230 (which may be via the hub device 202 and/or the A/V device 210). The control signal 334 may include a command that causes the electronic device 230 to activate the light emitter 232.

Additionally, the processor(s) 502 of the backend server 224 may determine when condition(s) 324 are no longer satisfied, such as by using sensor data 330 received from the electronic device 230, the A/V device 210, the hub device 202, the sensor(s) 204, the automation device(s) 206, and/or any other device. The processor(s) 502 of the backend server 224 may further identify the association(s) 326 between the condition(s) 324 and light emitters 232. Based on determining that a condition 324 is no longer satisfied, where the condition 324 includes an association 326 with a light emitter 232, the backend server 224 may transmit, using the network interface 504, a control signal 334 to the electronic device 230 (which may be via the hub device 202 and/or the A/V device 210). The control signal 334 may include a command that causes the electronic device 230 to deactivate the light emitter 232.

Furthermore, the processor(s) 502 of the backend server 224 may determine when condition(s) indicated by the settings 434 are satisfied, such as by using sensor data 330 received from the one or more additional electronic devices 230, the hub device 202, the A/V device 210, the sensor(s) 204, and/or any other device. The processor(s) 502 of the backend server 224 may further identify association(s) between the condition(s) and light emitters 232, as indicated by the settings 434. Based on determining that a condition has been satisfied, where the condition includes an association with a light emitter 232, the backend server 224 may transmit, using the network interface 504, a control signal 334 to an additional electronic device 230 (which may be via the hub device 202, the A/V device 210 and/or the electronic device 230). The control signal 334 may include a command that causes the additional electronic device 230 to activate the light emitter 232.

Moreover, the processor(s) 502 of the backend server 224 may determine when condition(s) indicated by the settings 434 are no longer satisfied, such as by using sensor data 330 received from the one or more additional electronic device 230, the hub device 202, the A/V device 210, the sensor(s) 204, the automation device(s) 206, and/or any other device. The processor(s) 502 of the backend server 224 may further identify the association(s) between the condition(s) and light emitters 232, as indicated by the settings 434. Based on determining that a condition is no longer satisfied, where the condition includes an association with a light emitter 232, the backend server 224 may transmit, using the network interface 504, a control signal 334 to the additional electronic device 230 (which may be via the hub device 202, the backend server 224, and/or the electronic device 230). The control signal 334 may include a command that causes the additional electronic device 230 to deactivate the light emitter 232.

Figure 6:
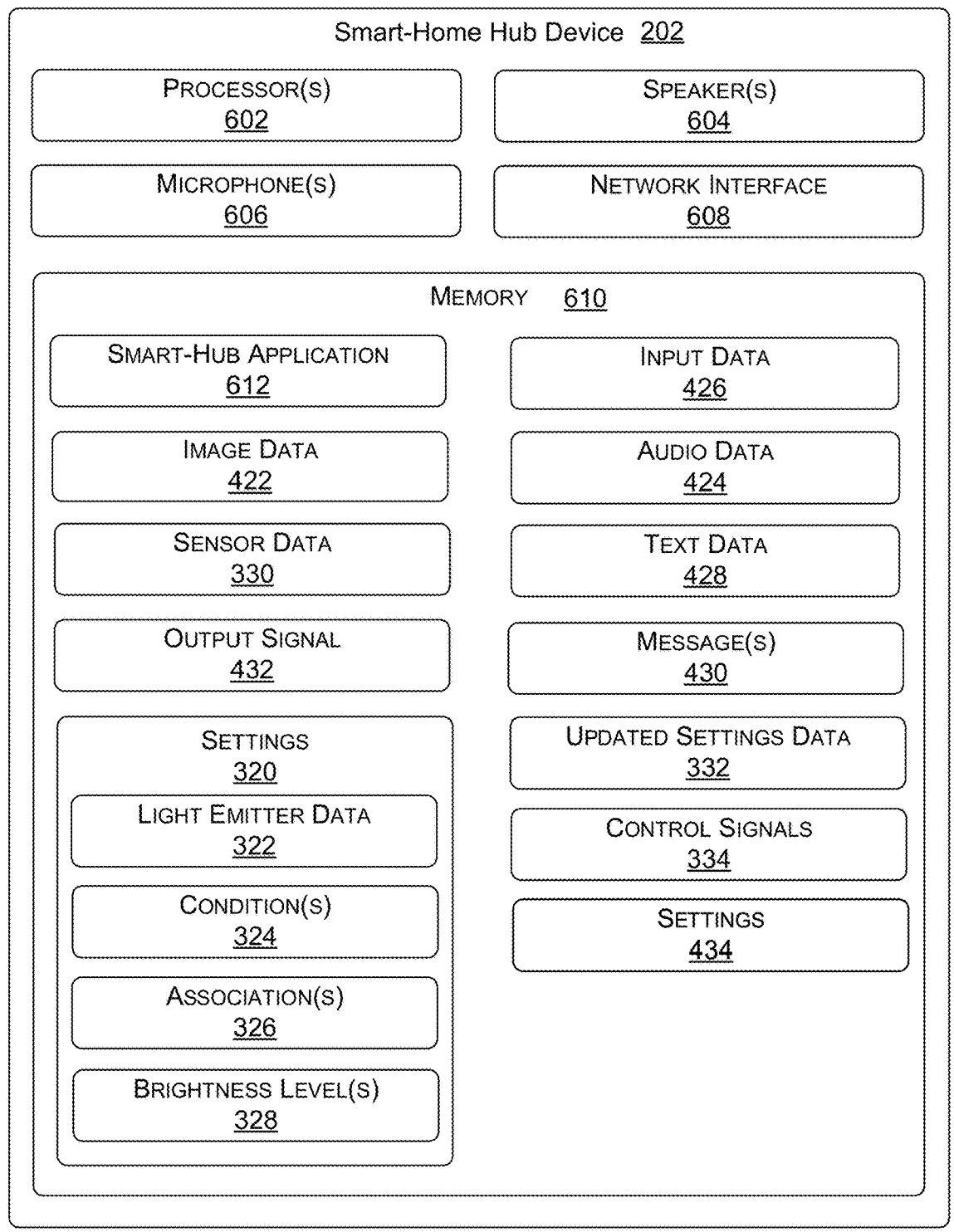
FIG. 6 is a functional block diagram illustrating one example embodiment of a hub device, according to various aspects of the present disclosure.

FIG. 6 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. In some examples, the hub device 202 may include the functionality of a light controller, a light bridge, a transformer, an LED driver, a ballast, and/or the like. For example, in some embodiments, the hub device 202 may include the components, features, and/or functionality of the electronic device 230. The hub device 202 may comprise processor(s) 602 (which may be similar to, and/or include similar functionality as, the processor(s) 302) that are operatively connected to speaker(s) 604, microphone(s) 606, a network interface 608 (which may be similar to, and/or include similar functionality as, the network interface 304), and memory 610 (which may be similar to, and/or include similar functionality as, the memory 316). In some embodiments, the hub device 202 may further comprise one or more cameras (not shown). In some embodiments, the hub device 202 may not include one or more of the components shown in FIG. 6, such as the speaker(s) 604 and/or the microphone(s) 606.

As shown in the example of FIG. 6, the memory 610 stores a smart-home hub application 612. In various embodiments, the smart-home hub application 612 may configure the processor(s) 602 to receive the sensor data (e.g., the sensor data 330) from the sensors 204, the automation devices 206, the A/V device 210, and/or the electronic device 230. For example, the sensor data 330 may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data 330 may be received in response to sensor triggers. The sensor triggers may be a door opening/closing, a window opening/closing, lights being turned on/off, blinds being opened/closed, etc. As such, the sensor data 330 may include the current state of the sensors 204 and/or the automation devices 206 as well as any updates to the current state based on sensor triggers. In any of the present embodiments, one or more of the conditions 324 may be based on sensor triggers. For example, a user may set conditions 324 that relate to the sensor(s) 204 and/or the automation device(s) 206, such as to activate one or more light emitters 232 when a door/window sensor is tripped, activate one or more light emitters 232 when living room lights (that may be part of a lighting automation system) are turned on during evening hours, activate all light emitters 232 when the security system is armed and a door or window is opened (e.g., turn all of the light emitters 232 on), a glass-break sensor detects a glass-break (e.g., flash at least one of the light emitters 232), a security camera (e.g., the A/V device 210) detects a suspicious person (e.g., based on computer vision and/or facial recognition) (e.g., pulse one or more of the light emitters 232 in a red, yellow, or alternate color), and/or the like, activate one or more light emitters 232 in the front yard zone when a motion detector of the sensor(s) 206 installed near the front yard detects motion in its field of view, etc. The light emitters 232 that are to be activated in response to the one or more conditions 324 may be stored in the association(s) 326 of the settings 320.

With further reference to FIG. 6, the smart-home hub application 612 may configure the processor(s) 602 to receive the audio data 424, the text data 428, the image data 422, the input data 426, and/or the messages 430 from the A/V device 210 (in some embodiments, via the backend server 224) using the network interface 608. For example, the hub device 202 may receive and/or retrieve (e.g., after receiving a signal from the A/V device 210 that the A/V device 210 has been activated) the audio data 424, the text data 428, the image data 422, and/or the input data 426 from the A/V device 210 and/or the backend server 224 in response to motion being detected by the A/V device 210. The smart-hub application 612 may then configure the processor(s) 602 to transmit, using the network interface 608, the audio data 424, the text data 428, the image data 422, the input data 426, and/or the messages 430 to the client device 214, 216, the backend server 224, and/or an additional electronic device 230. Additionally, the smart-hub application 612 may configure the processor(s) 602 to receive, using the network interface 608, the updated settings data 332 from the client device 214, 216, the electronic device 230, and/or the backend server 224.

As described herein, at least some of the processes of the A/V device 210, the backend server 224, the client device 214, 216, and/or the electronic device 230 may be executed by the hub device 202. For example, the processor(s) 602 of the hub device 202 may update the settings 320 associated with the electronic device 230 using the updated settings data 332. Additionally, the processor(s) 602 of the hub device 202 may determine when condition(s) 324 are satisfied, such as by using sensor data 330 received from the electronic device 230, the A/V device 210, the backend server 224, the sensor(s) 204, and/or any other device. The processor(s) 602 of the hub device 202 may further identify association(s) 326 between the condition(s) 324 and light emitters 232. Based on determining that a condition 324 has been satisfied, where the condition 324 includes an association 326 with a light emitter 232, the hub device 202 may transmit, using the network interface 608, a control signal 334 to the electronic device 230 (which may be via the backend server 224 and/or the A/V device 210). The control signal 334 may include a command that causes the electronic device 230 to activate the light emitter 232.

Furthermore, the processor(s) 602 of the hub device 202 may determine when condition(s) 324 are no longer satisfied, such as by using sensor data 330 received from the electronic device 230, the A/V device 210, the backend server 224, the sensor(s) 204, and/or any other device. The processor(s) 602 of the hub device 202 may further identify the association(s) 326 between the condition(s) 324 and light emitters 232. Based on determining that a condition 324 is no longer satisfied, where the condition 324 includes an association 326 with a light emitter 232, the hub device 202 may transmit, using the network interface 608, a control signal 334 to the electronic device 230 (which may be via the backend server 224). The control signal 334 may include a command that causes the electronic device 230 to deactivate the light emitter 232.

Furthermore, the processor(s) 602 of the hub device 202 may determine when condition(s) indicated by the settings 434 are satisfied, such as by using sensor data 330 received from the one or more additional electronic devices 230, the backend server 224, the A/V device 210, the sensor(s) 204, the automation device(s) 206, and/or any other device. The processor(s) 602 of the hub device 202 may further identify association(s) between the condition(s) and light emitters 232, as indicated by the settings 434. Based on determining that a condition has been satisfied, where the condition includes an association with a light emitter 232, the hub device 202 may transmit, using the network interface 608, a control signal 334 to an additional electronic device 230 (which may be via the backend server 224, the A/V device 210, and/or the electronic device 230). The control signal 334 may include a command that causes the additional electronic device 230 to activate the light emitter 232.

Moreover, the processor(s) 602 of the hub device 202 may determine when condition(s) indicated by the settings 434 are no longer satisfied, such as by using sensor data 330 received from the one or more additional electronic device 230, the backend server 224, the A/V device 210, the sensor(s) 204, and/or any other device. The processor(s) 602 of the hub device 202 may further identify the association(s) between the condition(s) and light emitters 232, as indicated by the settings 434. Based on determining that a condition is no longer satisfied, where the condition includes an association with a light emitter 232, the hub device 202 may transmit, using the network interface 608, a control signal 334 to the additional electronic device 230 (which may be via the backend server 224, the hub device 202, and/or the electronic device 230). The control signal 334 may include a command that causes the additional electronic device 230 to deactivate the light emitter 232.

The hub device 202, the backend server 224, the electronic device 230, the A/V device 210, one or more additional or alternative components of the network(s) of servers/backend devices 220, and/or another electronic device may alternatively be referred to herein as "network devices".

Figure 7:
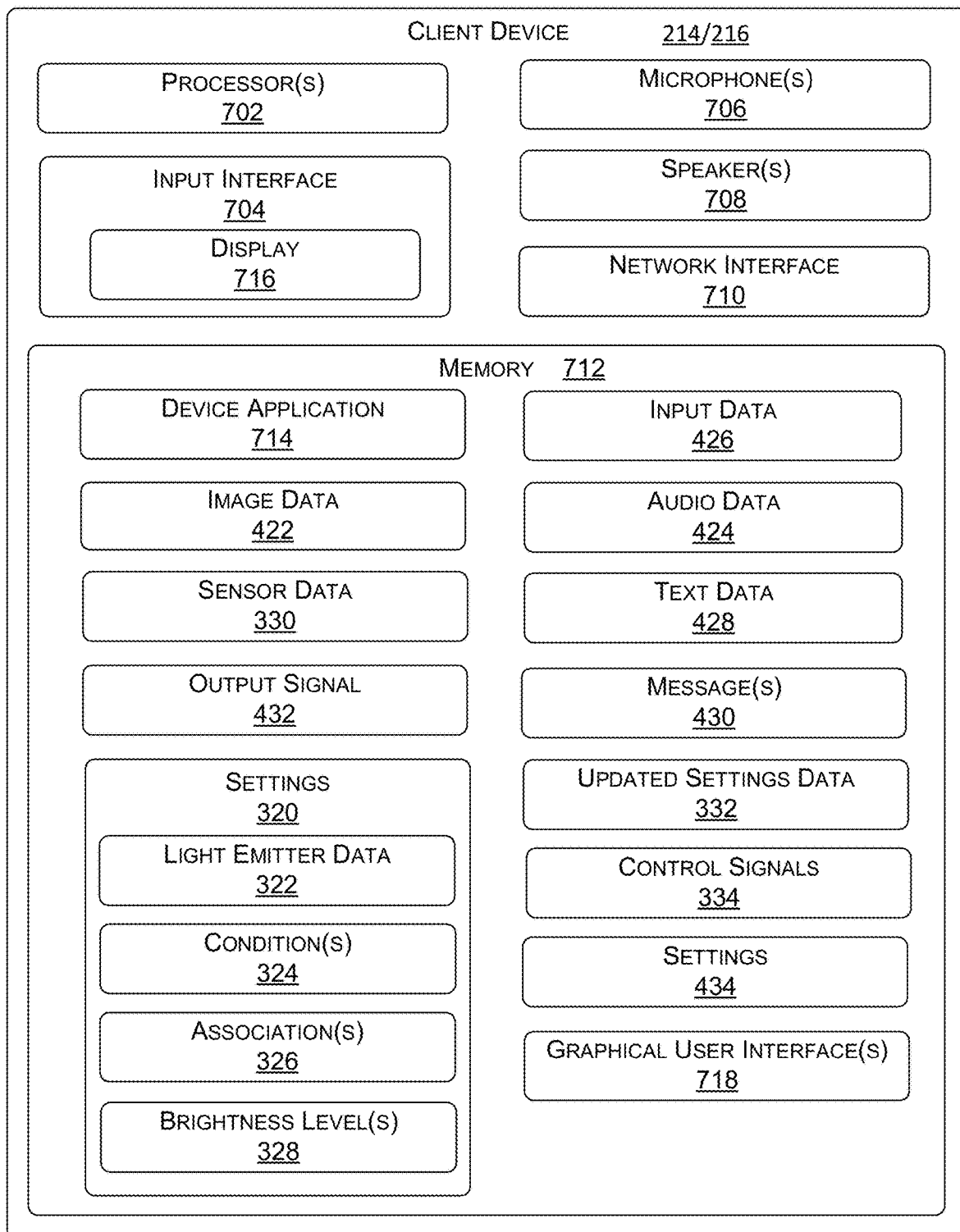
FIG. 7 is a functional block diagram illustrating one example embodiment of a client device, according to various aspects of the present disclosure.

Now referring to FIG. 7, FIG. 7 is a functional block diagram illustrating one embodiment of the client device 214, 217, according to various aspects of the present disclosure. The client device 214, 217 may comprise processor(s) 702 (which may be similar to, and/or include similar functionality as, the processor(s) 302) that are operatively connected to an input interface 704, microphone(s) 706, speaker(s) 708, a network interface 710 (which may be similar to, and/or include similar functionality as, network interface 304), and memory 712 (which may be similar to, and/or include similar functionality as, the memory 316). The client device 214, 217 may further comprise a camera (not shown) operatively connected to the processor(s) 702.

The memory 712 may store a device application 714. In various embodiments, the device application 714 may configure the processor(s) 702 to receive input(s) to the input interface 704 (e.g., indications of updates to the settings 320, etc.). In addition, the device application 714 may configure the processor(s) 702 to receive, using the network interface 710, the input data 426, the image data 422, the audio data 424, the output signal 432, and/or message(s) 430 from one or more of the A/V device 210, the hub device 202, or the backend server 224. Furthermore, the device application 714 may configure the processor(s) 702 to transmit, using the network interface 710, the updated settings data 332 to one or more of the A/V device 210, the hub device 202, the backend server 224, or the electronic device 230.

With further reference to FIG. 7, the input interface 704 may include a display 716. The display 716 may include a touchscreen, such that the user of the client device 214, 217 may provide inputs directly to the display 716 (e.g., indications of updates to the settings 320, etc.). In some embodiments, the client device 214, 217 may not include a touchscreen. In such embodiments, and in embodiments where the client device 214, 217 includes the touchscreen, the user may provide an input using any input device, such as, without limitation, a mouse, a trackball, a touchpad, a joystick, a pointing stick, a stylus, etc.

In some of the present embodiments, in response to receiving a message 430, the device application 714 may configure the processor(s) 702 to cause the display 716 to display the message 430. The message 430 may indicate that the A/V device 210 detected motion. While displaying the message 430, the input interface 704 may receive input from the user to answer the message 430. In response, the device application 714 may configure the processor(s) 702 to display the received image data 422 on the display 716 (e.g., display image(s) and/or video footage represented by the image data 422).

With further reference to FIG. 7, the processor(s) 702 of the client device 214, 216 may cause graphical user interface(s) (GUI(s)) 718 to be displayed on the display 716. The user may then use the GUIs 718 to update the settings 320 (and/or similarly the settings 434). For example, the GUIs 718 may include functionality and/or controls that allow the user to indicate when light emitters 232 have been connected to the electronic device 230 and/or disconnected from the electronic device 230. The GUIs 718 may further include functionality and/or controls that allow the user to indicate new condition(s) 324 for light emitters 232 and/or remove existing condition(s) 324. Additionally, the GUIs 718 may include functionality and/or controls that allow the user to indicate new association(s) 326 between condition(s) 324 and light emitters 232 and/or remove existing association(s) 326. Furthermore, the GUIs 718 may include functionality and/or controls that allow the user to indicate brightness level(s) 328, intensity level(s), patterns, color(s), hue(s), and/or other settings for the light emitters 232.

For a first example, if the user connects a new light emitter 232 (e.g., the first type of light emitter 232(*a*) or the second type of light emitter 232(*b*)) to the electronic device 230, the client device 214, 216 may receive, using the input interface 704, a first input (e.g., via a control of a GUI 718) indicating that the light emitter 232 has been connected to the electronic device 230. In some examples, the first input may indicate an identifier associated with the light emitter 232, such as, but not limited to, a media access control (MAC) address, an Internet protocol (IP) address, and/or any other identifier that may be used by the electronic device 230 (and/or the backend server 224, the hub device 202, the A/V device 210, etc.) to identify the light emitter 232. In some examples, the first input may cause the client device 214, 216 to establish a connection with the light emitter 232 using the network interface 704. In such examples, the client device 214, 216 may receive, using the network interface 710, data indicating the identifier (e.g., light emitter data 322) from the light emitter 232.

The client device 214, 216 may then receive, using the input interface 704, a second input (e.g., via a control of a GUI 718) indicating a new condition 324. Additionally, the client device 214, 216 may receive, using the input interface 704, a third input (e.g., via a control of a GUI 718) indicating an association 326 between the light emitter 232 and the new condition 324. Finally, the client device 214, 216 may receive, using the input interface 704, a fourth input (e.g., via a control of a GUI 718) indicating a brightness level 328 (and/or other setting, such as intensity, color, pattern, etc.) for the light emitter 232. Based on the inputs, the processor(s) 702 of the client device 214, 216 may generate updated settings data 332, where the updated settings data 332 includes light emitter data 322 indicating the light emitter 232 (e.g., indicating the identifier associated with the light emitter 232), the new condition 324, the new association 326, and/or the brightness level 328 (and/or other settings). The client device 214, 216 may then transmit, using the network interface 710, the updated settings data 332 to the electronic device 230, the hub device 202, and/or the backend server 224.

For a second example, if the user installs a new light emitter 232 (e.g., the third type of light emitter 232(*c*)) at the user's property, the client device 214, 216 may receive, using the input interface 704, a first input (e.g., via a control of a GUI 718) indicating that the light emitter 232 has been installed at the property. In some examples, the first input may indicate an identifier associated with the light emitter 232, such as, but not limited to, a media access control address, an Internet protocol address, and/or any other identifier that may be used by the electronic device 230 to identify the light emitter 232. In some examples, the first input may cause the client device 214, 216 to establish a connection with the light emitter 232 using the network interface 704. In such examples, the client device 214, 216 may receive, using the network interface 710, data indicating the identifier (e.g., light emitter data 322) from the light emitter 232.

The client device 214, 216 may then receive, using the input interface 704, a second input (e.g., via a control of a GUI 718) indicating a new condition 324. Additionally, the client device 214, 216 may receive, using the input interface 704, a third input (e.g., via a control of a GUI 718) indicating an association 326 between the light emitter 232 and the new condition 324. Finally, the client device 214, 216 may receive, using the input interface 704, a fourth input (e.g., via a control of a GUI 718) indicating a brightness level 328 for the light emitter 232. Based on the inputs, the processor(s) 702 of the client device 214, 216 may generate updated settings data 332, where the updated settings data 332 includes light emitter data 322 indicating the light emitter 232 (e.g., indicating the identifier associated with the light emitter 232), the new condition 324, the new association 326, and/or the brightness level 328. The client device 214, 216 may then transmit, using the network interface 710, the updated settings data 332 to the electronic device 230, the hub device 202, and/or the backend server 224.

As described herein, at least some of the processes of the A/V device 210, the backend server 224, the hub device 202, and/or the electronic device 230 may be executed by the client device 214, 216. For example, the processor(s) 702 of the client device 214, 216 may update the settings 320 associated with the electronic device 230 using the inputs received via the input interface 704. Additionally, the processor(s) 702 of the client device 214, 216 may determine when condition(s) 324 are satisfied, such as by using sensor data 330 received from the electronic device 230, the A/V device 210, the backend server 224, the hub device 202, the sensor(s) 204, and/or any other device. The processor(s) 702 of the client device 214, 216 may further identify association(s) 326 between the condition(s) 324 and light emitters 232. Based on determining that a condition 324 has been satisfied, where the condition 324 includes an association 326 with a light emitter 232, the client device 214, 216 may transmit, using the network interface 710, a control signal 334 to the electronic device 230 (which may be via the backend server 224, the hub device 202, and/or the A/V device 210). The control signal 334 may include a command that causes the electronic device 230 to activate the light emitter 232.

Furthermore, the processor(s) 702 of the client device 214, 216 may determine when condition(s) 324 are no longer satisfied, such as by using sensor data 330 received from the electronic device 230, the A/V device 210, the backend server 224, the hub device 202, the sensor(s) 204, the automation device(s) 206, and/or any other device. The processor(s) 702 of the client device 214, 216 may further identify the association(s) 326 between the condition(s) 324 and light emitters 232. Based on determining that a condition 324 is no longer satisfied, where the condition 324 includes an association 326 with a light emitter 232, the client device 214, 216 may transmit, using the network interface 710, a control signal 334 to the electronic device 230 (which may be via the backend server 224, the hub device 202, and/or the A/V device 210). The control signal 334 may include a command that causes the electronic device 230 to deactivate the light emitter 232.

Furthermore, the processor(s) 702 of the client device 214, 216 may determine when condition(s) indicated by the settings 434 are satisfied, such as by using sensor data 330 received from the one or more additional electronic devices 230, the backend server 224, the hub device 202, the A/V device 210, the sensor(s) 204, and/or any other device. The processor(s) 702 of the client device 214, 216 may further identify association(s) between the condition(s) and light emitters 232, as indicated by the settings 434. Based on determining that a condition has been satisfied, where the condition includes an association with a light emitter 232, the client device 214, 216 may transmit, using the network interface 710, a control signal 334 to an additional electronic device 230 (which may be via the backend server 224, the hub device 202, and/or the A/V device 210). The control signal 334 may include a command that causes the additional electronic device 230 to activate the light emitter 232.

Moreover, the processor(s) 702 of the client device 214, 216 may determine when condition(s) indicated by the settings 434 are no longer satisfied, such as by using sensor data 330 received from the one or more additional electronic device 230, the backend sever 224, the hub device 202, the A/V device 210, the sensor(s) 204, and/or any other device. The processor(s) 702 of the client device 214, 216 may further identify the association(s) between the condition(s) and light emitters 232, as indicated by the settings 434. Based on determining that a condition is no longer satisfied, where the condition includes an association with a light emitter 232, the client device 214, 216 may transmit, using the network interface 710, a control signal 334 to the additional electronic device 230 (which may be via the backend server 224, the hub device 202, and/or the A/V device 210). The control signal 334 may include a command that causes the additional electronic device 230 to deactivate the light emitter 232.

Figure 8:
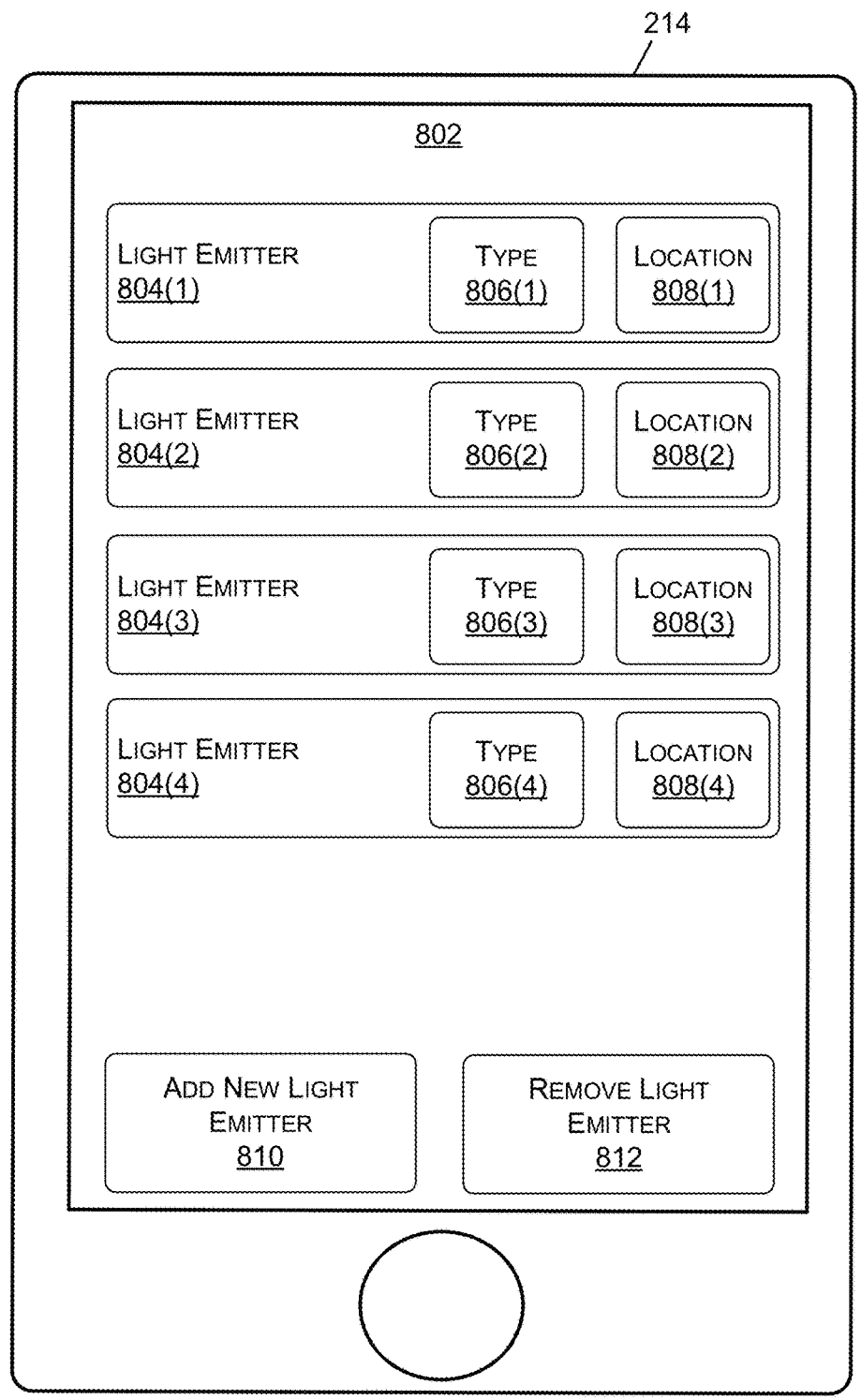
FIG. 8 illustrates an example graphical user interface for viewing light emitters that are connected to an electronic device, according to various aspects of the present disclosure.

FIG. 8 illustrates an example GUI 802 (which may represent one of the GUIs 718) for viewing the light emitters 232 that are connected to the electronic device 230, according to various aspects of the present disclosure. As shown, the GUI 802 may include graphical elements 804(1)-(4) indicating the light emitters 232 that are connected to the electronic device 230. For example, the first graphical element 804(1) may be associated with a first light emitter 232, the second graphical element 804(2) may be associated with a second light emitter 232, the third graphical element 804(3) may be associated with a third light emitter 232, and the fourth graphical element 804(4) may be associated with a fourth light emitter 232. Although the example GUI 802 of FIG. 4 includes four graphical elements 804(1)-(4) associated with four light emitters 232, in other examples, the GUI 802 may include any number of graphical elements associated with any number of light emitters 232 that are connected to the electronic device 230.

In some examples, the GUI 802 may further indicate the respective emitter type 806(1)-(4) associated with each of the light emitters 232. As discussed herein, the emitter type 806(1)-(4) may include, but is not limited to, with reference to FIG. 2, the first type of light emitter 232(a), the second type of light emitter 232(b), and/or the third type of light emitter 232(c). In addition to indicating these types of light emitters 232, descriptive information of the type of light emitter may be included, such as floodlight, pathway light, landscape light, dome light, sconce, spotlight, etc., and/or SKU numbers, MAC address, product codes, QR codes, and/or other descriptive information. In addition, an image or other representation of the light emitters 804 may be included. For example, the first graphical element 804(1) may indicate the emitter type 806(1) associated with the first light emitter 232. The second graphical element 804(2) may indicate the emitter type 806(2) associated with the second light emitter 232. Additionally, the third graphical element 804(3) may indicate the emitter type 806(3) associated with the third light emitter 232. Furthermore, the fourth graphical element 804(4) may indicate the emitter type 806(4) associated with the fourth light emitter 232.

In some examples, the GUI 802 may further indicate the respective location 808(1)-(4) of each of the light emitters 232. In some examples, the location 808(1)-(4) may indicate the relative location of the light emitter 232 at the property. For example, the location 808(1)-(4) may include, but is not limited to, the roof, the walkway, the patio, the front yard, the backyard, the deck, the porch, and/or the like. In some examples, the locations 808(1)-(4) may be used for determining zones, as described herein. Additionally, or alternatively, in some examples, the location 808(1)-(4) may indicate the actual location of the light emitter 232(1)-(4). For example, the location 808(1)-(4) may include, but is not limited to, the address at which the light emitter 232 is located, the global navigation satellite system (GNSS) coordinates of where the light emitter 232 is located, the global positioning system (GPS) coordinates of where the light emitter 232 is located, the state, city, and/or town of the where the light emitter 232 is located, and/or the like. In some examples, the locations 808 of the light emitters 232 may also be based on the location of each light emitter 232 with respect to each other light emitter 232 (e.g., the orientation of the light emitters 232 with respect to an object (e.g., a front of a house, a beginning of a walkway, an end of a driveway, etc.) or other location. For example, in order extending away from the front of the house, the location 808(1) may be the light closest to the house, and the light emitter 232 may be the light furthest from the house. This information may help the user when setting conditions and/or setting a pattern or order of turning light emitters 804 on and off. As shown in the example of FIG. 8, the first graphical element 804(1) may indicate the location 808(1) of the first light emitter 232. The second graphical element 804(2) may indicate the location 808(2) of the second light emitter 232. Additionally, the third graphical element 804(3) may indicate the location 808(3) of the third light emitter 232. Furthermore, the fourth graphical element 804(4) may indicate the location 808(4) of the fourth light emitter 232.

In some examples, the GUI 802 may further include a first control 810 associated with adding a new light emitter 232 (e.g., connecting a new light emitter 232 to the electronic device 230). In some examples, based on receiving an input selecting the first control 810, the client device 214 may begin a setup process for the new light emitter 232. In some examples, the GUI 802 may further include a second control 812 associated with removing one of the light emitters 232 that are already connected to the electronic device 230. In some examples, based on receiving an input selecting the second control 812, the client device 214 may query the user for which light emitter 232 the user wishes to remove. The client device 214 may then remove the graphical element 804(1)-(4) corresponding to the selected light emitter 232.

Figure 9:
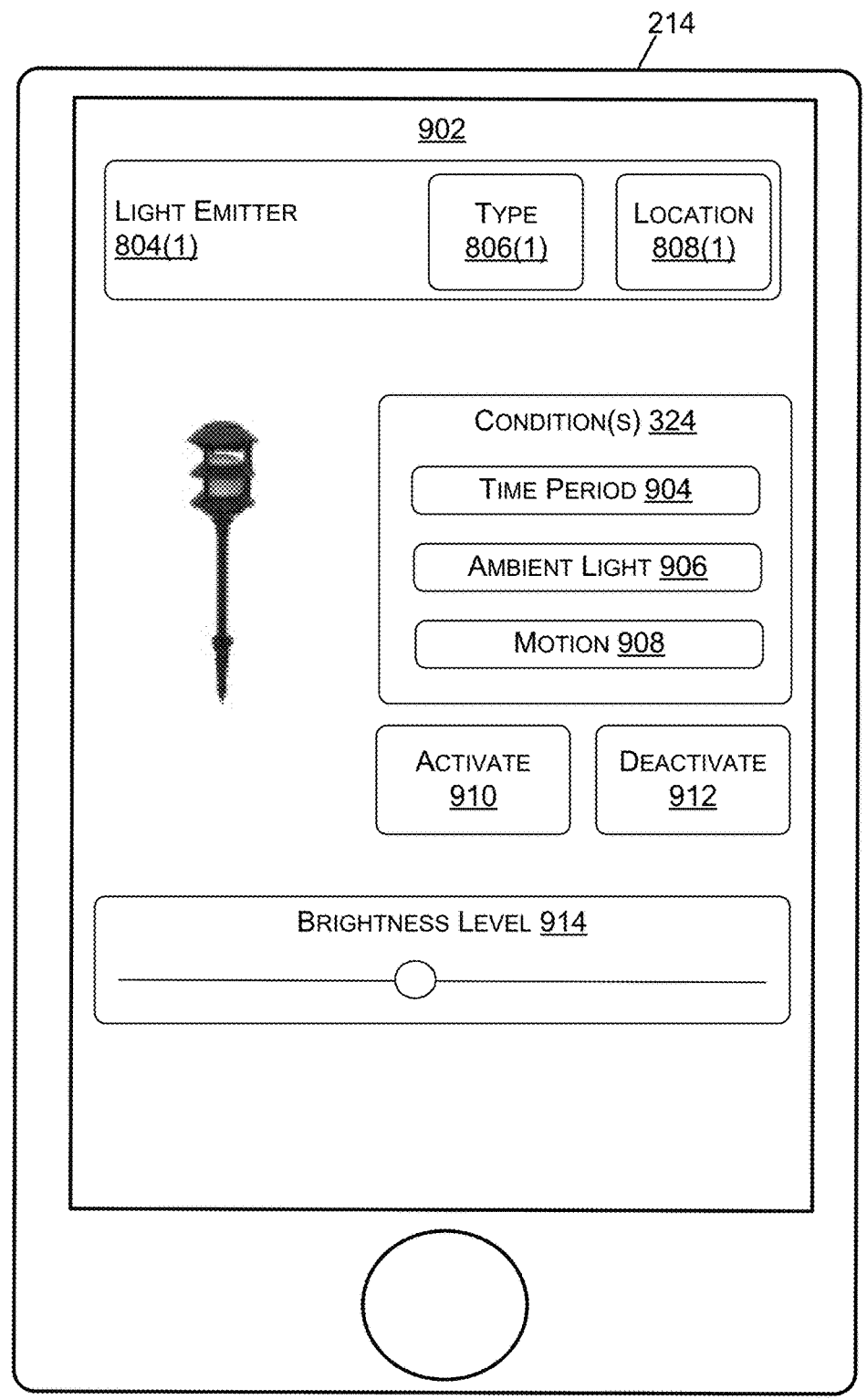
FIG. 9 illustrates an example graphical user interface for updating settings for a light emitter, according to various aspects of the present disclosure.

FIG. 9 illustrates an example GUI 902 (which may represent one of the GUIs 718) for updating settings for a light emitter 232, according to various aspects of the present disclosure. For example, if the client device 214 receives an input selecting the first graphical element 804(1) included on the GUI 802, the client device 214 may display the GUI 902. As shown, the GUI 902 allows the user to update condition(s) 324 for the light emitter 232. For example, the GUI 902 includes a first control 904 for indicating a time period at which the light emitter 232 is to activate. The GUI 902 further includes a second control 906 for indicating an amount of ambient light at which the light emitter 232 is to activate. Furthermore, the GUI 902 includes a third control 908 for indicating a device (e.g., A/V device 210, sensor 204, etc.) for which, when motion is detected by the device, the light emitter 232 is to activate. In other examples, one or more other controls may be included for determining condition(s) 324 with respect to a security system (e.g., conditions for sensors 204, automation devices 206, and/or A/V devices 210, and/or for different statuses of the security system (e.g., armed, disarmed, etc.)).

In some examples, the GUI 902 may further include a fourth control 910 for activating the light emitter 232. For example, based on the client device 214 receiving an input selecting the fourth control 910, the client device 214 may transmit a control signal 334 to the electronic device 230 (which may be via the hub device 202, the backend server 224, and/or the A/V device 210), where the control signal 334 causes the electronic device 230 to activate the light emitter 232. In some examples, the GUI 902 may further include a fifth control 912 for deactivating the light emitter 232. For example, based on the client device 214 receiving an input selecting the fifth control 912, the client device 214 may transmit a control signal 334 to the electronic device 230 (which may be via the hub device 202, the backend server 224, and/or the A/V device 210), where the control signal 334 causes the electronic device 230 to deactivate the light emitter 232.

In some examples, the GUI 902 may further include a sixth control 914 for controlling the brightness level 328 of the light emitter 232. In the example of FIG. 9, the sixth control 914 may include a slider that the user may use to change the brightness level 328 of the light emitter 232. However, in other example, the sixth control 914 may include any other input control that the user may use to change the brightness level 328 of the light emitter 232. In other examples, any number of other controls may be included for changing or setting the intensity, hue, color, pattern, and/or other settings of the light emitters 804.

Figure 10A:
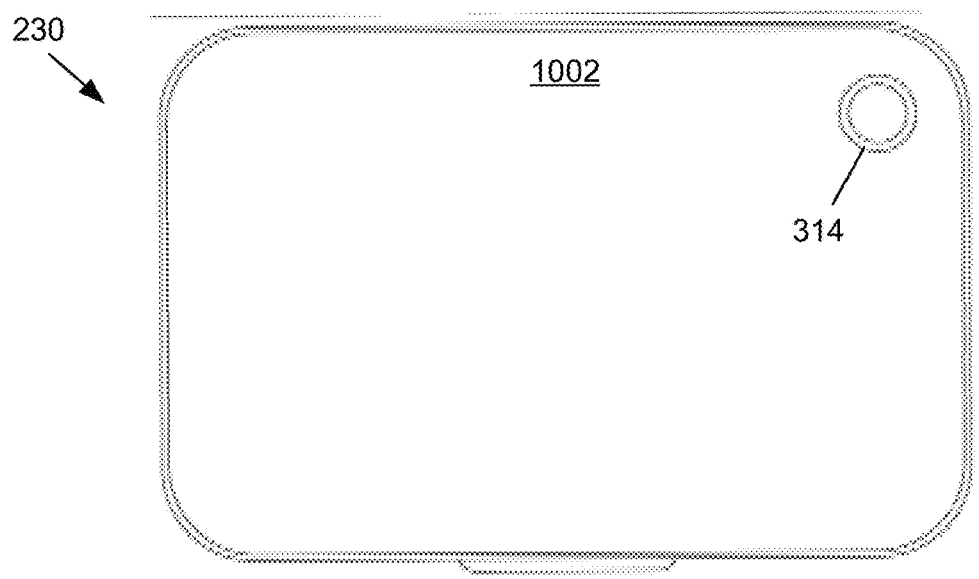
FIG. 10A illustrates a peripheral view of an example layout of an electronic device, according to various aspects of the present disclosure.
Figure 10B:
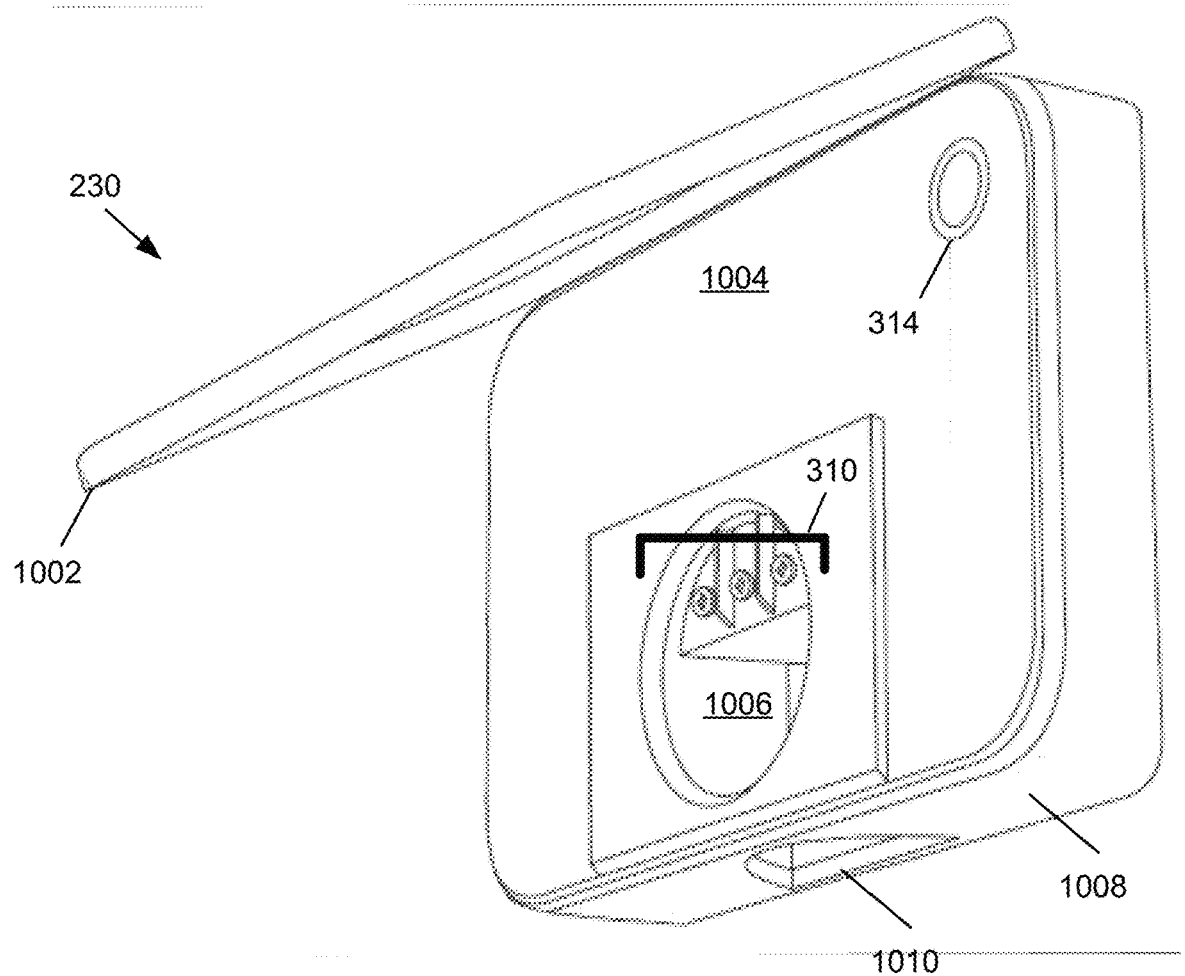
FIG. 10B illustrates a view of an example layout for components located within the electronic device, according to various aspects of the present disclosure.

FIG. 10A illustrates a peripheral view of an example layout for the electronic device 230, according to various aspects of the present disclosure. As shown, the electronic device 230 may include a front cover 1002 that is capable of moving from a closed position (as illustrated in FIG. 10A) to an open position (as illustrated in FIG. 10B). A transparent or translucent portion of the light component 314 may be visible from, or protrude through, the front cover 1002. For example, when light sources of the light component 314 are emitting light, the light may be visible from the transparent or translucent portion of the light component 314. In some examples, and as illustrated in the example of FIGS. 10A-10B, the light component 314 may include a light pipe. However, in other examples, the light component 314 may include any other shape.

FIG. 10B illustrates a view of an example layout of components located within the electronic device 230, according to various aspects of the present disclosure. The electronic device 230 may include a backplate 1004 that includes the components of the electronic device 230. For example, the connectors 310 may protrude though a front surface of the backplate 1004. In the example of FIG. 10B, the connectors 310 may include terminal screws that connect to terminals located within the back plate of the electronic device 230. The terminal screws may be configured to receive electrical wires of the light emitters 232 (e.g., the first type of light emitters 232(a) and/or the second type of light emitters 232(b)). The terminal screws may be located within a recessed portion 1006 of the back plate 1004 so that the terminal screws do not protrude from the front surface of the backplate 1004.

With further reference to FIG. 10B, a bottom portion 1008 of the backplate 1004 may include an opening 1010. The opening 1010 may extend through the backplate 1004 such that the opening connects to the recess 1006. This way, the electrical wires of the light emitters 232, which are connected to the connectors 310 (e.g., connected to the terminal screws), may still be connected to the connectors 310, via the opening 1010, even when the front cover 1002 is in the closed position.

Each of the processes described herein, including the processes 1100, 1200, and 1300, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 11:
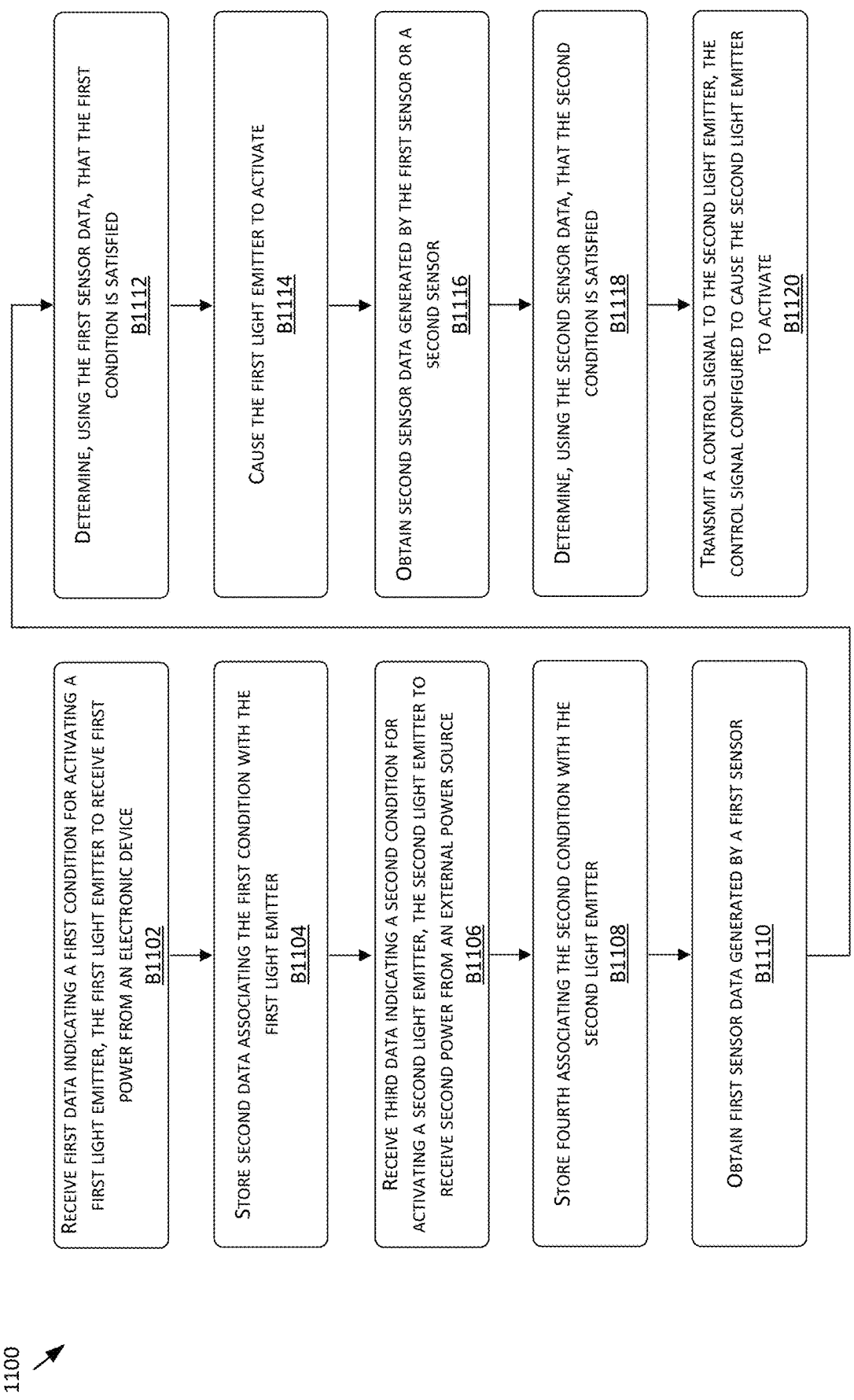
FIGS. 11-12 are flowcharts illustrating example processes for controlling lights using an electronic device, according to various aspects of the present disclosure.

FIG. 11 is a flowchart illustrating an example process 1100 for controlling lights using an electronic device, according to various aspects of the present disclosure. The process 1100, at block B1102, receives first data indicating a first condition for activating a first light emitter, the first light emitter to receive first power from an electronic device. For example, the electronic device 230 may receive, using the network interface 204, updated settings data 332 indicating the first condition 324 for activating the first light emitter 232. The first light emitter 232 may include the first type of light emitter 232(a) or the second type of light emitter 232(b). For example, the first light emitter 232 may be connected to a connector 310 (e.g., a terminal) of the electronic device 230. As such, the electronic device 230 may provide the first power to the first light emitter 232 via the connector 310.

In some examples, the electronic device 230 may receive the updated settings data 332 from the client device 214, 216. In some examples, the electronic device 230 may receive the updated settings data 332 from the hub device, the backend server 224, and/or the A/V device 210. The first condition 324 may indicate a first time period for activating the first light emitter 232, a first amount of light for activating the first light emitter 232, or that the first light emitter 232 is to be activated based on motion being detected by a first sensor (e.g., a sensor 312, the motion sensor(s) 412 and/or the camera 406 of the A/V device 210, a sensor 204, an automation device 206, etc.).

The process 1100, at block B1104, stores second data associating the first condition with the first light emitter. For example, the electronic device 230 may store second data associating the first condition 324 with the first light emitter 232. In some examples, storing the second data may include updating the settings 320 to indicate an association 326 between the first condition 324 and the first light emitter 232. In some examples, storing the second data may include storing at least a portion of the updated settings data 332 within the memory 316.

The process 1100, at block B1106, receives third data indicating a second condition for activating a second light emitter, the second light emitter to receive second power from an external power source. For example, the electronic device 230 may receive, using the network interface 204, updated settings data 332 indicating the second condition 324 for activating the second light emitter 232. The second light emitter 232 may include the third type of light emitter 232(c). For example, the second light emitter 232 may receive the second power from a power source that is external to the electronic device 230. In some examples, the power source may include a battery and/or other power source included in the second light emitter 232. In some examples, the power source may include a power source that is external to the second light emitter 232, but which the second light emitter 232 is connected to via an electrical wire.

In some examples, the electronic device 230 may receive the updated settings data 332 from the client device 214, 216. In some examples, the electronic device 230 may receive the updated settings data 332 from the hub device, the backend server 224, and/or the A/V device 210. The second condition 324 may indicate a second time period for activating the second light emitter 232, a second amount of light for activating the second light emitter 232, or that the second light emitter 232 is to be activated based on motion being detected by the first sensor or a second sensor (e.g., a sensor 312, the motion sensor(s) 412 and/or the camera 406 of the A/V device 210, a sensor 204, etc.).

The process 1100, at block B1108, stores fourth data associating the second condition with the second light emitter. For example, the electronic device 230 may store fourth data associating the second condition 324 with the second light emitter 232. In some examples, storing the fourth data may include updating the settings 320 to indicate an association 326 between the second condition 324 and the second light emitter 232. In some examples, storing the fourth data may include storing at least a portion of the updated settings data 332 within the memory 316.

The process 1100, at block B1110, obtains first sensor data generated by a first sensor. For example, the electronic device 230 may obtain the first sensor data 330 generated by a first sensor. In some examples, the first sensor may include a sensor 312 of the electronic device 230. For example, the first sensor data 330 may include data indicating a current time that is generated by a timer (e.g., a sensor 312) of the electronic device 230, light data generated by a light sensor 312, and/or motion data generated by a motion sensor 312. In some examples, the first sensor may be external to the electronic device 230. For example, the first sensor data 330 may include motion data generated by the A/V device 210 (e.g., the camera 406 and/or the motion sensor(s) 412) and/or a motion sensor 204, light data generated by the A/V device 210 (e.g., the light sensor 408) and/or a light sensor 204, and/or the like.

The process 1100, at block B1112, determines, using the first sensor data, that the first condition is satisfied. For example, the electronic device 230 may determine, using the first sensor data 330, that the first condition 324 is satisfied. In some examples, if the first condition 324 indicates a first period of time, the electronic device 230 may determine that the first condition 324 is satisfied based on determining that a current time (as indicated by the first sensor data 330) is within the first period of time. In some examples, if the first condition 324 indicates a first amount of light, the electronic device 230 may determine that the first condition 324 is satisfied based on determining that a current amount of ambient light (as indicated by the first sensor data 330) does not exceed the first amount of light. Still, in some examples, if the first condition 324 indicates motion being detected by the first sensor, the electronic device 230 may determine that the first condition 324 is satisfied based on determining that the first sensor detected the motion (as indicated by the first sensor data 330).

The process 1100, at block B1114, causes the first light emitter to activate. For example, based on determining that the first condition 324 is satisfied, the electronic device 230 may cause the first light emitter 232 to activate (e.g., turn on). In some examples, if the first light emitter 232 includes the first type of light emitter 232(a), the electronic device 230 may cause the first light emitter 232 to activate by providing the first power to the connection 310. For example, the electronic device 230 may cause a switch to move from a first position to a second position, where the connection 310 provides the first power to the first light emitter 232 when the switch is in the second position. In some examples, if the first light emitter 232 includes the second type of light emitter 232(b) and/or the third type of light emitter 232(c), the electronic device 230 may transmit, using the network interface 304, a control signal 334 to the first light emitter 232. The control signal 334 may be configured to cause the first light emitter 232 to activate.

The process 1100, at block B1116, obtains second sensor data generated by the first sensor or a second sensor. For example, the electronic device 230 may obtain the second sensor data 330 generated by the first sensor or the second sensor. In some examples, the sensor (e.g., the first sensor or the second sensor) may include a sensor 312 of the electronic device 230. For example, the second sensor data 330 may include data indicating a current time that is generated by a timer (e.g., a sensor 312) of the electronic device 230, light data generated by a light sensor 312, and/or motion data generated by a motion sensor 312. In some examples, the sensor (e.g., the first sensor or the second sensor) may be external to the electronic device 230. For example, the second sensor data 330 may include motion data generated by the A/V device 210 (e.g., the camera 406 and/or the motion sensor(s) 412) and/or a motion sensor 204, light data generated by the A/V device 210 (e.g., the light sensor 408) and/or a light sensor 204, and/or the like. In some examples, the sensor may be part of the security system (e.g., communicatively coupled to the hub device 202 and/or the A/V device 210). In other examples, the sensor (e.g., light sensor, motion sensor, timer, etc.) may be included in one or more of the light emitters 232 or may be a stand-alone sensor that is communicatively coupled to the electronic device 230 (and may not be communicatively coupled to any other or additional device).

The process 1100, at block B1118, determines, using the second sensor data, that the second condition is satisfied. For example, the electronic device 230 may determine, using the second sensor data 330, that the second condition 324 is satisfied. In some examples, if the second condition 324 indicates a second period of time, the electronic device 230 may determine that the second condition 324 is satisfied based on determining that a current time (as indicated by the second sensor data 330) is within the second period of time.

In some examples, if the second condition 324 indicates a second amount of light, the electronic device 230 may determine that the second condition 324 is satisfied based on determining that a current amount of ambient light (as indicated by the second sensor data 330) does not exceed the second amount of light. Still, in some examples, if the second condition 324 indicates motion being detected by the first sensor or the second sensor, the electronic device 230 may determine that the second condition 324 is satisfied based on determining that the first sensor or the second sensor detected the motion (as indicated by the second sensor data 330).

The process 1100, at block B1120, transmits a control signal to the second light emitter, the control signal configured to cause the second light emitter to activate. For example, based on determining that the second condition 324 is satisfied, the electronic device 230 may transmit, using the network interface 304, a control signal 334 to the second light emitter 232. The control signal 334 may be configured to cause the second light emitter 232 to activate.

In some examples, the electronic device 230 may further receive updated settings data 332 indicating a third condition 324 associated with a third light emitter 232. The third light emitter may include the first type of light emitter 232(*a*) or the second type of light emitter 232(*b*). For example, the third light emitter 232 may be connected to a second connector 310 of the electronic device 230. The electronic device 230 may then obtain third sensor data 330 from the first sensor, the second sensor, and/or a third sensor. Using the third sensor data 330, the electronic device 230 may determine that the third condition 324 is satisfied. Based on determining that the third condition 324 is satisfied, the electronic device 230 may cause the third light emitter 232 to activate (e.g., turn on). In some examples, if the third light emitter 232 includes the first type of light emitter 232(*a*), the electronic device 230 may cause the third light emitter 232 to activate by providing power to the second connector 310. For example, the electronic device 230 may cause a second switch to move from a first position to a second position, where the second connector 310 provides the power to the third light emitter 232 when the second switch is in the second position. In some examples, if the third light emitter 232 includes the second type of light emitter 232(*b*), the electronic device 230 may transmit, using the network interface 304, a control signal 334 to the third light emitter 232. The control signal 334 may be configured to cause the third light emitter 232 to activate.

Although the example process 1100 of FIG. 11 describes the electronic device 230 as performing each of the blocks B1102-B1120, in some examples, one or more of the A/V device 210, the hub device 202, the backend server 224, the signaling device, the client device 214, 216, or the electronic device 230 may perform each of the blocks B1102-B1120.

The process 1100 of FIG. 11 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, and referring the examples of FIG. 1, the electronic device 102 may receive first data from the client device 112, where the first data indicates a first condition 108(*a*) for activating a light emitter 104(*a*) (e.g., block B1102). For example, the first condition 108(*a*) may indicate that the first light emitter 104(*a*) is to activate between 7:00 p.m. and 7:00 a.m. each day. The electronic device 102 may then store data associating the first condition 108(*a*) with the first light emitter 104(*a*) (e.g., block B1104). Additionally, the electronic device 102 may receive second data from the client device 112, where the second data indicates a second condition 108(*b*) for activating a second light emitter 104(*b*) and a third light emitter 104(*c*) (e.g., block B1106). For example, the second condition 108(*b*) may indicate that the second light emitter 104(*b*) and the third light emitter 104(*c*) are to activate when an amount of light detected by the light sensor 114 does not exceed a threshold amount of light. The electronic device 102 may then store data associating the second condition 108(*b*) with the second light emitter 104(*b*) and the third light emitter 104(*c*) (e.g., block B1108).

The electronic device 102 may then obtain first sensor data 126 indicating a current time (e.g., block B1110). Using the first sensor data 126, the electronic device 102 may determine that the current time is 7:00 p.m. and as such, the first condition 108(*a*) is satisfied (e.g., block B1112). In response, the electronic device 102 may cause power from the external power source 106 to be provided to a terminal that is connected to the first light emitter 104(*a*). By providing power to the terminal, the electronic device 102 may cause the first light emitter 104(*a*) to activate (e.g., turn on, emit light, etc.) (e.g., block B1114). Later, the electronic device 102 may receive second sensor data 126 generated the light sensor 114, where the second sensor data 126 indicates an amount of ambient light detected by the light sensor 114 (e.g., block B1116). Using the second sensor data 126, the electronic device 102 may determine that the amount of ambient light does not exceed the threshold amount of light and as such, the second condition 108(*b*) is satisfied (e.g., block B1118). In response, the electronic device 102 may transmit a control signal to the second light emitter 104(*b*) and the third light emitter 104(*c*), where the control signal is configured to cause the second light emitter 104(*b*) and the third light emitter 104(*c*) to activate (e.g., turn on, emit light, etc.) (e.g., block B1120).

Figure 12:
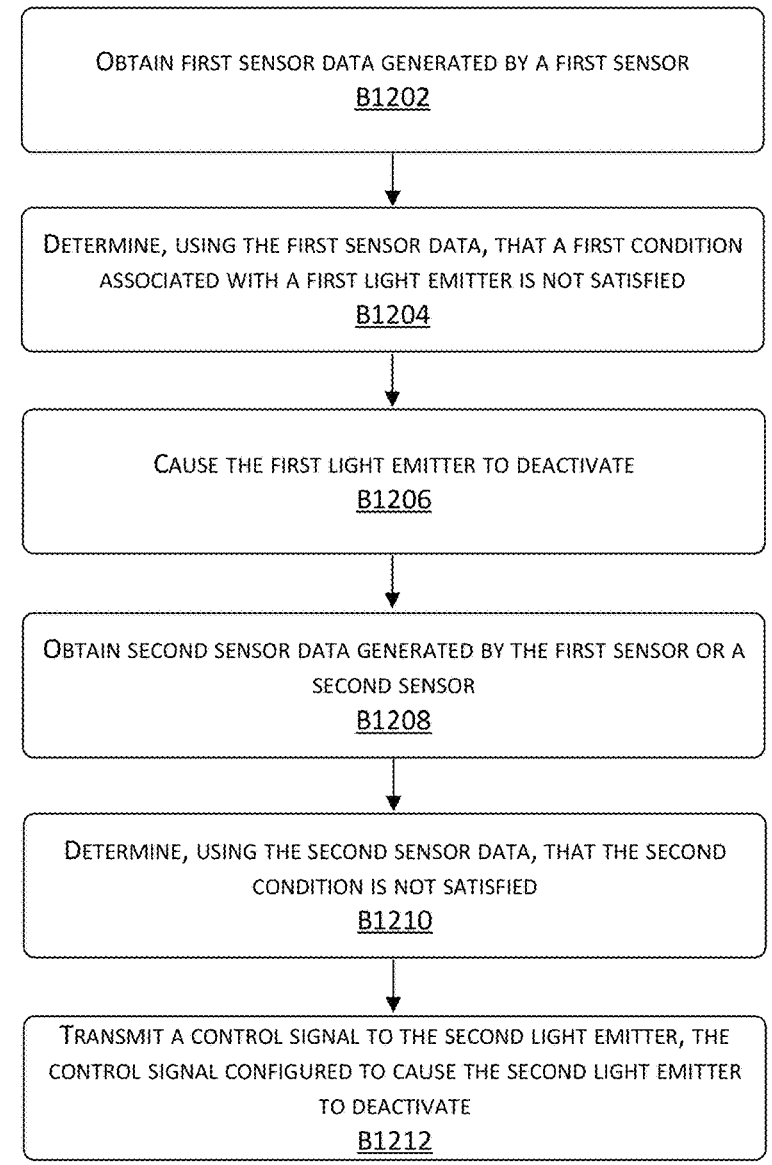

FIG. 12 is a flowchart illustrating an example process 1200 for controlling lights using an electronic device, according to various aspects of the present disclosure. In some examples, the example process 1200 of FIG. 12 occurs after the example process 1100 of FIG. 11.

The process 1200, at block B1202, obtains first sensor data generated by a first sensor. For example, the electronic device 230 may obtain the first sensor data 330 generated by the first sensor. In some examples, the first sensor may include a sensor 312 of the electronic device 230. For example, the first sensor data 330 may include data indicating a current time that is generated by a timer (e.g., a sensor 312) of the electronic device 230, light data generated by a light sensor 312, and/or motion data generated by a motion sensor 312. In some examples, the first sensor may be external to the electronic device 230. For example, the first sensor data 330 may include motion data generated by the A/V device 210 (e.g., the camera 406 and/or the motion sensor(s) 412) and/or a motion sensor 204, light data generated by the A/V device 210 (e.g., the light sensor 408) and/or a light sensor 204, and/or the like. In other examples, the sensor data 330 may be from any device or sensor of the security system and/or home-automation system, as described herein.

The process 1200, at block B1204, determines, using the first sensor data, that a first condition associated with a first light emitter is not satisfied. For example, the electronic device 230 may determine, using the first sensor data 330, that the first condition 324 is no longer satisfied. In some examples, if the first condition 324 indicates a first period of time, the electronic device 230 may determine that the first condition 324 is no longer satisfied based on determining that a current time (as indicated by the first sensor data 330) is outside the first period of time. In some examples, if the first condition 324 indicates a first amount of light, the electronic device 230 may determine that the first condition 324 is no longer satisfied based on determining that a current amount of ambient light (as indicated by the first sensor data 330) exceeds the first amount of light. Still, in some examples, if the first condition 324 indicates motion being detected by the first sensor, the electronic device 230 may determine that the first condition 324 is no longer satisfied based on determining that the first sensor has not detected motion (as indicated by the first sensor data 330) and/or determining that a threshold period of time has elapsed since the first sensor last detected motion).

The process 1200, at block B1206, causes the first light emitter to deactivate. For example, based on determining that the first condition 324 is no longer satisfied, the electronic device 230 may cause the first light emitter 232 to deactivate (e.g., turn off). In some examples, if the first light emitter 232 includes the first type of light emitter 232(a), the electronic device 230 may cause the first light emitter 232 to deactivate by ceasing from providing power to a connector 310 that is connected to the first light emitter 232. For example, the electronic device 230 may cause a switch to move from a second position to a first position, where the connector 310 ceases from providing power to the first light emitter 232 when the switch is in the first position. In some examples, if the first light emitter 232 includes the second type of light emitter 232(b), the electronic device 230 may transmit, using the network interface 304, a control signal 334 to the first light emitter 232. The control signal 334 may be configured to cause the first light emitter 232 to deactivate.

The process 1200, at block B1208, obtains second sensor data generated by the first sensor or a second sensor. For example, the electronic device 230 may obtain the second sensor data 330 generated by the first sensor or the second sensor. In some examples, the sensor (e.g., the first sensor or the second sensor) may include a sensor 312 of the electronic device 230. For example, the second sensor data 330 may include data indicating a current time that is generated by a timer (e.g., a sensor 312) of the electronic device 230, light data generated by a light sensor 312, and/or motion data generated by a motion sensor 312. In some examples, the sensor (e.g., the first sensor or the second sensor) may be external to the electronic device 230. For example, the second sensor data 330 may include motion data generated by the A/V device 210 (e.g., the camera 406 and/or the motion sensor(s) 412) and/or a motion sensor 204, light data generated by the A/V device 210 (e.g., the light sensor 408) and/or a light sensor 204, and/or the like. In some examples, the sensor data 330 may be generated by any of the devices of the security system and/or home automation system, as described herein.

The process 1200, at block B1210, determines, using the second sensor data, that the second condition is not satisfied. For example, the electronic device 230 may determine, using the second sensor data 330, that the second condition 324 is no longer satisfied. In some examples, if the second condition 324 indicates a second period of time, the electronic device 230 may determine that the second condition 324 is no longer satisfied based on determining that a current time (as indicated by the second sensor data 330) is outside of the second period of time. In some examples, if the second condition 324 indicates a second amount of light, the electronic device 230 may determine that the second condition 324 is no longer satisfied based on determining that a current amount of ambient light (as indicated by the second sensor data 330) exceeds the second amount of light. Still, in some examples, if the second condition 324 indicates motion being detected by the first sensor or the second sensor, the electronic device 230 may determine that the second condition 324 is no longer satisfied based on determining that the first sensor or the second sensor has not detected motion (as indicated by the sensor data 330) and/or determining that a threshold period of time has elapsed since the first sensor or the second sensor last detected motion.

The process 1200, at block B1212, transmits a control signal to the second light emitter, the control signal configured to cause the second light emitter to deactivate. For example, based on determining that the second condition 324 is no longer satisfied, the electronic device 230 may transmit, using the network interface 304, a control signal 334 to the second light emitter 232. The control signal 334 may be configured to cause the second light emitter 232 to deactivate.

Although the example process 1200 of FIG. 12 describes the electronic device 230 as performing each of the blocks B1202-B1212, in some examples, one or more of the A/V device 210, the hub device 202, the backend server 224, the client device 214, 216, or the electronic device 230 may perform each of the blocks B1202-B1212.

Figure 13:
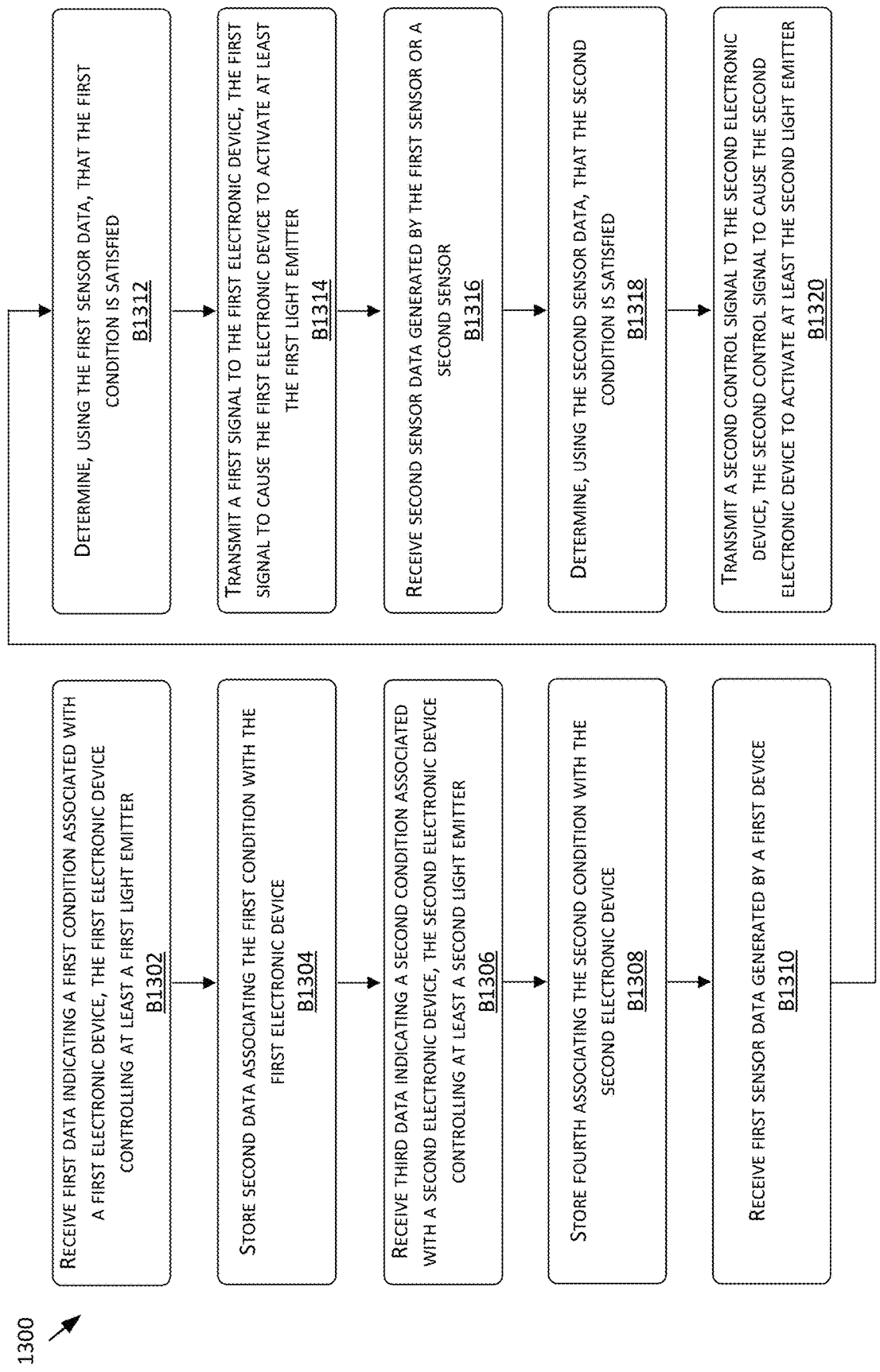
FIGS. 13-14 are flowcharts illustrating example processes for controlling lights using multiple electronic devices, according to various aspects of the present disclosure.

FIG. 13 is a flowchart illustrating an example process 1300 for controlling lights using multiple electronic devices, according to various aspects of the present disclosure. The process 1300, at block B1302, receives first data indicating a first condition associated with a first electronic device, the first electronic device controlling at least a first light emitter. For example, the backend server 224 may receive, using the network interface 504 (and/or the hub device 202 may receive, using the network interface 608) (and/or the A/V device 210 may receive, using the network interface 404), updated settings data 332 indicating the first condition 324 associated with the first electronic device 220. The first electronic device 230 may control at least the first light emitter 232. The first condition 324 may indicate a first time period for causing the first electronic device 230 to activate at least the first light emitter 232, a first amount of light for causing the first electronic device 230 to activate at least the first light emitter 232, or that the first electronic device 230 is to activate at least the first light emitter 232 based on motion being detected by a first sensor (e.g., a sensor 312, the motion sensor(s) 412 and/or the camera 406 of the A/V device 210, a sensor 204, etc.).

The process 1300, at block B1304, stores second data associating the first condition with the first electronic device. For example, the backend server 224 (and/or the hub device 202) (and/or the A/V device 210) may store second data associating the first condition 324 with the first electronic device 230. In some examples, storing the second data may include updating the settings 320 to indicate an association 326 between the first condition 324 and the first electronic device 230. In some examples, storing the second data may include storing at least a portion of the updated settings data 332.

The process 1300, at block B1306, receives third data indicating a second condition associated with a second electronic device, the second electronic device controlling at least a second light emitter. For example, the backend server 224 may receive, using the network interface 504 (and/or the hub device 202 may receive, using the network interface 608) (and/or the A/V device 210 may receive, using the network interface 404), updated settings data 332 indicating the second condition 324 associated with the second electronic device 220. The second electronic device 230 may control at least the second light emitter 232. The second condition 324 may indicate a second time period for causing the second electronic device 230 to activate at least the second light emitter 232, a second amount of light for causing the second electronic device 230 to activate at least the second light emitter 232, or that the second electronic device 230 is to activate at least the second light emitter 232 based on motion being detected by the first sensor or a second sensor (e.g., a sensor 312, the motion sensor(s) 412 and/or the camera 406 of the A/V device 210, a sensor 204, etc.).

The process 1300, at block B1308, stores fourth data associating the second condition with the second electronic device. For example, the backend server 224 (and/or the hub device 202) (and/or the A/V device 210) may store fourth data associating the second condition 324 with the second electronic device 230. In some examples, storing the second data may include updating the settings 434 to indicate an association 326 between the second condition 324 and the second electronic device 230. In some examples, storing the second data may include storing at least a portion of the updated settings data 332.

The process 1300, at block B1310, receives first sensor data generated by a first device. For example, the backend server 224 may receive, using the network interface 504 (and/or the hub device 202 may receive, using the network interface 608) (and/or the A/V device 210 may receive, using the network interface 404), the first sensor data 330 generated by a first device. In some examples, the first device may include the first electronic device 230, the second electronic device 230, the first light emitter 232, the second light emitter 232, the A/V device, one of the sensors 204, and/or the like. In some examples, the first sensor data 330 may include data indicating a current time, data indicating an amount of ambient light detected by the first device, and/or data indicating that the first device detected motion.

The process 1300, at block B1312, determines, using the first sensor data, that the first condition is satisfied. For example, the backend server 224 (and/or the hub device 202) (and/or the A/V device 210) may determine, using the first sensor data 330, that the first condition 324 is satisfied. In some examples, if the first condition 324 indicates a first period of time, the backend server 224 (and/or the hub device 202) (and/or the A/V device 210) may determine that the first condition 324 is satisfied based on determining that a current time (as indicated by the first sensor data 330) is within the first period of time. In some examples, if the first condition 324 indicates a first amount of light, the backend server 224 (and/or the hub device 202) (and/or the A/V device 210) may determine that the first condition 324 is satisfied based on determining that a current amount of ambient light (as indicated by the first sensor data 330) does not exceed the first amount of light. Still, in some examples, if the first condition 324 indicates motion being detected by the first device, the backend server 224 (and/or the hub device 202) (and/or the A/V device 210) may determine that the first condition 324 is satisfied based on determining that the first device detected the motion (as indicated by the first sensor data 330).

The process 1300, at block B1314, transmits a first signal to the first electronic device, the first signal to cause the first electronic device to activate at least the first light emitter. For example, backend server 224 may transmit, using the network interface 504 (and/or the hub device 202 may transmit, using the network interface 608) (and/or the A/V device 210 may transmit, using the network interface 404), the first control signal 334 to the first electronic device 230. The first control signal 334 may be configured to cause the first electronic device 230 to activate at least the first light emitter 232.

The process 1300, at block B1316, receives second sensor data generated by the first device or a second device. For example, the backend server 224 may receive, using the network interface 504 (and/or the hub device 202 may receive, using the network interface 608) (and/or the A/V device 210 may receive, using the network interface 404), the second sensor data 330 generated by the first device or a second device. In some examples, the second device may include the first electronic device 230, the second electronic device 230, the first light emitter 232, the second light emitter 232, the A/V device, one of the sensors 204, and/or the like. In some examples, the second sensor data 330 may include data indicating a current time, data indicating an amount of ambient light detected by the first device or the second device, and/or data indicating that the first device or the second device detected motion.

The process 1300, at block B1318, determines, using the second sensor data, that the second condition is satisfied. For example, the backend server 224 (and/or the hub device 202) (and/or the A/V device 210) may determine, using the second sensor data 330, that the second condition 324 is satisfied. In some examples, if the second condition 324 indicates a second period of time, the backend server 224 (and/or the hub device 202) (and/or the A/V device 210) may determine that the second condition 324 is satisfied based on determining that a current time (as indicated by the second sensor data 330) is within the second period of time. In some examples, if the second condition 324 indicates a second amount of light, the backend server 224 (and/or the hub device 202) (and/or the A/V device 210) may determine that the second condition 324 is satisfied based on determining that a current amount of ambient light (as indicated by the second sensor data 330) does not exceed the second amount of light. Still, in some examples, if the second condition 324 indicates motion being detected by the second device, the backend server 224 (and/or the hub device 202) (and/or the A/V device 210) may determine that the second condition 324 is satisfied based on determining that the second device detected the motion (as indicated by the second sensor data 330).

The process 1300, at block B1320, transmits a second signal to the second electronic device, the second signal to cause the second electronic device to activate at least the second light emitter. For example, backend server 224 may transmit, using the network interface 504 (and/or the hub device 202 may transmit, using the network interface 608) (and/or the A/V device 210 may transmit, using the network interface 404), the second control signal 334 to the second electronic device 230. The second control signal 334 may be configured to cause the second electronic device 230 to activate at least the second light emitter 232.

Figure 14:
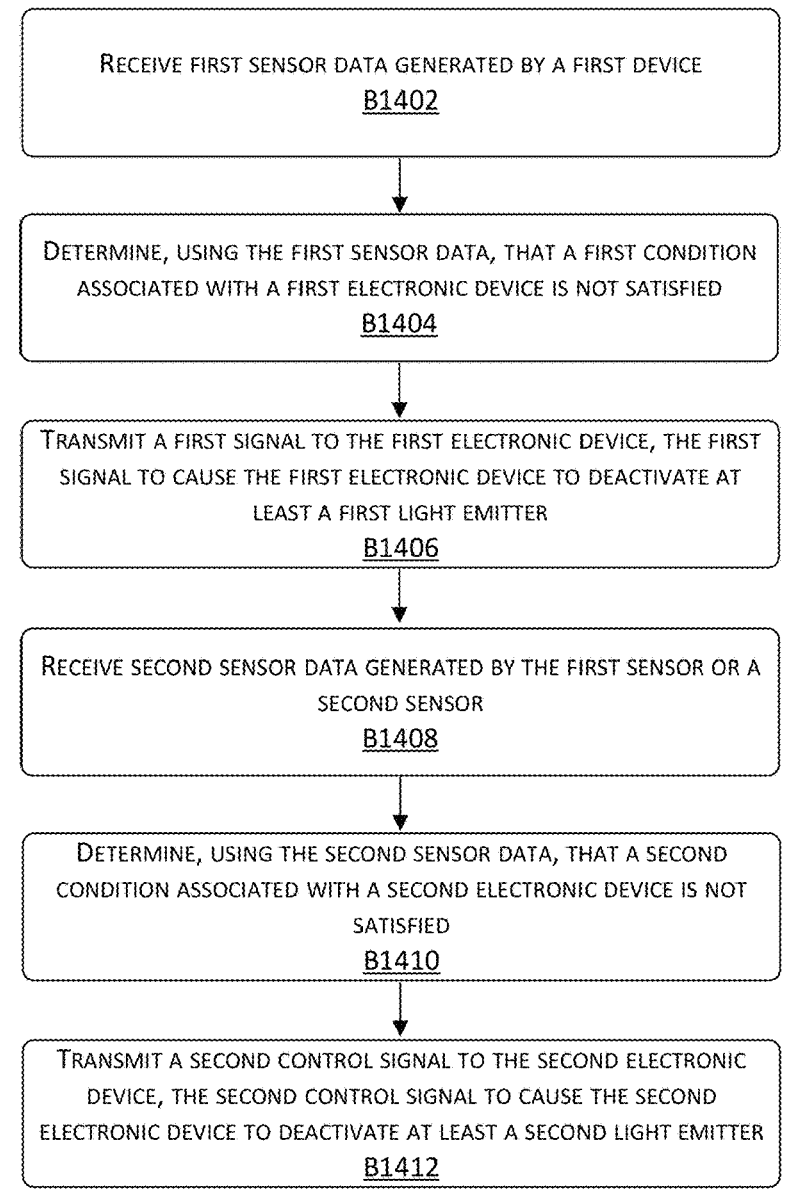

FIG. 14 is a flowchart illustrating an example process 1400 for controlling lights using multiple electronic devices, according to various aspects of the present disclosure. In some examples, the example process 1400 of FIG. 14 occurs after the example process 1300 of FIG. 13.

The process 1400, at block B1402, receives first sensor data generated by a first device. For example, the backend server 224 may receive, using the network interface 504 (and/or the hub device 202 may receive, using the network interface 608) (and/or the A/V device 210 may receive, using the network interface 404), the first sensor data 330 generated by a first device. In some examples, the first device may include the first electronic device 230, the second electronic device 230, the first light emitter 232, the second light emitter 232, the A/V device, one of the sensors 204, and/or the like. In some examples, the first sensor data 330 may include data indicating a current time, data indicating an amount of ambient light detected by the first device, and/or data indicating that the first device detected motion.

The process 1400, at block B1404, determines, using the first sensor data, that a first condition associated with a first electronic device is not satisfied. For example, the backend server 224 (and/or the hub device 202) (and/or the A/V device 210) may determine, using the first sensor data 330, that the first condition 324 associated with the first electronic device 230 is not satisfied. In some examples, if the first condition 324 indicates a first period of time, the backend server 224 (and/or the hub device 202) (and/or the A/V device 210) may determine that the first condition 324 is not satisfied based on determining that a current time (as indicated by the first sensor data 330) is outside of the first period of time. In some examples, if the first condition 324 indicates a first amount of light, the backend server 224 (and/or the hub device 202) (and/or the A/V device 210) may determine that the first condition 324 is not satisfied based on determining that a current amount of ambient light (as indicated by the first sensor data 330) exceeds the first amount of light. Still, in some examples, if the first condition 324 indicates motion being detected by the first device, the backend server 224 (and/or the hub device 202) (and/or the A/V device 210) may determine that the first condition 324 is not satisfied based on determining that the first device has not detected motion for a threshold period of time.

The process 1400, at block B1406, transmits a first signal to the first electronic device, the first signal to cause the first electronic device to deactivate at least the first light emitter. For example, backend server 224 may transmit, using the network interface 504 (and/or the hub device 202 may transmit, using the network interface 608) (and/or the A/V device 210 may transmit, using the network interface 404), the first control signal 334 to the first electronic device 230. The first control signal 334 may be configured to cause the first electronic device 230 to deactivate at least the first light emitter 232.

The process 1400, at block B1408, receives second sensor data generated by the first device or a second device. For example, the backend server 224 may receive, using the network interface 504 (and/or the hub device 202 may receive, using the network interface 608) (and/or the A/V device 210 may receive, using the network interface 404), the second sensor data 330 generated by the first device or a second device. In some examples, the second device may include the first electronic device 230, the second electronic device 230, the first light emitter 232, the second light emitter 232, the A/V device, one of the sensors 204, and/or the like. In some examples, the second sensor data 330 may include data indicating a current time, data indicating an amount of ambient light detected by the first device or the second device, and/or data indicating that the first device or the second device detected motion.

The process 1400, at block B1410, determines, using the second sensor data, that a second condition associated with a second electronic device is not satisfied. For example, the backend server 224 (and/or the hub device 202) (and/or the A/V device 210) may determine, using the second sensor data 330, that the second condition 324 associated with the second electronic device 230 is not satisfied. In some examples, if the second condition 324 indicates a second period of time, the backend server 224 (and/or the hub device 202) (and/or the A/V device 210) may determine that the second condition 324 is not satisfied based on determining that a current time (as indicated by the second sensor data 330) is outside of the second period of time. In some examples, if the second condition 324 indicates a second amount of light, the backend server 224 (and/or the hub device 202) (and/or the A/V device 210) may determine that the second condition 324 is not satisfied based on determining that a current amount of ambient light (as indicated by the second sensor data 330) exceeds the second amount of light. Still, in some examples, if the second condition 324 indicates motion being detected by the first device of the second device, the backend server 224 (and/or the hub device 202) (and/or the A/V device 210) may determine that the second condition 324 is not satisfied based on determining that the first device or the second device has not detected the motion for a threshold period of time.

The process 1400, at block B1412, transmits a second signal to the second electronic device, the second signal to cause the second electronic device to deactivate at least a second light emitter. For example, backend server 224 may transmit, using the network interface 504 (and/or the hub device 202 may transmit, using the network interface 608) (and/or the A/V device 210 may transmit, using the network interface 404), the second control signal 334 to the second electronic device 230. The second control signal 334 may be configured to cause the second electronic device 230 to deactivate at least the second light emitter 232.

Figure 15:
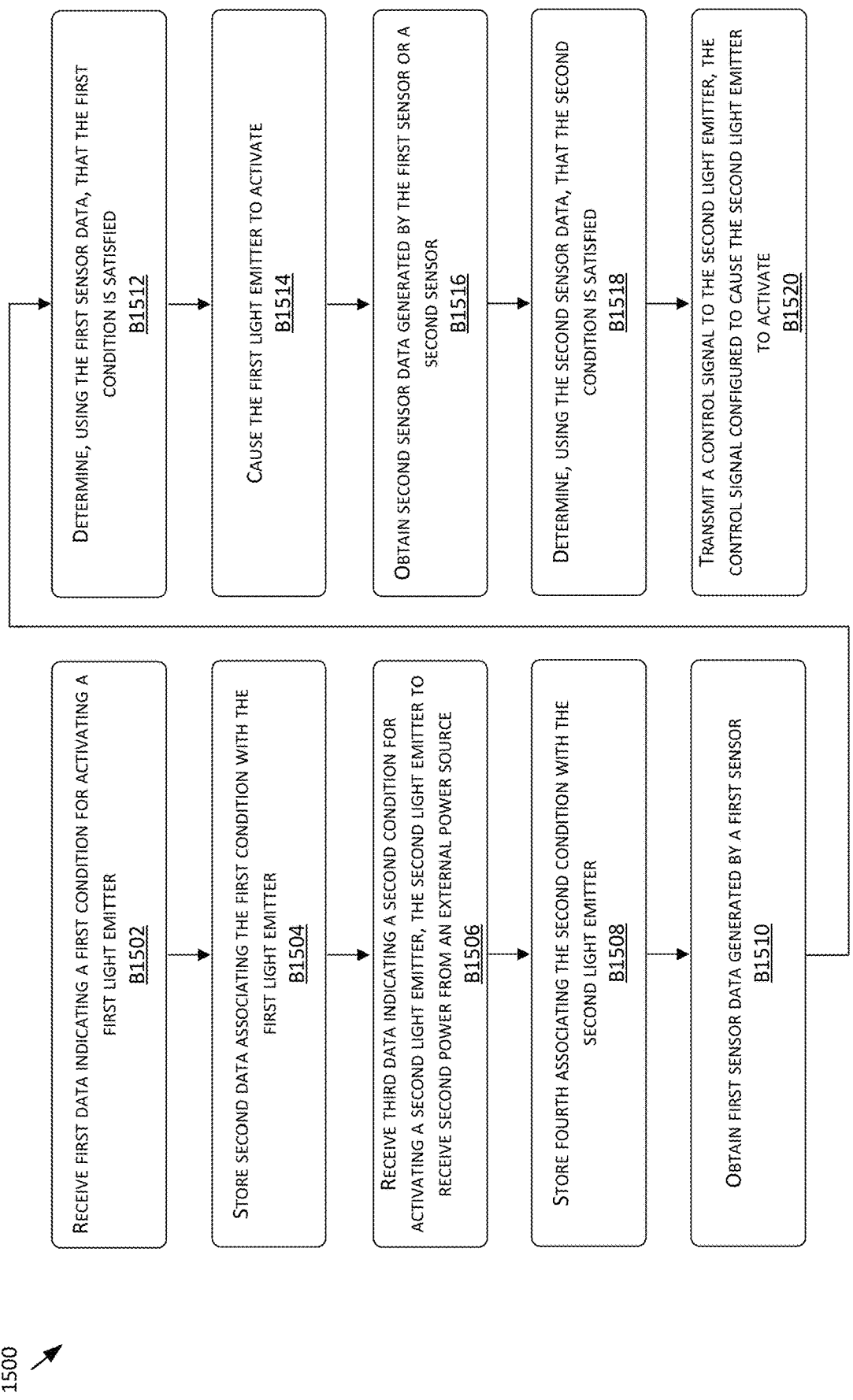
FIG. 15 is a flowchart illustrating an example process for controlling lights using an electronic device, according to various aspects of the present disclosure.

FIG. 15 is a flowchart illustrating an example process 1500 for controlling lights using an electronic device, according to various aspects of the present disclosure. The process 1500, at block B1502, receives first data indicating a first condition for activating a first light emitter. For example, a network device (e.g., the first electronic device 230, the A/V device 210, the backend server 224, the hub device 202, a signaling device, and/or another electronic device) may receive updated settings data 332 indicating the first condition 324 for activating the first light emitter 232. In some examples, the first light emitter 232 may include the first type of light emitter 232(*a*) or the second type of light emitter 232(*b*). For example, the first light emitter 232 may be connected to a connector 310 (e.g., a terminal) of a second electronic device 230 (that is different than the first electronic device 230). As such, the second electronic device 230 may provide the first power to the first light emitter 232 via the connector 310. In some examples, the first light emitter 232 may include the third type of light emitter 232(*c*). For example, the first light emitter 232 may utilize a power source (e.g., battery, solar, a separate hard-wired connection, etc.) that is external to the second electronic device 230 and/or the first electronic device 230.

In some examples, the network device may receive the updated settings data 332 from the client device 214, 216. The first condition 324 may indicate a first time period for activating the first light emitter 232, a first amount of light for activating the first light emitter 232, or that the first light emitter 232 is to be activated based on motion being detected by a first sensor (e.g., a sensor 312, the motion sensor(s) 412 and/or the camera 406 of the A/V device 210, a sensor 204, an automation device 206, etc.).

The process 1500, at block B1504, stores second data associating the first condition with the first light emitter. For example, the network device may store second data associating the first condition 324 with the first light emitter 232. In some examples, storing the second data may include updating the settings 320 to indicate an association 326 between the first condition 324 and the first light emitter 232. In some examples, storing the second data may include storing at least a portion of the updated settings data 332 within the memory 316.

The process 1500, at block B1506, receives third data indicating a second condition for activating a second light emitter. For example, the network device may receive, using the network interface 204, updated settings data 332 indicating the second condition 324 for activating the second light emitter 232. In some examples, the second light emitter 232 may include the first type of light emitter 232(a) or the second type of light emitter 232(b). For example, the second light emitter 232 may be connected to a connector 310 (e.g., a terminal) of the second electronic device 230. As such, the second electronic device 230 may provide the first power to the second light emitter 232 via the connector 310. In some examples, the second light emitter 232 may include the third type of light emitter 232(c). For example, the second light emitter 232 may utilize a power source that is external to the second electronic device 230.

In some examples, the network device may receive the updated settings data 332 from the client device 214, 216. The second condition 324 may indicate a second time period for activating the second light emitter 232, a second amount of light for activating the second light emitter 232, or that the second light emitter 232 is to be activated based on motion being detected by the first sensor or a second sensor (e.g., a sensor 312, the motion sensor(s) 412 and/or the camera 406 of the A/V device 210, a sensor 204, etc.).

The process 1500, at block B1508, stores fourth data associating the second condition with the second light emitter. For example, the network device may store fourth data associating the second condition 324 with the second light emitter 232. In some examples, storing the fourth data may include updating the settings 320 to indicate an association 326 between the second condition 324 and the second light emitter 232. In some examples, storing the fourth data may include storing at least a portion of the updated settings data 332 within the memory 316.

The process 1500, at block B1510, obtains first sensor data generated by a first sensor. For example, the network device may obtain the first sensor data 330 generated by a first sensor. In some examples, the first sensor may include a sensor 312 of the first electronic device 230 and/or the second electronic device 230. For example, the first sensor data 330 may include data indicating a current time that is generated by a timer (e.g., a sensor 312), light data generated by a light sensor 312, and/or motion data generated by a motion sensor 312. In some examples, the first sensor may be external to the first electronic device 230 and/or the second electronic device 230. For example, the first sensor data 330 may include motion data generated by the A/V device 210 (e.g., the camera 406 and/or the motion sensor(s) 412), a motion sensor of one or more of the light emitters 232, and/or a motion sensor of the sensors 204, input data generated by the A/V device 210, light data generated by the A/V device 210 (e.g., the light sensor 408), a light sensor of one or more of the light emitters 232, and/or a light sensor of the sensors 204, sensor data generated by one or more of the sensors 204 and/or automation devices 206, and/or the like. In some examples, the sensor may be part of the security system (e.g., communicatively coupled to the hub device 202 and/or the A/V device 210).

The process 1500, at block B1512, determines, using the first sensor data, that the first condition is satisfied. For example, the network device may determine, using the first sensor data 330, that the first condition 324 is satisfied. In some examples, if the first condition 324 indicates a first period of time, the network device may determine that the first condition 324 is satisfied based on determining that a current time (as indicated by the first sensor data 330) is within the first period of time. In some examples, if the first condition 324 indicates a first amount of light, the network device may determine that the first condition 324 is satisfied based on determining that a current amount of ambient light (as indicated by the first sensor data 330) does not exceed the first amount of light. Still, in some examples, if the first condition 324 indicates motion being detected by the first sensor, the network device may determine that the first condition 324 is satisfied based on determining that the first sensor detected the motion (as indicated by the first sensor data 330).

The process 1500, at block B1514, causes the first light emitter to activate. For example, based on determining that the first condition 324 is satisfied, the network device may cause the first light emitter 232 to activate (e.g., turn on). In some examples, if the first light emitter 232 includes the first type of light emitter 232(a), the network device may cause the first light emitter 232 to activate by transmitting a signal to the second electronic device 230. The second electronic device 230 may receive the signal and, in response, cause power to be provided to a connector 210 that is connected to the first light emitter 232. In some examples, the second electronic device 230 may include a transformer 308, an LED driver, a ballast, or another power supply for providing the power to the second light emitter 232. The power being provided to the connector 210 may cause the first light emitter 232 to activate (e.g., emit light). In some examples, if the first light emitter 232 includes the second type of light emitter 232(b) or the third type of light emitter 232(c), the network device may cause the first light emitter 232 to activate by transmitting a signal to the second electronic device 230. The second electronic device 230 may receive the signal and, in response, transmit a signal to the first light emitter 232 that causes the first light emitter 232 to activate. Still, in some examples, and again if the first light emitter 232 includes the second type of light emitter 232(b) or the third type of light emitter 232(c), the network device may transmit a signal to the first light emitter 232 that causes the first light emitter 232 to activate. In such an example, if the first light emitter 232 includes the second type of light emitter 232(b), the power supplied to the first light emitter 232 may be via the second electronic device 230 while the signal(s) for activation of the first light emitter 232 may be transmitted via the network device (e.g., the first electronic device 230, the A/V device 210, the signaling device, the hub device 202, the backend server 224, and/or another device).

The process 1500, at block B1516, obtains second sensor data generated by the first sensor or a second sensor. For example, the network device may obtain the second sensor data 330 generated by the first sensor or the second sensor. In some examples, the sensor (e.g., the first sensor or the second sensor) may include a sensor 312 of the first electronic device 230 or the second electronic device 230. For example, the second sensor data 330 may include data indicating a current time that is generated by a timer (e.g., a sensor 312), light data generated by a light sensor 312, and/or motion data generated by a motion sensor 312. In some examples, the sensor (e.g., the first sensor or the second sensor) may be external to the first electronic device 230 or the second electronic device 230. For example, the second sensor data 330 may include motion data generated by the A/V device 210 (e.g., the camera 406 and/or the motion sensor(s) 412), a motion sensor of one or more of the light emitters 232, and/or a motion sensor of the sensors 204, input data generated by the A/V device 210, light data generated by the A/V device 210 (e.g., the light sensor 408), a light sensor of one or more of the light emitters 232, and/or a light sensor of the sensors 204, sensor data generated by one or more of the sensors 204 and/or automation devices 206, and/or the like. In some examples, the sensor may be part of the security system (e.g., communicatively coupled to the hub device 202 and/or the A/V device 210).

The process 1500, at block B1518, determines, using the second sensor data, that the second condition is satisfied. For example, the network device may determine, using the second sensor data 330, that the second condition 324 is satisfied. In some examples, if the second condition 324 indicates a second period of time, the network device may determine that the second condition 324 is satisfied based on determining that a current time (as indicated by the second sensor data 330) is within the second period of time. In some examples, if the second condition 324 indicates a second amount of light, the network device may determine that the second condition 324 is satisfied based on determining that a current amount of ambient light (as indicated by the second sensor data 330) does not exceed the second amount of light. Still, in some examples, if the second condition 324 indicates motion being detected by the first sensor or the second sensor, the network device may determine that the second condition 324 is satisfied based on determining that the first sensor or the second sensor detected the motion (as indicated by the second sensor data 330).

The process 1500, at block B1520, causes the second light emitter to activate. For example, based on determining that the second condition 324 is satisfied, the network device may cause the second light emitter 232 to activate (e.g., turn on). In some examples, if the second light emitter 232 includes the first type of light emitter 232(a), the network device may cause the second light emitter 232 to activate by transmitting a signal to the second electronic device 230. The second electronic device 230 may receive the signal and, in response, cause power to be provided to a connector 210 that is connected to the second light emitter 232 (e.g., by closing a switch). In some examples, the second electronic device 230 may include a transformer 308, an LED driver, a ballast, or another power supply for providing the power to the second light emitter 232. The power being provided to the connector 210 may cause the second light emitter 232 to activate (e.g., emit light). In some examples, if the second light emitter 232 includes the second type of light emitter 232(b) or the third type of light emitter 232(c), the network device may cause the second light emitter 232 to activate by transmitting a signal to the second electronic device 230. The second electronic device 230 may receive the signal and, in response, transmit a signal to the second light emitter 232 that causes the second light emitter 232 to activate. Still, in some examples, and again if the second light emitter 232 includes the second type of light emitter 232(b) or the third type of light emitter 232(c), the network device may transmit a signal to the second light emitter 232 that causes the second light emitter 232 to activate. In such an example, if the second light emitter 232 includes the second type of light emitter 232(b), the power supplied to the second light emitter 232 may be via the second electronic device 230 while the signal(s) for activation of the second light emitter 232 may be transmitted via the network device (e.g., the first electronic device 230, the A/V device 210, the signaling device, the hub device 202, the backend server 224, and/or another device).

The process 1500 of FIG. 15 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure. The electronic device 102 in the example described below With reference to FIG. 1, and in response to input(s) by the user 110 to the client device 112 for setting conditions 108 associated with one or more light emitters 104, the network device, such as the hub device 124 and/or the A/V device 118, may receive the conditions 108 associated with the first light emitter 104 (e.g., block B1502). Although the example includes, for illustrative purposes, the network device as the hub device 124 and/or the A/V device 118, the network device may additionally, or alternatively, include one or more of a signaling device (not shown), a first electronic device 102, a bridge device (which may be the first electronic device 102), and/or another device, without departing from the scope of the present disclosure. The hub device 124 and/or the A/V device 118 may store the conditions 108 associated with the first light emitter 104 (e.g., block B1504). The first light emitter 104 may include the first type of light emitter 104(a), and the first light emitter 104 may be electrically coupled to the electronic device 102. The electronic device 102 may include a transformer, an LED driver, a ballast, and/or another power supply for supplying power to the first light emitter 104 (e.g., power drawn from the external power source 106). In an example where the electronic device 102 includes a transformer, the electronic device 102 may draw power from the external power source 106 (e.g., AC mains, wall power, etc.) and step down the voltage from the external power source 106 (e.g., 120V) to a lower voltage (e.g., 12V or 15V) using the transformer. As such, when the electronic device 102 receives a signal to activate the first light emitter 104 from the A/V device 118 and/or the hub device 124, the electronic device 102 can apply the lower voltage power to the first light emitter 104 (e.g., by closing a switch).

In response to the input(s) by the user 110 to the client device 112 for setting the conditions 108 associated with one or more light emitters 104, the hub device 124 and/or the A/V device 118 may receive the conditions 108 associated with the second light emitter 104 (e.g., at block B1506). The hub device 124 and/or the A/V device 118 may store the conditions 108 associated with the second light emitter 104 (e.g., block B1508). The second light emitter 104 may include the second type of light emitter 104(b). As such, the second light emitter 104 may be electrically coupled to the electronic device 102, but may communicate wirelessly (e.g., over a LPWAN, Z-Wave, ZigBee, BLE, etc.) with the A/V device 118 and/or the hub device 124 for receiving signals for activation (e.g., to turn on and/or off) and/or may communicate with the electronic device 102 wirelessly for receiving the signals for activation.

The A/V device 118 and/or the hub device 124 may obtain first sensor data generated by the A/V device 118 (e.g., a camera and/or a motion sensor of the A/V device 118), the motion sensor 116, the light sensor 114, and/or by another type of sensor (e.g., a sensor 204, an automation device 206, etc.) (e.g., block B1510). Based on the first sensor data, the A/V device 118 and/or the hub device 124 may determine that the first condition 108 is satisfied (e.g., block B1512) and may transmit a signal to the electronic device 102 to cause the electronic device 102 to provide power to the first light emitter 104 to cause the first light emitter 104 to emit light (e.g., block B1514).

The A/V device 118 and/or the hub device 124 may obtain second sensor data generated by the A/V device 118 (e.g., a camera and/or a motion sensor of the A/V device 118), the motion sensor 116, the light sensor 114, and/or by another type of sensor (e.g., a sensor 204, an automation device 206, etc.) (e.g., block B1516). Based on the second sensor data, the A/V device 118 and/or the hub device 124 may determine that the second condition 108 is satisfied (e.g., block B1518) and may transmit a signal to the second light emitter 104 (in some examples, via the electronic device 102) to cause the second light emitter 104 to emit light (e.g., block B1520). The second light emitter 104 may draw power from the electronic device 102 to emit the light (e.g., the second light emitter 104, in response to receiving the signal for activation, may draw on the power supply from the electronic device 102).

In an example where the second light emitter 104 is the third type of light emitter 104(c), after the determination that the second condition 108 is satisfied (e.g., block B1518), the A/V device 118 and/or the hub device 124 may transmit a signal to the second light emitter 104 (in some examples, via the electronic device 102) to cause the second light emitter 104 to emit light (e.g., block B1520). The second light emitter 104 may then draw power from an internal power supply (e.g., a battery, a solar panel, an energy harvesting apparatus, etc.), may draw power from an external power supply (e.g., a connection to an external power source separate from the electronic device 102, the A/V device 118, and/or the hub device 124, an external solar panel, etc.), or a combination thereof.

The processes described herein are directed to an electronic device 230 that is capable of coordinating the control of different types of light emitters 232. For example, the electronic device 230 is capable of controlling a first type of light emitter 232(a) that receives power from the electronic device 230. To control the first type of light emitter 232(a), the electronic device 230 may begin to provide power to the first type of light emitter 232(a) to activate the first type of light emitter 232(a) and cease providing the power the deactivate the first type of light emitter 232(a). Additionally, the electronic device 230 is capable of controlling a second type of light emitter 232(b) that also receives power from the electronic device 230. To control the second type of light emitter 232(b), the electronic device 230 may transmit a first control signal 334 to the second type of light emitter 232(b), where the first control signal 334 is configured to cause the second type of light emitter 232(b) to activate, and transmit a second control signal 223 to the second type of light emitter 232(b), where the second control signal 334 is configured to cause the second type of light emitter 232(b) to deactivate. Furthermore, the electronic device 230 is capable of controlling a third type of light emitter 232(c) that receives power from a source that is external to the electronic device 230, such as a battery. To control the third type of light emitter 232(c), the electronic device 230 may transmit a first control signal 223 to the third type of light emitter 232(c), where the first control signal 334 is configured to cause the third type of light emitter 232(c) to activate, and transmit a second control signal 334 to the third type of light emitter 232(c), where the second control signal 334 is configured to cause the third type of light emitter 232(c) to deactivate.

Additionally, the electronic device 230 may be capable of controlling the light emitters 232 according to conditions 324 set by a user of the electronic device 230. For examples, the electronic device 230 may activate and/or deactivate each of the light emitters 232 based on period of time, an amount of light, and/or motion detection by a sensor. As such, the user of the electronic device 230 does not have to manually activate and/or deactivate each light emitter 232 and/or each type of light emitter 232, which provides for better control of the light emitters 232.

In addition, the first electronic device 230 (and/or network device) may control one or more second electronic devices 230 (e.g., electronic devices 230 including power supplies, such as transformers, ballasts, LED drivers, and/or the like) and/or may control one or more light emitters 232 (e.g., the second type of light emitter 232(b) and the third type of light emitter 232(c), in some examples, also the first type of light emitter 232(a)). The first electronic device 230 may include one or more additional functions that are different than controlling one or more light emitters 232 and/or one or more second electronic devices 230. For examples, the first electronic device 230 may include an A/V device 210, a hub device 202, a signaling device (e.g., a digital or mechanical doorbell chime, a wireless speaker, a wireless speaker that includes a network extender, such as a Wi-Fi network extender, and/or the like). In such examples, the control of one or more light emitters 232 and/or second electronic devices 230 may be an additional, and in some examples, a non-primary, function of the first electronic device 230. As a result, the first electronic device 230 is leveraged to provide additional functionality for controlling one or more light emitters 232 and/or second electronic devices 230. For example, a user may purchase an A/V device 210 that includes the features, components, and/or functionality of the first electronic device 230, and may originally use the A/V device 210 as only an A/V device 210 (e.g., to record audio and/or video of a field of view of the A/V device 210 for security monitoring purposes). The user may then add one or more light emitters 232 to his or her property, and may leverage the capabilities of the A/V device 210 to control the light emitters 232. In some examples, the control of the light emitters 232 may be via direct communication with the light emitters 232 (e.g., the first type of light emitters 232(b) or the third type of light emitters 232(c)), or may be via a second electronic device 230 that is coupled to one or more of the first type of light emitters 232(a), for example. As such, the user is not required to purchase an additional component for controlling the one or more light emitters 232, but rather is able to leverage existing devices (e.g., A/V devices 210, signaling devices, hub device(s) 202, VA devices 208, automation devices 206, and/or other devices) to control the one or more light emitters 232.

Figure 16:
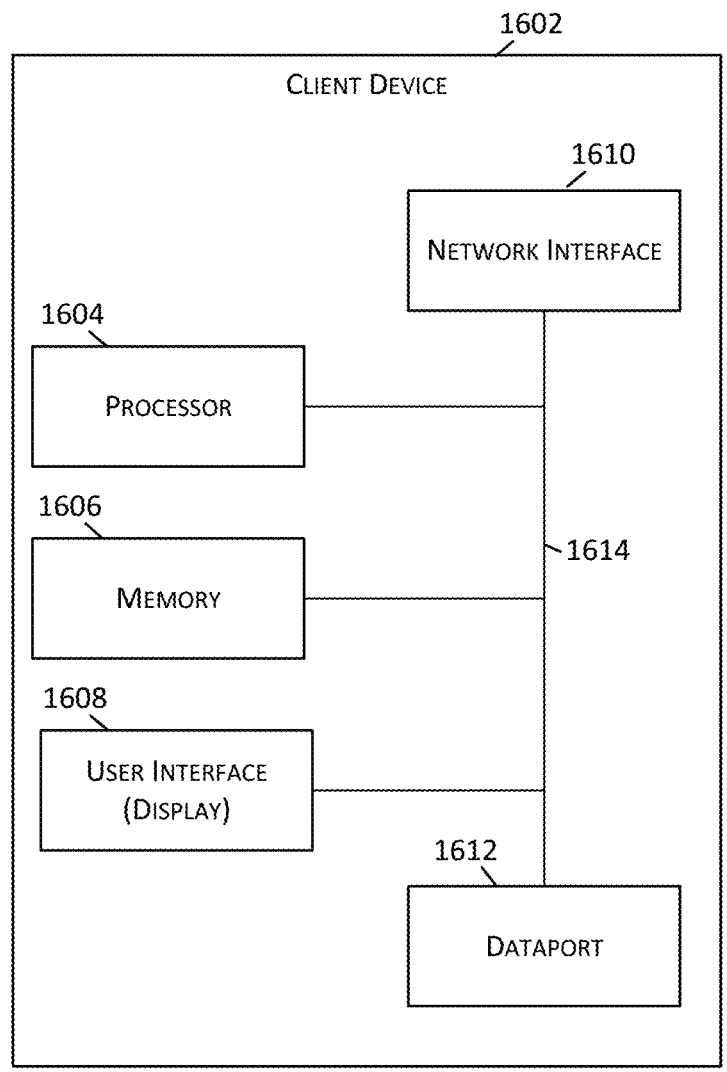
FIG. 16 is a functional block diagram of a client device on which the present embodiments may be implemented according to various aspects of the present disclosure.

FIG. 16 is a functional block diagram of a client device 1602 on which the present embodiments may be implemented according to various aspects of the present disclosure. The client device(s) 214, 216 described with reference to FIG. 2 may include some or all of the components and/or functionality of the client device 1602. The client device 1602 may comprise, for example, a smartphone.

With reference to FIG. 16, the client device 1602 includes a processor 1604, a memory 1606, a user interface 1608, a network interface 1610, and a dataport 1612. These components are communicatively coupled together by an interconnect bus 1614. The processor 1604 may include any processor used in smartphones and/or portable computing devices, such as an ARM processor (a processor based on the RISC (reduced instruction set computer) architecture developed by Advanced RISC Machines (ARM)). In some embodiments, the processor 2004 may include one or more other processors, such as one or more conventional microprocessors, and/or one or more supplementary co-processors, such as math co-processors.

The memory 1606 may include both operating memory, such as random-access memory (RAM), as well as data storage, such as read-only memory (ROM), hard drives, flash memory, or any other suitable memory/storage element. The memory 1606 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1604 and the memory 1606 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1604 may be connected to the memory 1606 via the dataport 1612.

The user interface 1608 may include any user interface or presentation elements suitable for a smartphone and/or a portable computing device, such as a keypad, a display screen, a touchscreen, a microphone, and a speaker. The network interface 1610 is configured to handle communication links between the client device 1602 and other, external devices or receivers, and to route incoming/outgoing data appropriately. For example, inbound data from the dataport 1612 may be routed through the network interface 1610 before being directed to the processor 1604, and outbound data from the processor 1604 may be routed through the network interface 1610 before being directed to the dataport 1612. The network interface 1610 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1612 may be any type of connector used for physically interfacing with a smartphone and/or a portable computing device, such as a mini-USB port or an IPHONE®/IPOD® 30-pin connector or LIGHTNING® connector. In other embodiments, the dataport 1612 may include multiple communication channels for simultaneous communication with, for example, other processors, servers, and/or client terminals.

The memory 1606 may store instructions for communicating with other systems, such as a computer. The memory 1606 may store, for example, a program (e.g., computer program code) adapted to direct the processor 1604 in accordance with the present embodiments. The instructions also may include program elements, such as an operating system. While execution of sequences of instructions in the program causes the processor 1604 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 17:
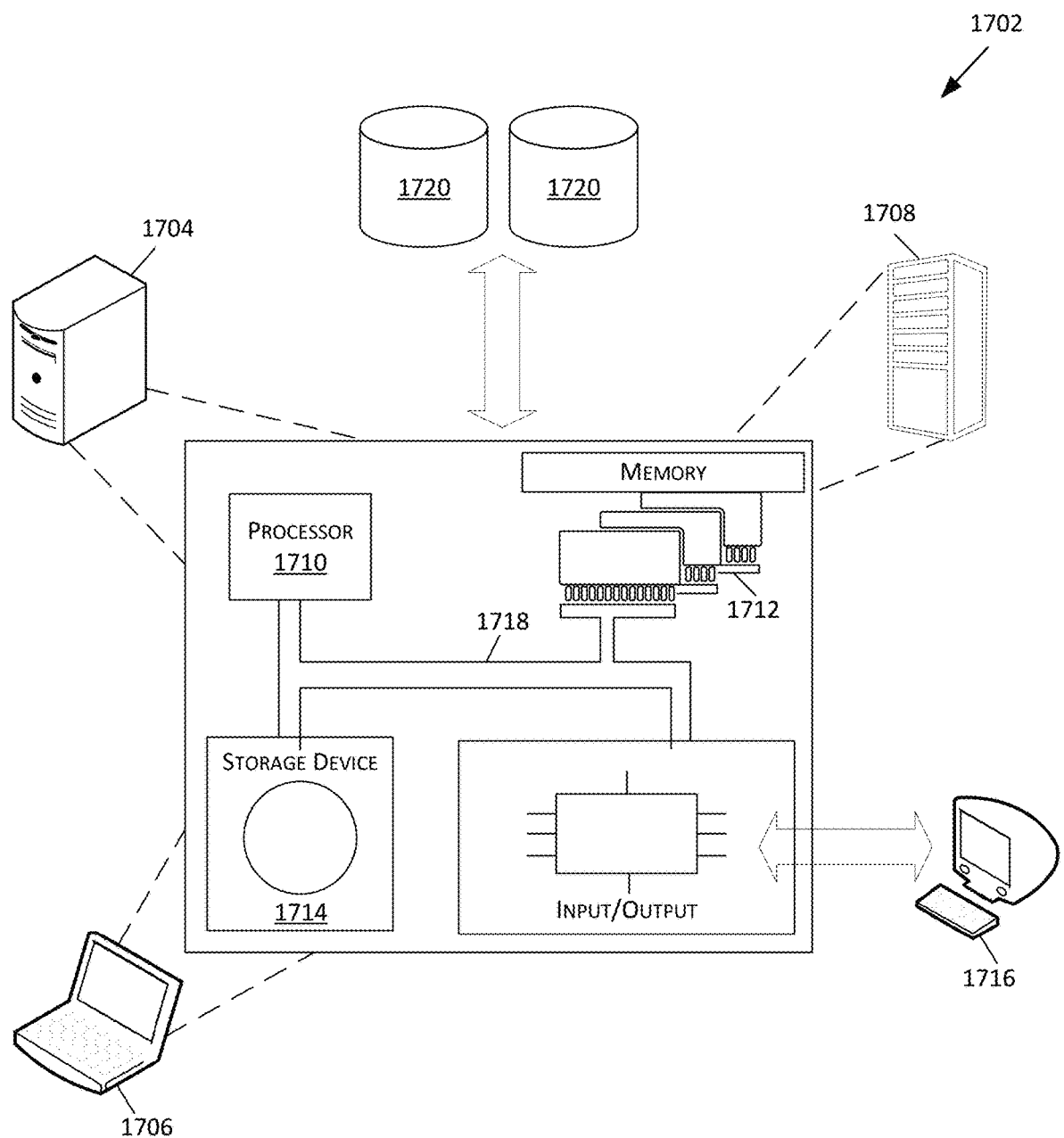
FIG. 17 is a functional block diagram of a general-purpose computing system on which the present embodiments may be implemented according to various aspects of present disclosure.

FIG. 17 is a functional block diagram of a general-purpose computing system on which the present embodiments may be implemented according to various aspects of the present disclosure. The computer system 1702 may be embodied in at least one of a personal computer (also referred to as a desktop computer) 1704, a portable computer (also referred to as a laptop or notebook computer) 1706, and/or a server 1708 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1702 may execute at least some of the operations described above. The computer system 1702 may include at least one processor 1710, memory 1712, at least one storage device 1714, and input/output (I/O) devices 1716. Some or all of the components 1710, 16 12, 1714, 1716 may be interconnected via a system bus 1718. The processor 1710 may be single- or multi-threaded and may have one or more cores. The processor 1710 execute instructions, such as those stored in the memory 1712 and/or in the storage device 1714. Information may be received and output using one or more I/O devices 1716.

The memory 1712 may store information, and may be a computer-readable medium, such as volatile or non-volatile memory. The storage device(s) 1714 may provide storage for the system 1702 and, in some embodiments, may be a computer-readable medium. In various aspects, the storage device(s) 1714 may be a flash memory device, a hard disk device, an optical disk device, a tape device, or any other type of storage device.

The I/O devices 1716 may provide input/output operations for the system 1702. The I/O devices 1716 may include a keyboard, a pointing device, and/or a microphone. The I/O devices 1716 may further include a display unit for displaying graphical user interfaces, a speaker, and/or a printer. External data may be stored in one or more accessible external databases 1720.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
receiving, by a system and from a user device, first identifier data associated with an electronic device;
receiving, by the system and from the user device, second identifier data associated with a light emitter;
causing, by the system, the first identifier data to be associated with the second identifier data;
receiving, by the system, a first condition for causing the light emitter to operate in a first state;
causing, by the system, the first condition to be associated with the second identifier data;
determining, by the system, that the first condition is satisfied; and
based at least in part on the determining that the first condition is satisfied, sending, by the system and to the electronic device, at least the second identifier data.

2. The method as recited in claim 1, further comprising:
receiving, by the system, sensor data generated by at least one sensor, wherein the determining that the first condition is satisfied comprises determining, by the system and using the sensor data, that the first condition is satisfied.

3. The method as recited in claim 1, wherein the determining that the first condition is satisfied comprises at least one of:
determining, by the system, that a current time is within a time period;
determining, by the system, that an amount of ambient light is below a light threshold; or determining, by the system, that motion was detected by at least one sensor.

4. The method as recited in claim 1, further comprising:
determining, by the system, that the first condition is no longer satisfied; and
based at least in part on the determining that the first condition is no longer satisfied, sending, by the system, a command to operate the light emitter in a second state.

5. The method as recited in claim 1, further comprising:
causing, by the system, a second condition to be associated with at least one of the first identifier data or the second identifier data;
determining, by the system, that the second condition is satisfied; and
based at least in part on the determining that the second condition is satisfied, sending, by the system, a command to operate the light emitter in the first state or a second state.

6. The method as recited in claim 1, further comprising:
receiving, by the system and from the user device, a first command to operate the light emitter in a second state; and
based at least in part on the receiving of the first command, sending, by the system, a second command to operate the light emitter in the second state.

7. The method as recited in claim 1, further comprising:
generating a command to operate the light emitter in the first state, the first state being associated with at least one of:
an on state;
an off state;
a brightness level; or a light color; and
sending the command to the electronic device.

8. The method as recited in claim 1,
further comprising, based at least in part on the receiving of the second identifier data, causing the first identifier data to be associated with the second identifier data.

9. The method as recited in claim 1, further comprising:
sending, to the electronic device, a first command to operate the light emitter in the first state; and
sending, to the electronic device, a second command to send the first command to the light emitter.

10. The method as recited in claim 1,
wherein the sending of the second identifier data to the electronic device is further based at least in part on the first identifier data being associated with the second identifier data.

11. The method as recited in claim 1, further comprising sending, along with the second identifier data and to the electronic device, a command to send at least the second identifier data to the light emitter.

12. The method as recited in claim 1, further comprising:
based at least in part on the determining that the first condition is satisfied, determining, using the first identifier data, to cause the light emitter to switch to the first state using the electronic device,
and wherein the sending of the at least the second identifier data to the electronic device is based at least in part on the determining to cause the light emitter to switch to the first state using the electronic device.

13. A system comprising:
one or more network interfaces;
one or more processors; and
one or more computer-readable media storing instructions that, when executed by the one or more processors, cause the one or more processors to perform operations comprising:
storing first identifier data associated with an electronic device;
receiving, using the one or more network interfaces and from a user device, second identifier data associated with a first light emitter;
receiving, using the one or more network interfaces and from the user device, a first condition for causing the first light emitter to operate in a first state;
associating the first condition with the second identifier data;
determining that the first condition is satisfied; and
based at least in part on the determining that the condition is satisfied, sending, using the one or more network interfaces and to the electronic device, a first command to operate the first light emitter in the first state.

14. The system as recited in claim 13, wherein the determining that the condition is satisfied comprises at least one of:

determining that a current time is within a time period;
determining that an amount of ambient light is below a light threshold; or determining that motion was detected by at least one sensor.

15. The system as recited in claim 13, the one or more computer-readable media storing further instructions that, when executed by the one or more processors, cause the one or more processors to perform further operations comprising:
determining that the first condition is no longer satisfied; and
sending, using the one or more network interfaces, a second command to operate the first light emitter in a second state.

16. The system as recited in claim 13, the one or more computer-readable media storing further instructions that, when executed by the one or more processors, cause the one or more processors to perform further operations comprising:
receiving, using the one or more network interfaces, a second condition for causing a second light emitter to operate in the first state or a second state;
determining that the second condition is satisfied; and
sending, using the one or more network interfaces and to the electronic device, a second command to operate the second light emitter in the first state or the second state.

17. The system as recited in claim 13, wherein the associating of the first condition with the second identifier data comprises storing association data that represents at least:
the second identifier data associated with the first light emitter; and
the first condition.

18. The system as recited in claim 13, the one or more computer-readable media storing further instructions that, when executed by the one or more processors, cause the one or more processors to perform further operations comprising:
receiving, using the one or more network interfaces and from the user device, third identifier data from the user device;
determining the electronic device is associated with the first light emitter based at least in part on the first identifier data and the third identifier data; and
associating the first identifier data with the second identifier data.

19. A system comprising:
one or more network interfaces;
one or more processors; and
one or more computer-readable media storing instructions that, when executed by the one or more processors, cause the one or more processors to perform operations comprising:
receiving, using the one or more network interfaces, first identifier data associated with a hub device;
receiving, using the one or more network interfaces and from a user device, second identifier data associated with an electronic device;
based at least in part on the receiving of the second identifier data, associating the first identifier data with the second identifier data;
determining that a condition is satisfied; and
based at least in part on the condition being satisfied:
sending, using the one or more network interfaces and to the hub device, a command to control a light emitter; and sending, using the one or more network interfaces and to the hub device, the second identifier data associated with the electronic device.

20. The system as recited in claim 19, wherein the associating of the hub device with the electronic device comprises at least:
   storing the first identifier data associated with the hub device; and
   storing, in association with the first identifier data, the second identifier data associated with the electronic device.

\* \* \* \* \*